United States Patent
Seed et al.

(10) Patent No.: US 11,888,942 B2
(45) Date of Patent: *Jan. 30, 2024

(54) SYSTEMS AND METHODS FOR SERVICE LAYER SESSION MIGRATION AND SHARING

(71) Applicant: Convida Wireless, LLC, Wilmington, DE (US)

(72) Inventors: Dale N. Seed, Allentown, PA (US); Guang Lu, Thornhill (CA); Lijun Dong, San Diego, CA (US); Hongkun Li, Malvern, PA (US); Xu Li, Plainsboro, NJ (US); William Robert Flynn, IV, Schwenksville, PA (US); Catalina M. Mladin, Hatboro, PA (US); Phillip Brown, Los Angeles, CA (US)

(73) Assignee: Convida Wireless, LLC, Wilmington, DE (US)

( * ) Notice: Subject to any disclaimer, the term of this patent is extended or adjusted under 35 U.S.C. 154(b) by 33 days.

This patent is subject to a terminal disclaimer.

(21) Appl. No.: 17/852,502

(22) Filed: Jun. 29, 2022

(65) Prior Publication Data
US 2022/0337667 A1    Oct. 20, 2022

Related U.S. Application Data

(63) Continuation of application No. 17/341,846, filed on Jun. 8, 2021, now Pat. No. 11,418,602, which is a
(Continued)

(51) Int. Cl.
*G06F 15/16* (2006.01)
*H04L 67/148* (2022.01)
(Continued)

(52) U.S. Cl.
CPC .......... *H04L 67/148* (2013.01); *H04L 67/141* (2013.01); *H04L 67/34* (2013.01); *H04L 69/321* (2013.01)

(58) Field of Classification Search
CPC ..... H04L 67/34; H04L 67/141; H04L 67/148; H04L 69/321
(Continued)

(56) References Cited

U.S. PATENT DOCUMENTS 6,684,251 B1    1/2004   Qiu et al.
6,714,987 B1    3/2004   Amin et al.
(Continued)

FOREIGN PATENT DOCUMENTS

CN    1323435 A    11/2001
CN    1757015 A     4/2006
(Continued)

OTHER PUBLICATIONS

Braden, "Requirements for Internet Hosts—Communication Layers", Network Working Group, TCP—RFC:1122, Oct. 1989, 117 pages.
(Continued)

*Primary Examiner* — Bharat Barot
(74) *Attorney, Agent, or Firm* — BakerHostetler

(57) ABSTRACT

Methods, devices, and systems for migration or sharing of existing M2M service layer sessions are disclosed. In one embodiment, a Session Migration and Sharing Function (SMSF) performs the migration or sharing of a M2M service layer session. Various forms of service layer session context may be used to enable the migration and sharing of M2M service layer sessions.

20 Claims, 37 Drawing Sheets

Related U.S. Application Data continuation of application No. 16/438,686, filed on Jun. 12, 2019, now Pat. No. 11,064,033, which is a continuation of application No. 15/512,092, filed as application No. PCT/US2015/050929 on Sep. 18, 2015, now Pat. No. 10,367,896.

(60) Provisional application No. 62/052,535, filed on Sep. 19, 2014.

(51) Int. Cl.
  *H04L 67/00* (2022.01)
  *H04L 67/141* (2022.01)
  *H04L 69/321* (2022.01)

(58) Field of Classification Search
  USPC .................................................. 709/227–228
  See application file for complete search history.

(56) References Cited

U.S. PATENT DOCUMENTS

| | | |
|---|---|---|
| 7,137,126 B1 | 11/2006 | Coffman et al. |
| 8,166,173 B2 | 4/2012 | Low et al. |
| 8,166,176 B2 | 4/2012 | Kumar et al. |
| 8,170,534 B2 | 5/2012 | Naqvi et al. |
| 8,244,864 B1 * | 8/2012 | Bahl .................... H04L 67/148 709/228 |
| 8,948,131 B2 | 2/2015 | Nakahara |
| 8,966,094 B2 | 2/2015 | Levenshteyn et al. |
| 9,100,236 B1 | 8/2015 | Shetty et al. |
| 9,246,953 B2 | 1/2016 | Maes |
| 9,497,102 B2 | 11/2016 | Cherian et al. |
| 10,299,171 B2 * | 5/2019 | Yadhav ................ H04L 67/148 |
| 10,367,896 B2 * | 7/2019 | Seed .................... H04L 69/321 |
| 2009/0094112 A1 | 4/2009 | Cesarini et al. |
| 2009/0201917 A1 | 8/2009 | Maes et al. |
| 2010/0015980 A1 | 1/2010 | Seta et al. |
| 2010/0040018 A1 | 2/2010 | Appani et al. |
| 2010/0080197 A1 | 4/2010 | Kanellakis et al. |
| 2011/0119391 A1 | 5/2011 | Maes |
| 2011/0196974 A1 | 8/2011 | Maes |
| 2012/0016977 A1 | 1/2012 | Robertson et al. |
| 2012/0039323 A1 | 2/2012 | Hirano et al. |
| 2013/0142118 A1 | 6/2013 | Cherian et al. |
| 2013/0219043 A1 * | 8/2013 | Steiner .................. H04L 43/16 709/224 |
| 2013/0223339 A1 | 8/2013 | Nakahara |
| 2013/0343174 A1 | 12/2013 | Guichard et al. |
| 2014/0317290 A9 | 10/2014 | Taaghol et al. |
| 2016/0080428 A1 | 3/2016 | Fan et al. |

FOREIGN PATENT DOCUMENTS

| | | |
|---|---|---|
| CN | 101404671 A | 4/2009 |
| CN | 101455055 A | 6/2009 |
| JP | 2001-127772 A | 5/2001 |
| JP | 2004-235883 A | 8/2004 |
| JP | 2006-042001 A | 2/2006 |
| JP | 2009-212892 A | 9/2009 |
| JP | 2011-524685 A | 9/2011 |
| JP | 2012-504354 A | 2/2012 |
| JP | 2012-524424 A | 10/2012 |
| JP | 2013-172407 A | 9/2013 |
| WO | 2010/109547 A1 | 9/2010 |

OTHER PUBLICATIONS

Cerf et al., "Specification of Internet Transmission Control Program", Network Working Group, TCP—RFC: 675, Dec. 1974, 71 pages.
Dierks et al., "The Transport Layer Security (TLS) Protocol Version 1.2", Network Working Group, TCP—5246, Aug. 2008, 105 pages.
Jacobson et al., "TCP Extensions for High Performance", Network Working Group, TCP—RFC: 1323, May 1992, 38 pages.
OneM2M Functional Architecture, oneM2M-TS-0001 oneM2M Functional Architecture-V-0.4.3 , Mar. 27, 2014, 303 pages.
OneM2M Service Session Management CSF—oneM2M ARC contribution 0588 , 2013, 12 pages.
Rescorla et al., "Datagram Transport Layer Security Version 1.2", Internet Engineering Task Force (IETF), DTLS—RFC:6347, Jan. 2012, 33 pages.
Rescorla, "HTTP Over TLS", Network Working Group, HTTPS—RFC:2818, May 2000, 8 pages.
Shelby et al., "Constrained Application Protocol (CoAP) draft-ietf-core-coap-18", CoRE Working Group, Jun. 2013, 118 pages.
TCP—"DARPA Control Protocol Internet Program", Protocol Specification, RFC:793, Sep. 1981, 161 pages.

* cited by examiner

SYSTEMS AND METHODS FOR SERVICE LAYER SESSION MIGRATION AND SHARING

CROSS REFERENCE TO RELATED APPLICATIONS

This application is a continuation of U.S. patent application Ser. No. 17/341,846 filed Jun. 8, 2021, which is a continuation of U.S. patent application Ser. No. 16/438,686 filed Jun. 12, 2019, which is a continuation of U.S. patent application Ser. No. 15/512,092, filed Mar. 17, 2017, which is a National Stage Application filed under 35 U.S.C. § 371 of International Application No. PCT/US2015/050929, filed Sep. 18, 2015, which claims priority to, and the benefit of, U.S. Provisional Patent Application No. 62/052,535, filed Sep. 19, 2014, the disclosures of which are hereby incorporated by reference in their entireties.

BACKGROUND

A communication session may involve a persistent interactive exchange of information between two or more communicating entities (e.g. devices, applications, etc.). A communication session is established at a certain point in time, and torn down at a later point in time based on various circumstances (e.g. after the session times out or when one of the entities decides to terminate the session). A communication session may involve the exchange of multiple messages between entities and may be stateful, meaning that at least one of the communicating entities saves information about the session history in order to be able to maintain the communication session—for example, maintaining session context such as connectivity, registration, security, scheduling, and data that is applicable to the session participants.

Communication sessions may be implemented as part of protocols and services at various layers in a network protocol stack. For example, communication connections/sessions may be established between network nodes at the transport protocol layer (e.g. TCP connection), session protocol layer (e.g. TLS and DTLS sessions), Web transport protocol layer (e.g. HTTP and CoAP sessions), machine-to-machine (M2M)/Internet of Things (IoT) service layer, and at the application layer (e.g., application-specific sessions). The present application relates primarily to features targeting M2M/IoT service layer sessions.

A conventional application session is a communication session between two or more applications that is established and managed by the applications themselves rather than by an underlying communication protocol or service layer. As a result, application sessions can add extra overhead and complexity to applications.

A machine-to-machine (M2M) service layer provides value-added services for M2M type devices and applications. For example, an M2M service layer can support Application Programming Interfaces (APIs) providing applications and devices access to a collection of M2M centric capabilities supported by the service layer. A few examples include security, charging, data management, device management, discovery, provisioning, and connectivity management. These capabilities are made available to applications via APIs which make use of message formats, resource structures and resource representations defined by the M2M service layer.

A M2M service layer session is a communication session that is facilitated by the value-added session management services supported by a M2M service layer. These services can include capabilities such as mechanisms for establishing a service layer session between participants as well as collecting and maintaining context pertinent to the service layer session and its participants. A service layer session can be established between two or more M2M service layer session participants where these participants can be M2M applications and/or M2M service layer instances. At a minimum however, at least one instance of a M2M service layer must participate in the session to function as the facilitator of the service layer session (i.e. provide the necessary service layer session management functionality).

One benefit of M2M service layer sessions is they can be used to offload applications from the burden of having to establish and maintain their own application-based sessions. This is because a M2M service layer session differs from an application session in that, the brunt of the overhead involved with establishing and maintaining the session is offloaded to the M2M service layer such that M2M applications are not burdened with this responsibility. Some examples of overhead that can be offloaded to the service layer can include creation and management of session context such as credentials, identifiers, routing information, discovery information, location, transaction history, and data. Another benefit is a M2M service layer session can be layered on top of one or more underlying transport or access network communication sessions. Some examples include but are not limited to Web transport protocol sessions (e.g. HTTP session), session layer sessions (e.g. TLS session), or transport layer connections (e.g. TCP). This layering allows a M2M service layer session to support persistency with regards to lower layer sessions such that the M2M service layer session can persist and be maintained independent of the setup and tear down of lower layer sessions. For example, a M2M service layer session can persist in spite of its underlying TCP/TLS sessions being repeatedly setup and torn-down which is fairly typical during the course of normal network communication (e.g. due to power saving methods and mobility).

The establishment of a M2M service layer session between session participants may either be initiated as part of the service layer registration process or as a separate process thereafter. Once established, a service layer session can be used to collect and maintain service layer context pertaining to the session participants and the communication that takes place between them. For example, service layer session context such as registration state and security credentials of session participants, subscription criteria and contact information for session participants, session participant data stored in service layer resources, and history of transactions performed by session participants, may be collected and maintained for each session. The termination of a M2M service layer session between session participants can either be initiated as part of the service layer de-registration process or as a separate process performed before de-registration takes place.

Establishment of a service layer session as well as the accumulation of service layer session context during the lifetime of a particular service layer session may involve a significant amount time and effort on behalf of the session participants. Hence, the persistent nature of a service layer session is one of its major value-add differentiators compared to lower layer transport and access network sessions which lack this persistency. A persistent service layer session can be used to maintain service layer session context on behalf of applications such that they do not have to maintain this information themselves. In addition, when a lower layer connection/session is torn down the service layer session context can persist and when the lower layer connection is re-established, this context will still be available to an application. Hence this context can be maintained independent of non-persistent underlying transport sessions. Some examples of service layer session context may include service layer registrations, subscriptions, credentials, identifiers, charging records, routing information, discovery information, location, transaction history, and data for applications.

SUMMARY

Existing M2M service layers lack support for migrating or sharing M2M service layer session context from one service layer instance to another service layer instance. Similarly they also lack support for migrating or sharing M2M service layer session context between M2M application instances. This lack of functionality prevents a M2M service layer from supporting persistency of service layer sessions for use cases involving mobile session participants, changes in session participants addresses such as getting assigned new IP addresses, or use cases involving sharing service layer sessions with new session participants.

Disclosed herein are methods, devices, and systems for migration or sharing of an existing M2M service layer session with one or more session participants. In one embodiment, a Session Migration and Sharing Function (SMSF) performs the migration or sharing of a M2M service layer session. Additionally, various forms of service layer session context may be used to enable the migration and sharing of M2M service layer sessions.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not constrained to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
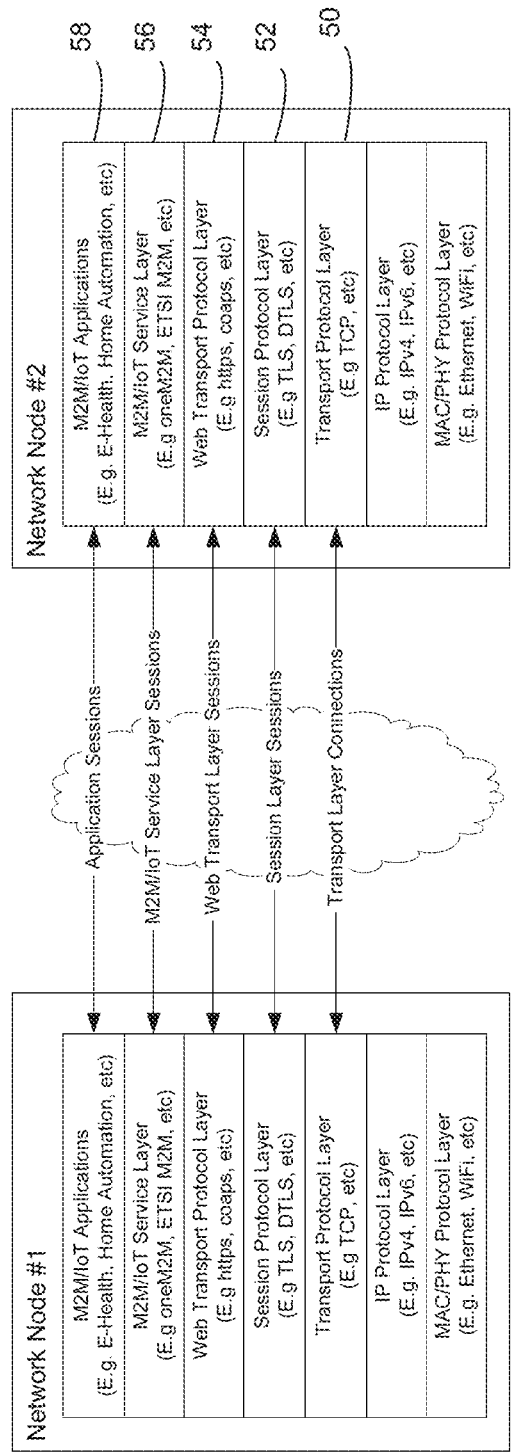
FIG. 1A illustrates an example of various layers in a network protocol stack.

As mentioned above, communication sessions may be implemented as part of protocols and services at various layers in a network protocol stack. For example, as illustrated in FIG. 1A, communication connections/sessions may be established between network nodes at the transport protocol layer 50 (e.g. TCP connection), session protocol layer 52 (e.g. TLS and DTLS sessions), Web transport protocol layer 54 (e.g. HTTP and CoAP sessions), machine-to-machine (M2M)/Internet of Things (IoT) service layer 56, and at the application layer 58 (e.g., application-specific sessions). The present application relates primarily to features targeting sessions at the M2M/IoT service layer 56.

A number of machine-to-machine (M2M) communications architectures have been proposed, including for example, the European Telecommunications Standards Institute (ETSI) M2M architecture described in ETSI TS 102 690 1.1.1 (2011-10), the oneM2M architecture described in oneM2M-TS-0001 oneM2M Functional Architecture-V-0.1.2, the machine-type communication (MTC) architecture developed by The Third Generation Partnership Project (3GPP), and the Lightweight M2M architecture (LWM2M) developed by the Open Mobile Alliance (OMA). Each of these architectures defines a service layer, which is a software middleware layer that supports value-added service capabilities through a set of Application Programming Interfaces (APIs) and underlying networking interfaces. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). In the 3GPP MTC architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or as some other component or module of another M2M architecture, the service layer may be implemented as a logical entity (e.g., software, computer-executable instructions, and the like) executing either on one or more standalone nodes of the network, such as servers, computers, or other computing devices or nodes, or as part of one or more existing nodes of such network. As an example, a service layer or component thereof may be implemented in the form of software running on a node or computing system having the general architecture illustrated in FIG. 37C or FIG. 37D described below.

Existing M2M service layers lack support for migrating or sharing M2M service layer session context from one service layer instance to another service layer instance. Similarly they also lack support for migrating or sharing M2M service layer session context between M2M application instances. This lack of functionality prevents a M2M service layer from supporting persistency of service layer sessions for use cases involving mobile session participants, changes in session participants addresses such as getting assigned new IP addresses, or use cases involving sharing service layer sessions with new session participants.

Lack of support for migrating M2M service session context can also create limitations or overhead for M2M sensors. For example, establishing a M2M service layer session from scratch can involve a significant number of M2M service layer requests that can include but are not limited to requests for registering to the service layer, creating container resources to store its sensor readings, creating subscriptions to the service layer to receive notifications it is interested in, configuring event generation conditions within the service layer, and configuring message delivery and handling policies within the service layer. By supporting the migration and sharing of service layer session context between service layer instances, this overhead on M2M sensors can be minimized.

Lack of support for migrating M2M service session context can also create limitations or overhead for M2M applications, lack of support for migrating M2M service session context can also prevent M2M service layers from providing value-added services such as migration/sharing of service layer data (e.g. resource representations) to service layer instances that are closer to the applications that are accessing and using the data.

Disclosed herein are methods, devices, and systems for migration or sharing of an existing M2M service layer session with one or more session participants.

Example Service Layer Session Management Mechanisms

Before discussing service layer session migration and sharing below, exemplary mechanisms for providing end-to-end (E2E) session support in an M2M service layer are provided below with reference to FIGS. 1-24. It is understood, however, that the service layer session migration and sharing concepts described hereinafter are by no means limited to the service layer session mechanisms disclosed in this section. Rather, these mechanisms are provided merely as one example of how service layer sessions may be implemented.

E2E M2M service layer sessions (service layer sessions) are sessions that allow an M2M service layer to participate in end-to-end security services, end-to-end quality of service functionality, end-to-end negotiation of settings or configuration, among other value-added session functionality, such as data aggregation and data analytics. The methods and functional architectures discussed herein (e.g., FIG. 4, FIG. 5, and throughout) may be implemented by a combination of software and hardware. The functional architectures may be implemented on a single device or distributed among multiple devices. The devices may be one or more of the devices as described below with regard to FIG. 37A through FIG. 37D.

Figure 1B:
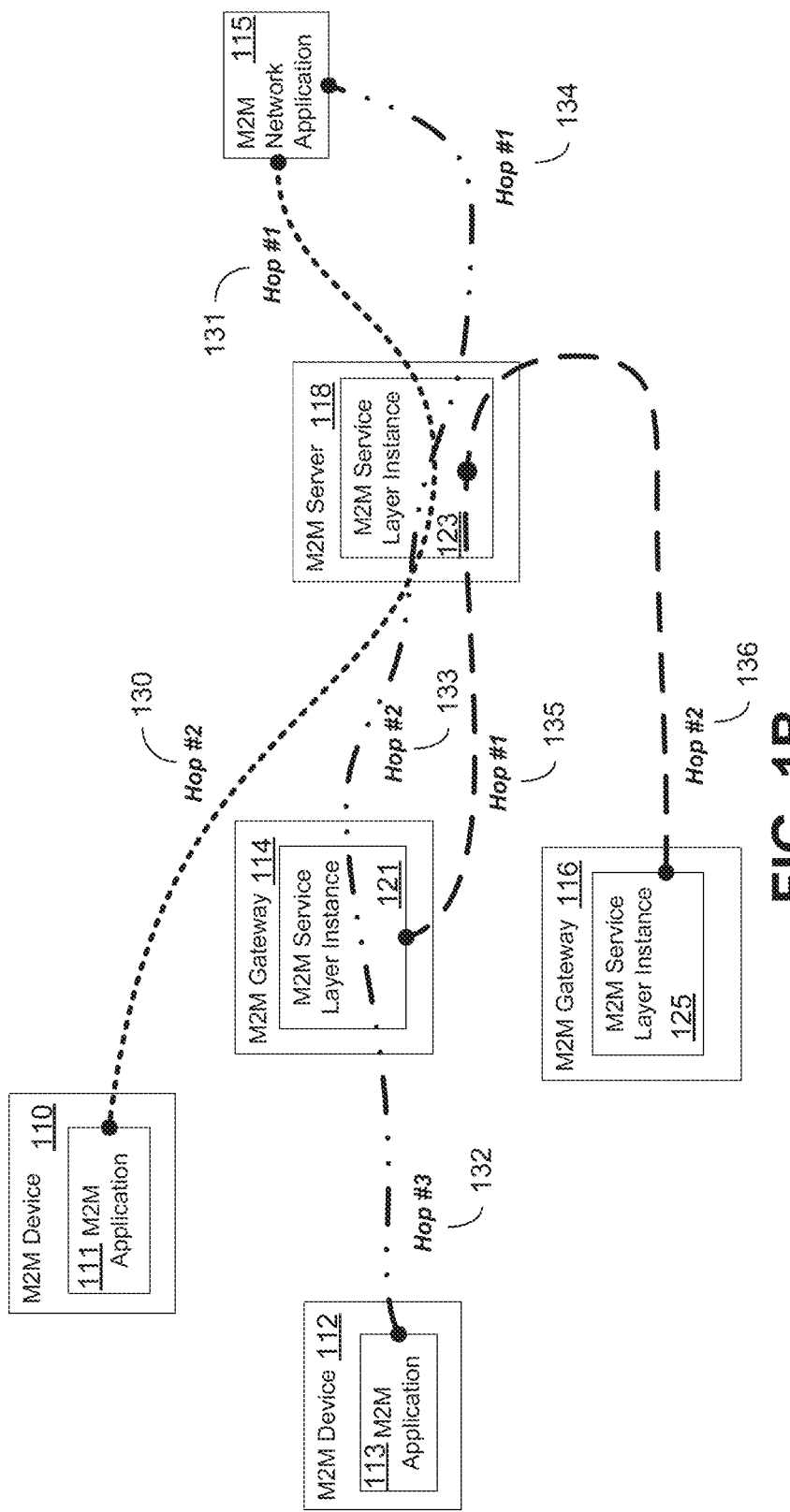
FIG. 1B illustrates an example end-to-end (E2E) machine-to-machine (M2M) service layer session.

For additional perspective, FIG. 1B illustrates exemplary E2E M2M service layer sessions that span multiple hops. As illustrated in FIG. 1B, an M2M device 110 may include an M2M application 111. M2M application 111 may be involved in an E2E M2M service layer session with M2M network application 115 (an endpoint M2M application that may be on a device such as a tablet, server, personal computer, or smartphone). The M2M service layer session of M2M application 111 includes multiple hops (hop 130 and hop 131) and is facilitated by M2M service layer instance 123 located on M2M server 118.

FIG. 1B also shows an example of a service layer session facilitated by two M2M service layer instances; one hosted on an M2M server and another on an M2M gateway. As shown in FIG. 1B, M2M application 113 of M2M device 112 may be involved in an E2E M2M service layer session with M2M network application 115. The M2M service layer session of M2M application 113 includes multiple hops (hop 132, 133, and hop 134) and is facilitated by multiple M2M service layer instances (M2M service layer instance 121 of M2M gateway 114 and M2M service layer instance 123 of M2M server 118). M2M service layer instance 121 and M2M service layer instance 123 may communicate with one another to manage the E2E M2M service layer session (e.g., establish the session or tear-down the session).

FIG. 1B also shows a service layer session that is involved in a session between two M2M gateways. As shown in FIG. 1B, M2M service layer instance 125 of M2M gateway 116 is in an M2M service layer session with M2M service layer instance 121 of M2M gateway 114. The M2M service layer session of M2M service layer instance 125 includes multiple hops (hop 136 and hop 135) and is facilitated by M2M service layer instance 123 of M2M server 118. Additional examples (not shown) are possible for E2E M2M service layer sessions. For example, an E2E M2M service layer session may be between two M2M servers that are multiple service layer hops away from one another. Another example may involve a direct E2E session between two endpoint applications, which does not flow through the M2M service layer but is facilitated by the M2M service layer. In other words, the service layer may provide application discovery and E2E session credential establishment services that applications may use to discover each other and dynamically provision credentials. As yet another example, an M2M service layer session may be established directly between an M2M application on a device and an M2M service layer instance on an M2M gateway. As another example, an M2M service layer session may be established directly between an M2M service layer instance on an M2M gateway and the service layer instance on an M2M server. As yet another example, an M2M service layer session may be established between three or more M2M applications on multiple devices, which might span one, two or more M2M service layer instances on, for example, one or more M2M gateways or servers.

Figure 2:
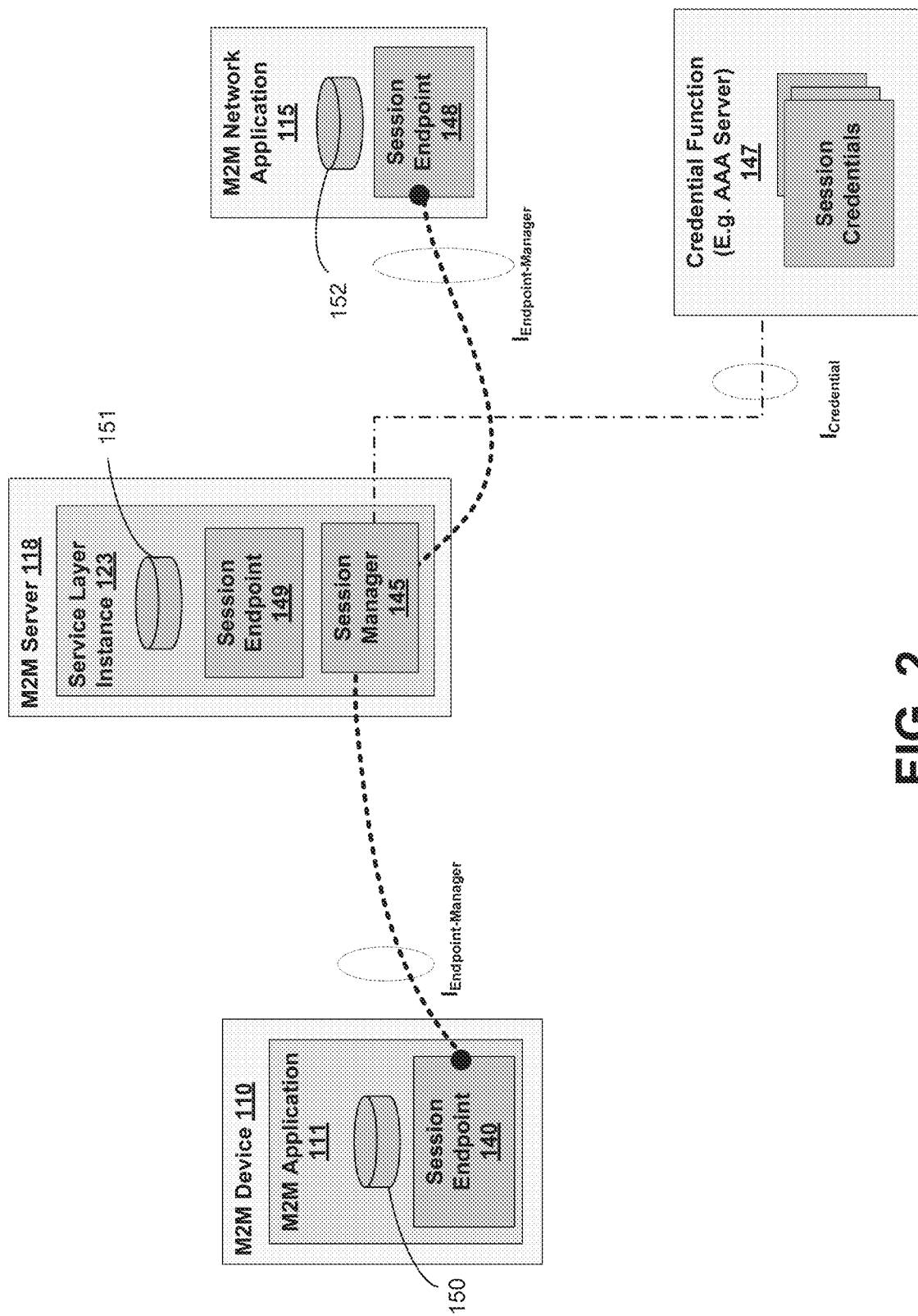
FIG. 2 illustrates an E2E M2M service layer session of FIG. 1B with additional details.

As described in more detail below, to support service layer sessions, one or more of the following M2M service layer architectural elements may exist: an E2E M2M service layer session manager function (session manager function), E2E M2M service layer session endpoint function (session endpoint function), E2E M2M service layer session credential bootstrapping function (session credential function), M2M Service layer session state (session state), and E2E M2M service layer session interfaces (session interface). FIG. 2 is an illustration of an M2M session in FIG. 1B, which includes the aforementioned M2M service layer architectural elements. M2M session endpoint functions, such as session endpoint function 140, session endpoint function 149, and session endpoint function 148, may respectively reside with M2M device 110, M2M server 118, and M2M network application 115. As discussed in more detail herein, a session endpoint function enables an M2M application or M2M service layer instance to participate in a service layer session. The session endpoint function interacts with a session manager.

With continued reference to FIG. 2, an E2E M2M service layer session manager (e.g., session manager 145) may reside within an M2M server (e.g., M2M server 118) or an M2M gateway. Although not shown in FIG. 2, the E2E M2M service layer session manager could also reside on an M2M device if the device itself hosts a service layer. As discussed in more detail below, a session manager supports establishment, tear-down, and management of service layer sessions. The session manager may perform translations of session addresses or identifier address (e.g., translating between a public session identifier and private session identifier). In addition, the session manager supports the capability to route service layer messages to other session managers such that these messages may be delivered to session endpoints not directly connected to it.

With further reference to FIG. 2, M2M service layer sessions may involve a session credential function, such as session credential function 147. Session credential function 147 may support provisioning or bootstrapping of service layer session related credentials and configuration information. Session managers or session endpoints may use these session credentials. The session credential function may reside on an AAA server and have a $I_{Credential}$ interface (e.g., $I_{Credential}$ 157) that uses the Diameter protocol. In addition, service layer sessions may include a session state, which any of the M2M devices may have, such as M2M device 110, M2M server 118, and M2M network 115. Session state is information that may be maintained by session managers or session endpoints and may be used for session management purposes.

Figure 3:
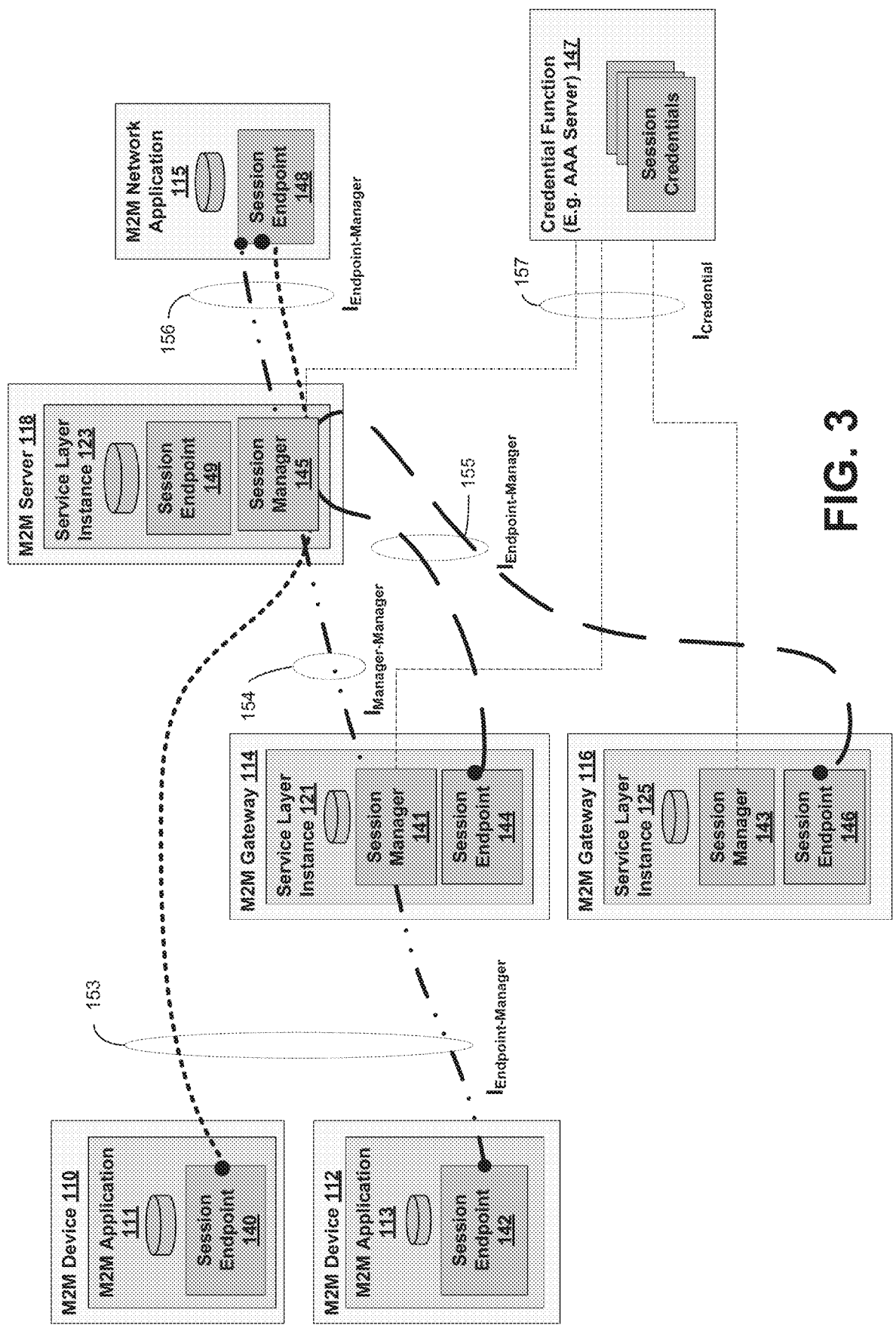
FIG. 3 illustrates E2E M2M service layer sessions of FIG. 1B with yet further details.

FIG. 3 illustrates multiple examples of service layer sessions of FIG. 1B that include the aforementioned M2M service layer architectural elements. As shown in FIG. 3, there may be an $I_{Manager-Manager}$ interface between session managers (e.g., $I_{Manager-Manager}$ 154) and an $I_{Endpoint-Manager}$ interface between a session endpoint and session manager (e.g., $I_{Endpoint-Manager}$ 153, $I_{Endpoint-Manager}$ 155, $I_{Endpoint-Manager}$ 156). As shown in FIG. 3, session manager 145 manages multiple M2M service layer sessions between multiple nodes.

Below are more detailed methods and system descriptions with regard to some of the functions of FIG. 3, such as a session credential function, a session manager, and session state information, among other things.

A session credential function supports bootstrapping of session security credentials ("security credentials" or "session credentials") to the individual session endpoints, as well as the session managers making up the service layer session that spans multiple service layer hops, where the service layer hop may be defined as a direct service layer communication link between two or more of the following: a service layer instance or application. As discussed herein, session credentials and security credentials for securing the session are used synonymously. A method (not shown) of provisioning the session credentials may be a pre-provisioning step that is performed by the manager or owner of the session credential function. For example, per each service layer instance, a pool of session credentials may be pre-provisioned into the session credential function. Thereafter the session manager may make requests to the session credential function to allocate session credentials when required.

Figure 4:
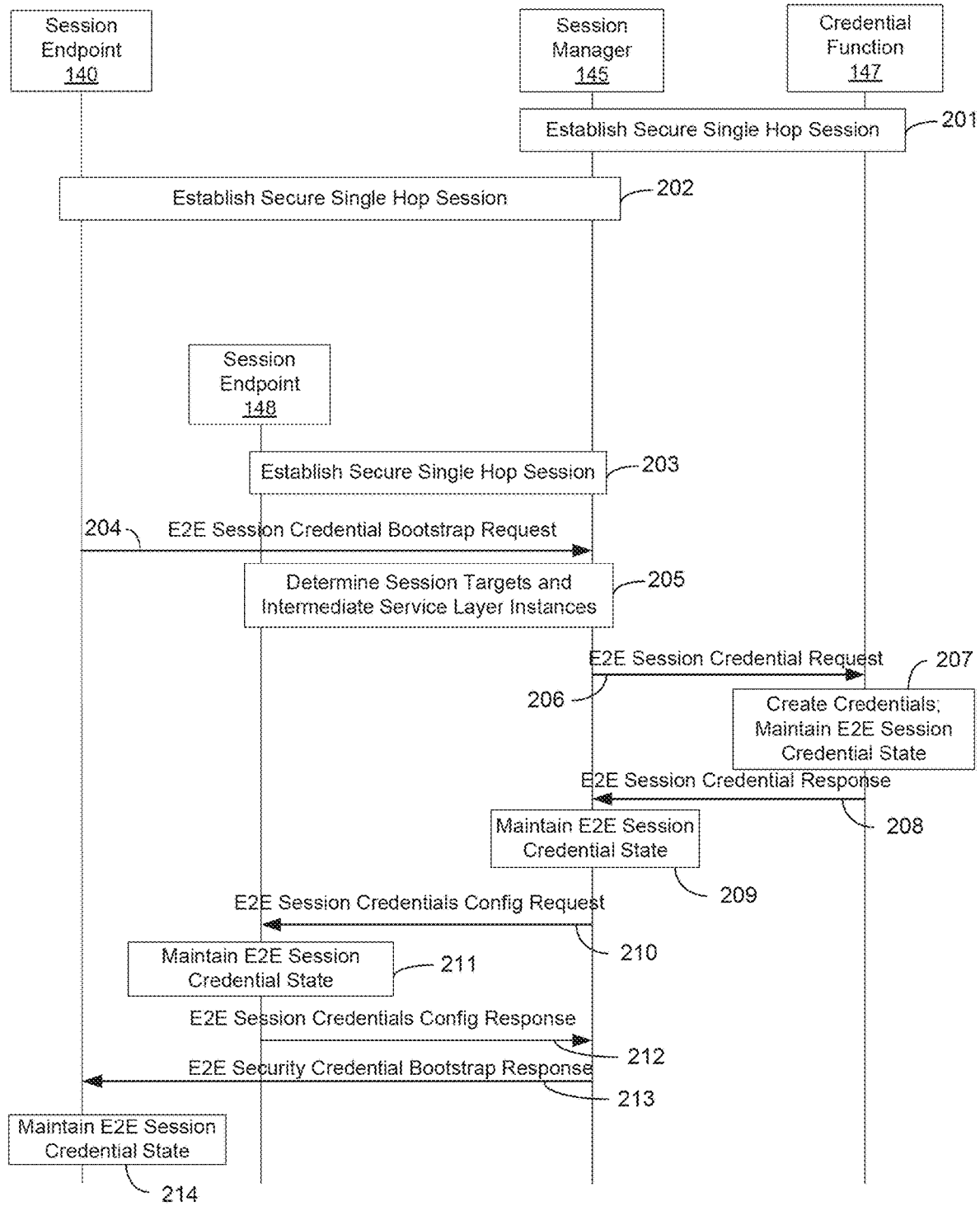
FIG. 4 illustrates an exemplary method of session credential function bootstrapping.

FIG. 4 illustrates an exemplary method of session credential function bootstrapping, which configures the session credentials between different session participants, which may reside on an M2M device, M2M server, M2M gateway, or the like. It may be assumed for FIG. 4 that session endpoint 140 is part of the initiating application, while session endpoint 148 is part of the targeted application.

At step 201, step 202, and step 203, a secure single-hop session may be established. At step 201, the secure single-hop session is between session manager 145 and session credential function 147. At step 202, the secure single-hop session is between session manager 145 and session endpoint 140. At step 203, the secure single-hop session is between session manager 145 and session endpoint 148. The secure single-hop sessions of step 201, step 202, and step 203 may be established by conventional service layer bootstrap and registration procedures supported in architectures such as ETSI M2M and OMA LWM2M.

At step 204, session endpoint 140 may query session manager 145 (e.g., provide a session credential bootstrap request) to discover other session endpoints that are available and their corresponding attributes or request a particular session endpoint. An alternative to explicitly discovering other session endpoints is for session endpoint 140 to provide information within the bootstrap request of step 204, such as the type of session endpoints it wishes to establish a session with and let the session manager decide the best session endpoint. A session credential bootstrap request may be initiated by a session endpoint that is associated with an application, gateway, server, or the like, that wants to establish a service layer session. The session credential bootstrap request may contain information, such as one or more targeted session endpoints that the initiating session endpoint is looking to establish a service layer session with. In addition, the session credential bootstrap request may contain information with regard to a desired type of session endpoint, which a session manager may use to select one or more targeted session endpoints to distribute service layer session credentials. The session credential bootstrap request may also include information such as the required QoS of the session, location of a targeted session endpoint, and amount that the initiating application is willing to pay, among other things.

At step 205, session manager 145 parses the session credential bootstrap request of step 204 to determine the targeted session endpoints it is permitted to distribute a session credential to, or alternatively, which session endpoints it may ask to bootstrap with session credential function 147. In addition, session manager 145 determines any intermediate service layer instances (e.g., M2M gateways or M2M servers with service layer instances) that may be involved in the service layer session. The determination of the targeted session endpoints and intermediate service layer instances may be performed in different ways. For example, session manager 145 may use information included with the session credential bootstrap request at step 204, such as a list of targeted session endpoints. Alternatively, history or context information maintained as session state by the requesting session endpoint (e.g., session endpoint 140) or session policies may also be used. Using the session state, session manager 145 may further qualify which targeted session endpoints it selects to distribute session credentials to.

With continued reference to FIG. 4, at step 206, session manager 145 may send an E2E M2M session credential request to session credential function 147. The credential request of step 206 may include a request to allocate a set of session credentials for the determined targeted session endpoints and the determined service layer instances of step 205. At step 207, session credential function 147 creates a set of session credentials for session manager 145, session endpoint 148, and session endpoint 140. Additionally at step 207, credential function 147 maintains a state of the session credentials. The credential state may be sent to any application, instance, or the like that may desire session credentials of an already created service layer session. At step 208, session credential function 147 sends to session manager 145 an E2E M2M session credential response. The session credential response may include a session credential that may be allocated to any number of applications or service layer instances. Alternatively, the credential response may include a set of session credentials, each session credential in the set of session credentials may be particularly assigned to service layer instance or application that is involved the service layer session that is desired to be created.

At step 209, upon receiving the session credentials of step 208, session manager 145 may store the session credentials locally such that session manager 145 may also use the session credentials. For example, session manager 145 may encrypt or decrypt application data flowing through the service layer instance (e.g., service layer instance 123) and provide value-add data services. At step 210, session manager 145 sends to session endpoint 148 an E2E session credentials configuration request, which may include the session credentials of step 208. The E2E session credentials configuration request may also include a request for the ability of session endpoint 148 to participate in service layer session with session endpoint 140. For example, the session endpoint 148 may have policies in place that may not allow for service layer session at that time. At step 211, session endpoint 148 maintains session credential state for the proposed session. At step 212, session endpoint 148 sends to session manager 145 an E2E session credentials configuration response, which may include confirmation of receiving and implementing the sent session credentials.

With further reference to FIG. 4, at step 213, session manager 145 may send to session endpoint 140 an E2E security credential bootstrap response. E2E security credential bootstrap response of step 213 may ultimately be in response to the request of step 204 and may include the session credentials, as well as a list of targeted session endpoints with the session credentials for a service layer session. At step 214, upon receiving the session credentials, session endpoint 140 may maintain the state information of the received credentials.

With continued reference to FIG. 4, the session endpoints (e.g., session end point 140 and session endpoint 148) may need to repeat the bootstrapping operation periodically in order to refresh the session credentials. This periodic refresh may be based on a lifetime associated with the session credential. Securely bootstrapping with the common session credentials may establish a secure chain of trust between the initiating session endpoint 140, local session manager 145 (directly registered session manager for session endpoint 140), any intermediate service layer session managers (not shown here, but at times may be applicable), and one or more targeted E2E M2M service layer session endpoints (e.g., session end point 148). This secure E2E chain of trust may be layered upon the secured underlying conventional single-hop M2M service layer sessions as well as the secured underlying transport layer and access network connections that may exist. Alternatively, the aforementioned secure E2E chain of trust may be established by having each session endpoint and session manager authenticate with the session credential function rather than with one another in a hop-by-hop fashion.

Figure 37A:
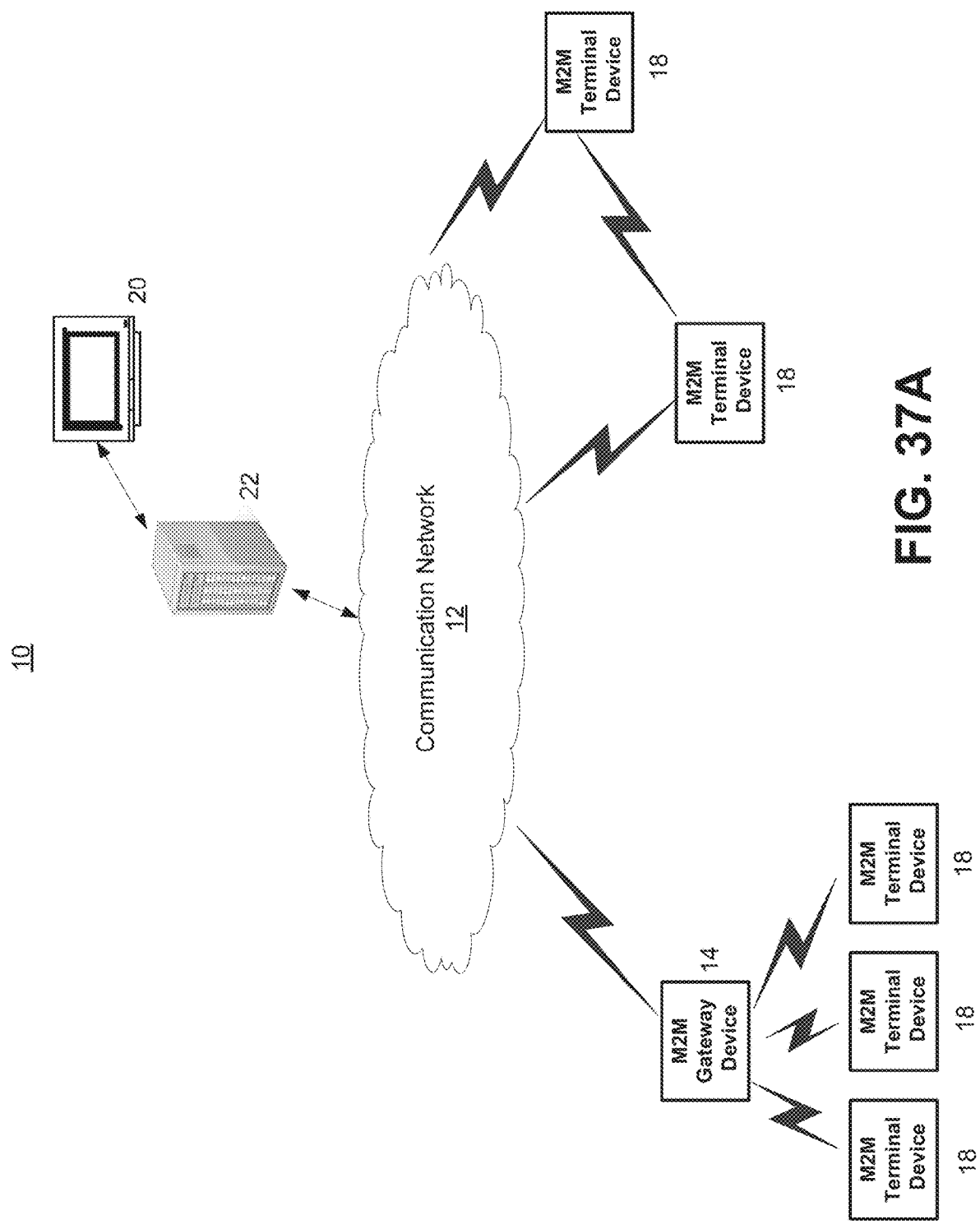
FIG. 37A is a system diagram of an example machine-to-machine (M2M), Internet of Things (IoT), or Web of Things (WoT) communication system in which one or more disclosed embodiments may be implemented.
Figure 37B:
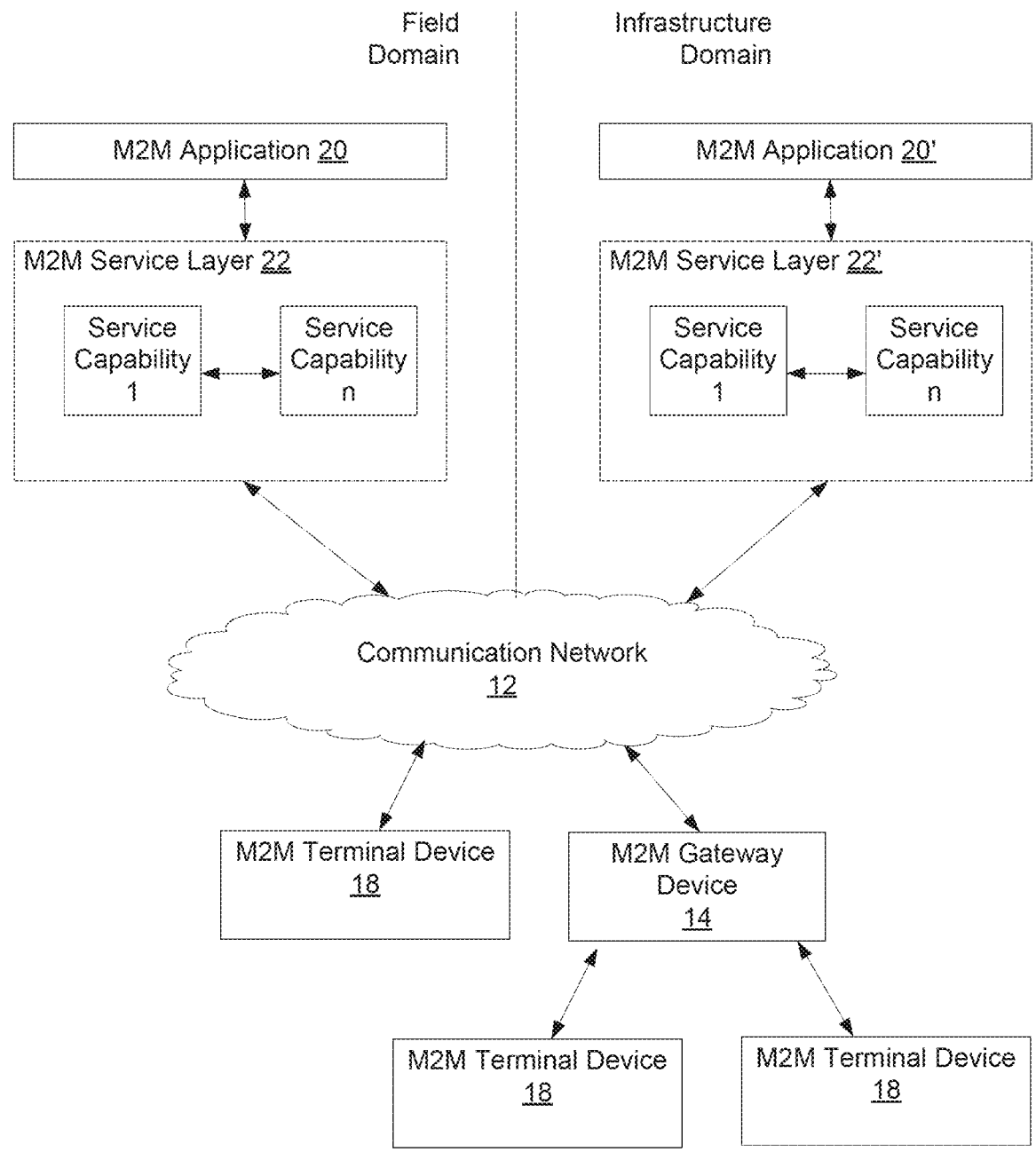
FIG. 37B is a system diagram of an example architecture that may be used within the M2M/IoT/WoT communications system illustrated in FIG. 37A.
Figure 37C:
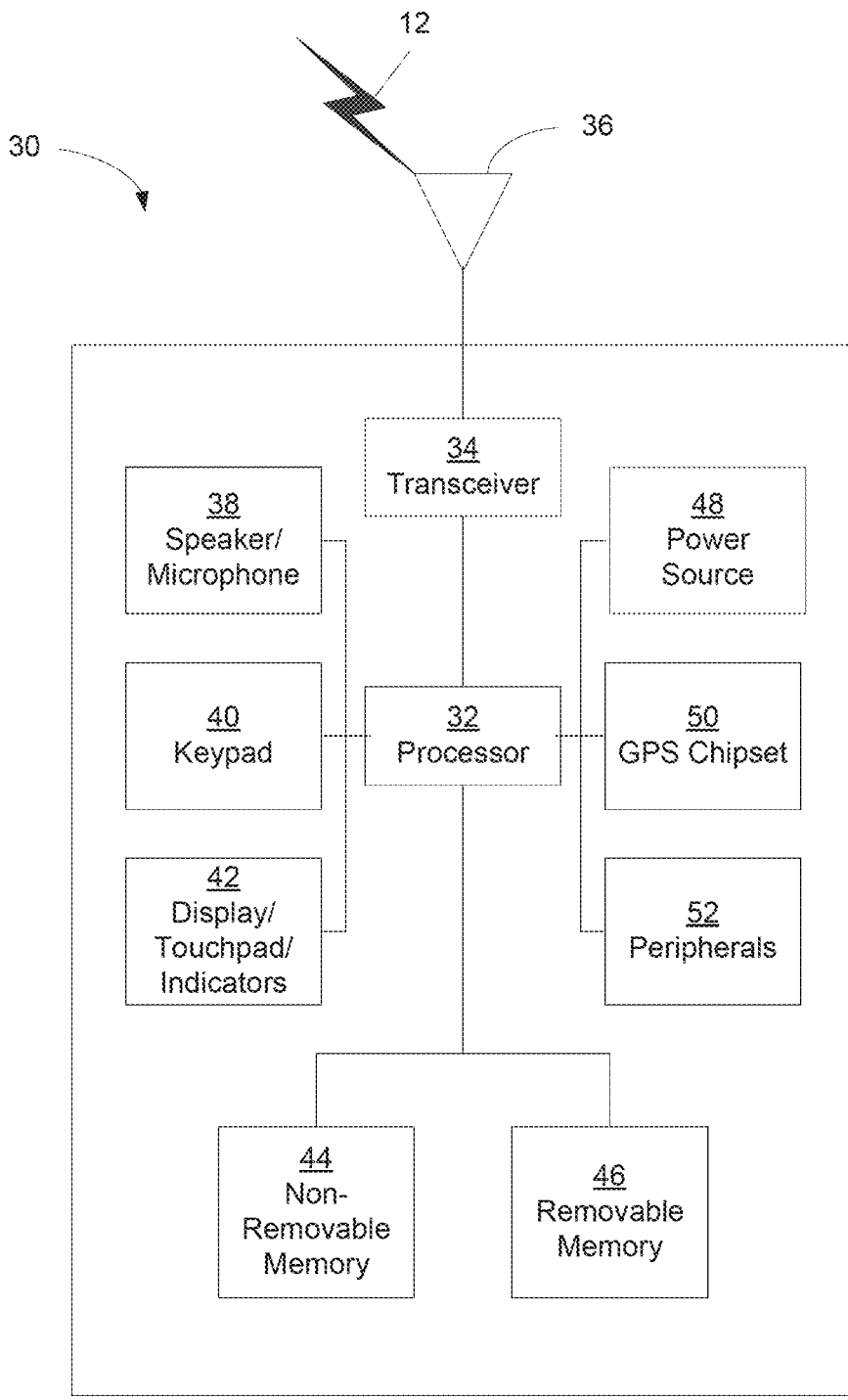
FIG. 37C is a system diagram of an example M2M/IoT/ WoT terminal or gateway device that may be used within the communications system illustrated in FIG. 37A.
Figure 37D:
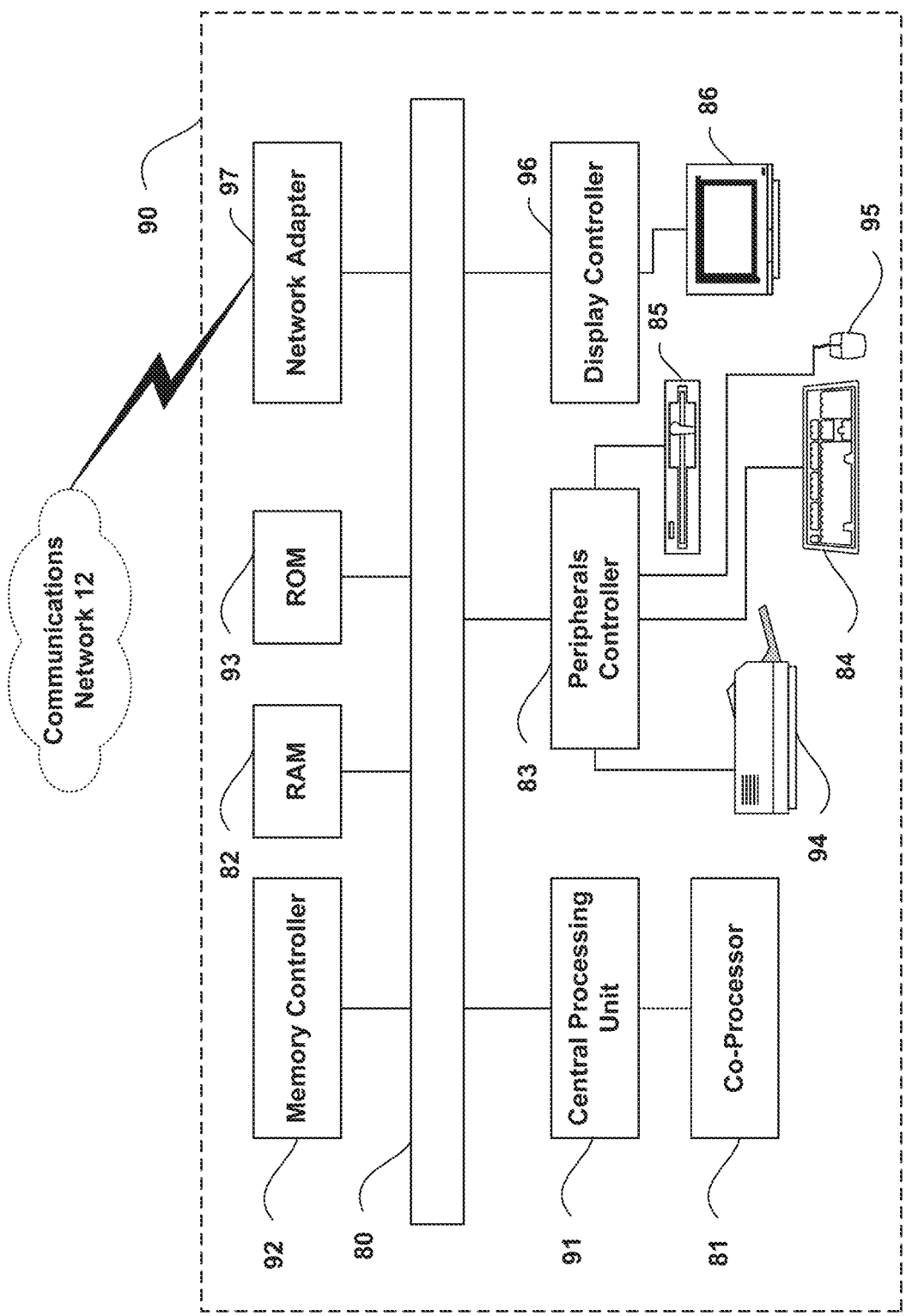
FIG. 37D is a block diagram of an example computing system in which aspects of the communication system of FIG. 37A may be embodied.

It is understood that the entities performing the steps illustrated in FIG. 4 are logical entities that may be implemented in the form of software (i.e., computer-executable instructions) stored in a memory of, and executing on a processor of, a network node or computer system such as those illustrated in FIG. 37C or FIG. 37D. That is, the method(s) illustrated in FIG. 4 may be implemented in the form of software (i.e., computer-executable instructions) stored in a memory of a network node, such as the node or computer system illustrated in FIG. 37C or FIG. 37D, which computer executable instructions, when executed by a processor of the node, perform the steps illustrated in FIG. 4.

Session credentials may be bootstrapped to the initiating M2M application, as well as to the M2M service layer instance it is registered to, as well as one or more targeted M2M applications. The credentials may also be bootstrapped to other M2M service layer instances, based on service layer routing policies, context information, or history information (e.g. if other M2M service layer instances exist in a multi-hop path between the initiating M2M application and the targeted M2M application).

Figure 5:
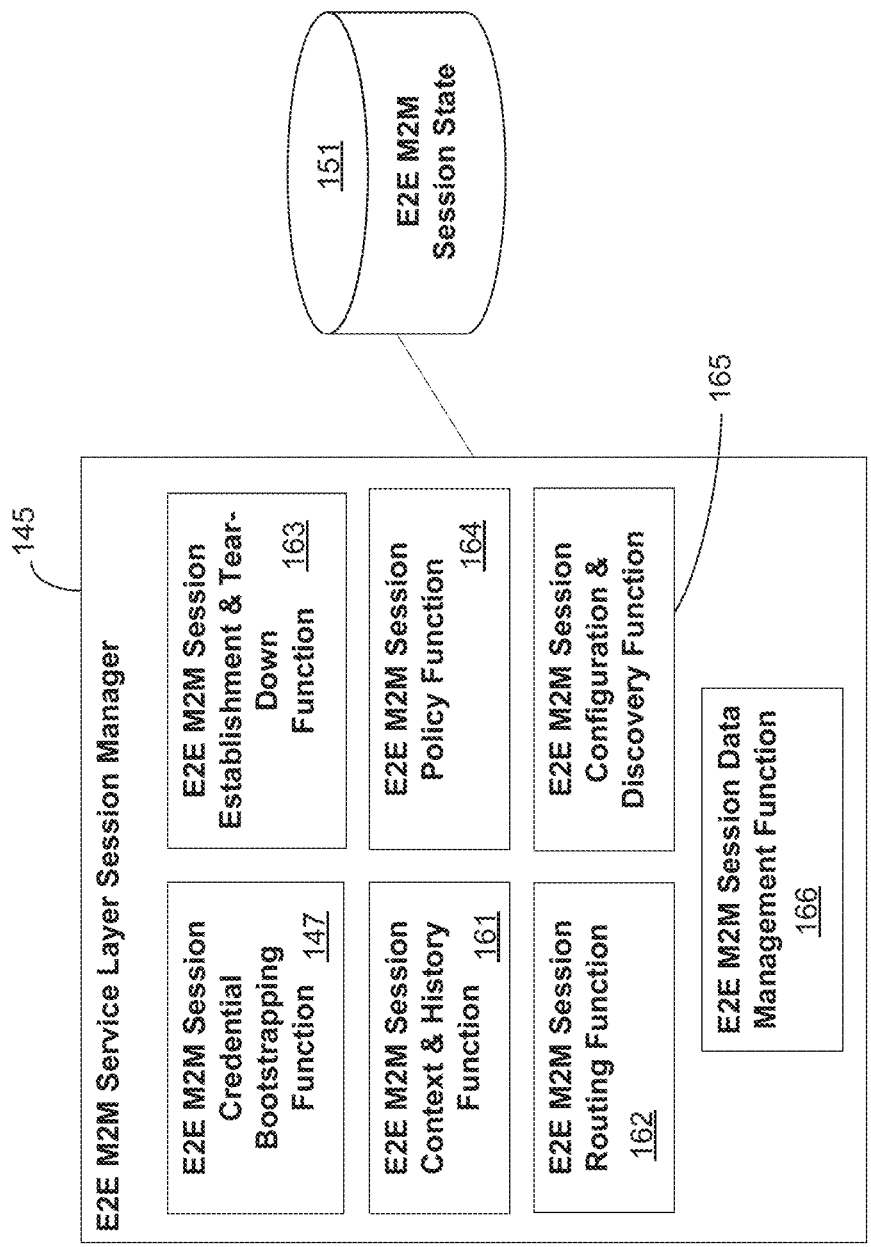
FIG. 5 illustrates a functional architecture for an E2E M2M service layer session manager.

FIG. 5 illustrates a functional architecture for an E2E M2M service layer session manager (e.g., session manager 145). As shown in FIG. 5, session manager 145 may include a session credential function 147, an E2E M2M session context and history function 161 (session context function), an E2E M2M session routing function 162 (session routing function), an E2E M2M session establishment and teardown function 163 (session establishment function), an E2E M2M session policy function 164 (session policy function), an E2E M2M session configuration and discovery function 165 (session configuration function), an E2E M2M session data management function 166 (session data management function), and a session state 151. In an embodiment, session manager 145 may be supported as a capability of an M2M service layer instance (e.g., service layer instance 123). In another embodiment, session manager 145 may be supported as a separate service(e.g., a standalone Web service), which an M2M service layer instance may interface with. Discussed in more detail herein are descriptions of each of the functions of the session manager.

E2E M2M session establishment and teardown function 163 (session establishment function) processes requests for establishing or tearing down service layer sessions. A session endpoint may send requests to session establishment function to establish a service layer session with one or more targeted session endpoints. If credentials have been successfully bootstrapped or provisioned or if security is not required then session establishment function may proceed with establishing or tearing down a service layer session when requested. An E2E M2M service layer session can be established by layering a service layer session over top of existing single-hop M2M service layer sessions or transport layer sessions. This can be achieved by maintaining and/or distributing session state for each session endpoint as well as for each intermediate session manager along the service layer session path. This session state may include information such as the session security credentials, session routing information, session context, and session policies. Configuration of session state on each session endpoint and session manager may be managed by a designated session manager (e.g., the session manager closest to the session endpoint that initiates a service layer session establishment request).

Figure 6:
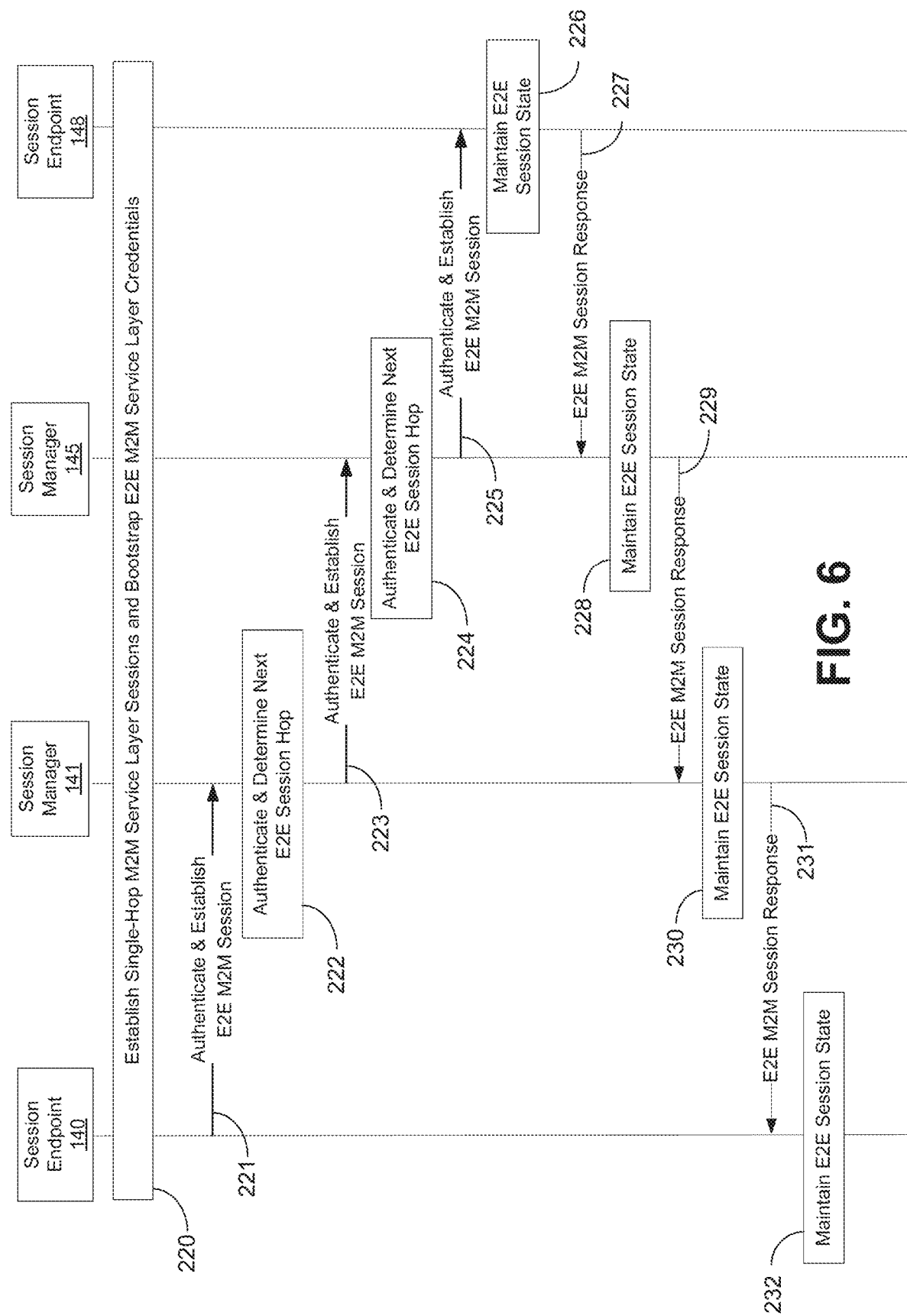
FIG. 6 illustrates an exemplary E2E M2M service layer session establishment call flow.

FIG. 6 illustrates an example E2E M2M service layer session establishment call flow. In this example, session endpoint 140 initiates a service layer session with session endpoint 148 that is three service layer hops away (i.e., separated by two M2M service layer instances). At step 220, session endpoint 140, session endpoint 148, and the session managers (e.g., session manager 141 and session manager 145) have been bootstrapped or provisioned with E2E M2M service layer session credentials, as described herein (see example regarding FIG. 4). At step 221, session endpoint 140 sends to session manager 141 a request to authenticate and establish a service layer session. The request of step 221 may include session credentials received at step 220. In an embodiment (not shown) session endpoint 140 may send multiple requests to one or more session managers to establish an E2E M2M service layer session with multiple targeted session endpoints (e.g., a group session).

At step 222, session manager 141 authenticates session endpoint 140 based on the session credentials of session endpoint 140. In addition, at step 222, session manager 141 determines the next hop to forward the request to authenticate and establish the service layer session. Session manager 141 determines the next hop based on information contained in the request, locally stored context and polices, and by collaborating with other session managers in a network. In this example, the next hop is another session manager (e.g., session manager 145). As shown in FIG. 6, at step 223, session manager 141 sends to session manager 145 a request to authenticate and establish the service layer session. The request of step 223 may include session credentials received at step 220. At step 224, session manager 145 authenticates session manager 141 based on the session credentials of session manager 141 and determines the next hop to forward the request to authenticate and establish the service layer session. At step 225, session manager 145 sends to session endpoint 148 a request to authenticate and establish the service layer session, as similarly done at step 221. At step 226, session endpoint 148 authenticates session manager 145 based on the session credentials, determines that session endpoint 140 desires to communicate with it, and authenticates the session endpoint 140 based on the session credentials. Also at step 226, session endpoint 148 may store session state information, which is described in more detail below.

At step 227, session endpoint 148 sends to session manager 145 an E2E session response. The E2E session response of step 227 may include a response confirming the establishment of a service layer session with session endpoint 140, as well as other service layer session state information. The E2E session response of step 227 is continually forwarded to session endpoint 140 at step 229 and step 231. As the response of step 225 is forwarded back for each hop, service layer session state information is stored by each session manager at step 228 and step 230, as well as the initiating session endpoint (session endpoint 140) at step 232. This service layer session state information is used to maintain the service layer session such that the service layer session may be used to exchange messages E2E between the session endpoints via the session managers.

With continued reference to FIG. 6, a session manager (e.g., session manager 141 or session manager 145) may dynamically change the routing path of service layer session messages. For example, if the single-hop session between session manager 141 and session manager 145 breaks down, then the upstream session manager, which is session manager 141 in this case, may recover by establishing a new single-hop service layer session with another neighboring session manager (if available) that happens to have an established single-hop session with the targeted session endpoint (e.g., session endpoint 148). See below for further details on E2E M2M service layer session routing. In addition, although not shown in FIG. 6 (see FIG. 3), an alternative to session endpoints and session managers authenticating with one another is for them to authenticate directly with a session credential function in the network instead. A trusted session credential function could be a central node in the network in which session endpoints and session managers can authenticate with. By doing this they can be authenticated by this function rather than by each other.

Tear-down of a service layer session may work in a similar fashion by removing service layer session state information on the session endpoints and session managers. During a tear down of the service layer session, service layer session state information may be deleted starting at the target session endpoint towards the initiating session endpoint, which also removes service layer session state information on each session manager. It is understood that the entities performing the steps illustrated in FIG. 6 are logical entities that may be implemented in the form of software (i.e., computer-executable instructions) stored in a memory of, and executing on a processor of, a network node or computer system such as those illustrated in FIG. 37C or FIG. 37D. That is, the method(s) illustrated in FIG. 6 may be implemented in the form of software (i.e., computer-executable instructions) stored in a memory of a network node, such as the node or computer system illustrated in FIG. 37C or FIG. 37D, which computer executable instructions, when executed by a processor of the node, perform the steps illustrated in FIG. 6.

Figure 7:
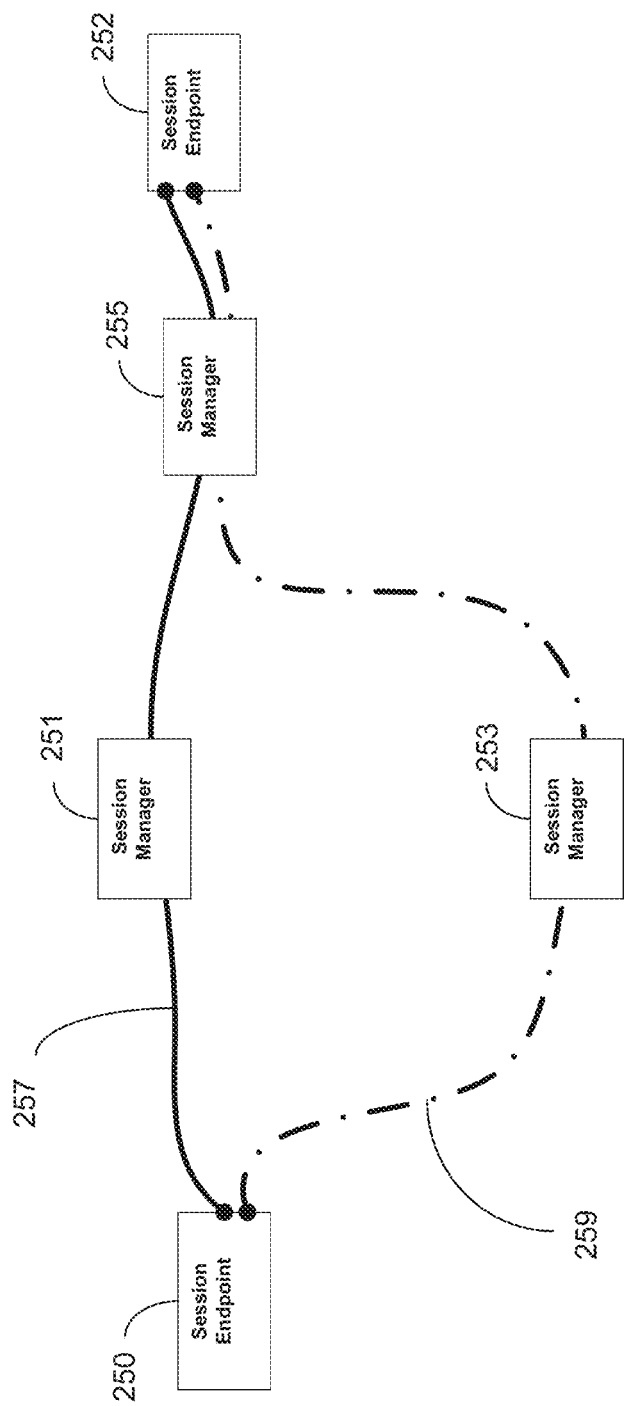
FIG. 7 illustrates an exemplary service layer session between two session endpoints with multiple routes.

Discussed here are more details with regard to E2E M2M service layer session routing (session routing), as also shown in the functional architecture of FIG. 5. FIG. 7 illustrates an exemplary single service layer session between two session endpoints that has multiple service layer session routes between the service layer session endpoints.

Each E2E M2M service layer session route may consist of a different series of single-hop M2M service layer sessions, which interconnect the M2M session endpoints and M2M session managers with one another. FIG. 7 illustrates one service layer session that may take multiple routes, such as route 257 (i.e., solid line) or route 259 (i.e., dotted lines). Multiple service layer session routes between session endpoint 250 and session endpoint 252 may provide redundancy, fault protection, and even different levels of quality of service. Session manager 251, session manager 253, and session manager 255 may support an E2E M2M service layer session routing function (session routing function) to route messages associated with the designated service layer session to one of multiple supported session routes. The session routing function may support context awareness as well as policy based routing. For example, the session routing function of session manager 255 may load balance a designated service layer session across different session paths by keeping a history of past messages and the routes chosen for these messages. The session routing function of session manager 255 may adapt service layer routes based on loading conditions or faults, which may provide better resiliency and QoS. The session routing function may support interfacing with underlying access networks to share information, such that the information may be taken into account for service layer routing decisions as well as underlying access network routing decisions.

Another form of session routing that may be supported is routing between multiple underlying transport sessions or access network connections that may be associated with a service layer session. To support this, service layer session manager 255 may have an interface to underlying transport/access network routing functions. For example, an M2M device or M2M gateway may support multiple radio access technologies (e.g., Wi-Fi, Cellular, etc.). An E2E service layer session may be layered over top of multiple single hop M2M service layer sessions. Each single hop service layer session may have multiple underlying transport or access network connections associated with it. Service layer session manager 255 may collaborate with underlying transport or access network routing functions to manage the routing and selection of the underlying transport or access network connection to use on a single-hop by single-hop basis.

With continued reference to FIG. 7, alternatively, a service layer may collaborate with underlying network routing functions to manage the routing and selection of which underlying transport or access network connection to use on an E2E basis. In doing so, security and QoS may be managed in an E2E fashion rather than just on a hop-by-hop basis. For example, this E2E management may be performed by distributing routing policies from the session manager (e.g., session manager 255) responsible for establishing the service layer session to the rest of the session managers (e.g., session manager 251 and session manager 253) associated with the designated service layer session. E2E management enables routing optimizations that may be challenging to support with single-hop routing. For example, if the device hosting the session endpoint 250 comes into close proximity to the device hosting the session endpoint 252, then E2E routing optimizations may be dynamically performed. In another example, instead of routing service layer session messages from one application to another application through both an M2M server and M2M gateway, E2E routing optimization may be performed to optimize an E2E route by routing the service layer session messages through a shared M2M gateway in close proximity to both applications or even establish a direct peer-to-peer route between the applications.

Below are further details with regard to the functional architecture as shown in FIG. 5. The functional architecture may be implemented on a single device or distributed across multiple devices. E2E M2M service layer session context and history function (session context function) 161, shown in FIG. 5, may collect, interpret, share, and process E2E M2M service layer session context and history information. Session managers and session endpoints may leverage session context information to make context aware decisions with regards to the use and management of service layer sessions. In addition, session context information may be leveraged for purposes such as billing and charging, as well as history and tracking. The session context function 161 also supports sharing of session context information between sessions managers and/or endpoints.

Some forms of E2E M2M service layer session context information may include one or more of the following: 1) past service layer session routing decisions; 2) dynamically changing cost or pricing information related to service layer sessions and the underlying transport and access network connections that are leveraged; 3) location of M2M devices and gateways associated with service layer sessions; 4) access network congestion information and available bandwidth for access network connections associated with service layer sessions; and 5) availability of M2M devices and gateways associated with a designated service layer session (e.g., whether or not an M2M device or gateway is sleeping or not)

Some context aware service layer session related decisions may include one or more of the following: 1) context aware session routing; 2) context aware service layer session load balancing; 3) context aware service layer session store and forwarding of messages (e.g., while session endpoints are unavailable); and 4) context aware service layer session proactive pre-fetching and caching of data from session endpoints and caching it within the service layer for more efficient access.

FIG. 5 also shows an E2E M2M service layer session policy function (session policy function) 164. Session policy function 164 supports session policy configuration, management, and sharing. With the use of service layer session policies, session managers may more intelligently manage service layer session communication between session endpoints. In addition, session policy function 164 supports sharing of service layer session policies between session managers or session endpoints. Some service layer session policies may include, one or more of the following: 1) session routing policies; 2) E2E M2M service layer session store-and-forward policies; 3) service layer session pre-fetch policies; 4) service layer session establishment policies; 5) service layer session tear-down policies; 6) session context policies that determine the context to collect, how to interpret context, how to factor context into decision making, etc.; and 7) service layer session security policies that may control authorization and access controls to information associated with session.

FIG. 5 also shows an E2E M2M service layer session configuration and discovery function 165 (session configuration) supports configuration and discovery capabilities for E2E M2M service layer session attributes and parameters. Configuration of service layer session attributes and parameters may be used to control and customize a service layer session during establishment as well as during normal service layer session operation. Discovery of service layer session state information may be used to find available service layer sessions based on a desired set of criteria. This may help M2M applications and M2M service layer instances find existing service layer sessions already in progress or candidates that support service layer sessions along with corresponding session criteria or attributes. Some types of E2E M2M service layer session configuration and discovery may include one or more of the following: 1) configuration of service layer session state hosted on a session endpoint by a session manager and vice versa; 2) configuration of service layer session state hosted on a session manager by another session manager; 3) discovery of service layer session state hosted on a session manager by a session endpoint and vice versa; and 4) discovery of service layer session state hosted on session manager by another session manager.

FIG. 5 also shows an E2E M2M session data management function 166 (session data management function) that may support management of data contained within service layer session messages that are processed by a service layer instance. Leveraging session credentials that have been bootstrapped into the service layer instance, this function supports decryption of data contained within received service layer session messages and encryption of service layer session data that is contained within service layer session messages forwarded to service layer instances and applications. Once the data is decrypted, this function supports interfacing and passing this data to other functions in the service layer instance such as data analytics function, data aggregation function, or data mash-ups, among other things. Supporting these types of functions on intermediate M2M service layer instances enables these service layer instances to support value-add data services on messages flowing through the network, which may make the network more efficient and help reduce the complexity of session endpoint applications as well.

FIG. 5 also shows an E2E M2M session state 151 (session state) which may include one or more of the following: E2E M2M service layer session identifier (session identifier), E2E M2M service layer session security credentials (session security credentials), E2E M2M service layer session descriptor (session descriptor), E2E M2M service layer session routing information (session routing information), E2E M2M service layer session context or history (session context), and E2E M2M service layer session policies (session policies). A session identifier may be used by a session manager and session clients (e.g., session applications or service layer instances) to identify a service layer session. The session identifier may be an arbitrary and unique alpha-numeric string that can optionally be hashed using session credentials such that it can only be encrypted/de-encrypted by its corresponding session managers, session endpoints, and session credential function.

A session identifier may also be a descriptive alpha-numeric string that is indicative of the corresponding session type and/or the functionality associated with the session. This descriptive session identifier may be used for session discovery purposes and facilitate sharing of session info (for example, sensor123-Measurements, LightingABC-Control, etc.). The descriptive session identifier may help support dynamic formation of group sessions, as well. The descriptive session identifier may be optionally hashed using session credentials such that descriptive session identifier can only be encrypted/decrypted by its corresponding session managers, session endpoints, and session credential function.

A session identifier may recycle portions of other identifiers. Session endpoints typically support a unique identifier that is assigned to them. For example, an M2M application is allocated a unique application identifier when registering to an M2M service layer instance. Similarly an M2M service layer instance is either provisioned with a unique identifier or dynamically configured with one during a bootstrapping procedure. These unique identifiers may be used to create E2E M2M service layer session identifiers. Session endpoints may exchange unique identifiers with one another during session establishment and these unique identifiers may be concatenated to form a unique session identifier between the two session endpoints.

Session state may include security credentials associated with service layer sessions (for example, E2E security certificates, public keys, etc.) A service layer session may support an independent set of credentials (e.g., established and distributed by E2E M2M service layer session credential function) or it may optionally leverage security credentials from underlying sessions or connections. For example, security credentials from underlying single-hop M2M service layer sessions, transport layer sessions, and/or access network connections may be leveraged.

Session state may include a session descriptor, which is information describing the session that may be used by existing session participants (e.g., session endpoints, session managers, or session credential function) or by prospective session participants to discover an existing service layer session. A session descriptor may be a description for each session participant (e.g. device identifiers, type of participant, services that participant supports, interface requirements of participant, type of compression used, etc.). A session descriptor may be description of each underlying single-hop session that is used to construct the service layer session (e.g., information regarding the individual single-hop M2M service layer sessions making up the multi-hop E2E M2M service layer session, information regarding underlying transport or access network connections, etc.).

Session state may include routing information. The session routing information may describe the next hop E2E M2M service layer session endpoint or session manager to route incoming session messages to. The following are forms of routing information that may be stored as a session state: a session identifier of an M2M application or M2M service layer instance; a single-hop M2M service layer session identifier; an application protocol identifier (e.g. a Uniform Resource Identifier (URI), Uniform Resource Locator (URL), Uniform Resource Name (URN), etc.); a transport layer session identifier (TLS session identifier); a network layer address (e.g. IP address); an access network identifier (e.g. International Mobile Subscriber Identity (IMSI), Mobile Subscriber Integrated Services Digital Network-Number (MSISDN), media access control (MAC) Address, etc.); or a list of available underlying network interfaces, access network connections/bearers, transport layer connections, etc..

Session state may include E2E M2M Service Layer Session Context/History, which may be context information related to and/or history of past service layer transactions performed using a service layer session. Examples include keeping track of the type, number, rate, size, etc. of resources targeted by the session endpoints or keeping track of the different service layer sessions that an application establishes (e.g. rate, type, etc.).

Session state may also include session policies that define rules for how an E2E M2M service layer session manager or endpoint generates or processes E2E M2M service layer session messages. For example, policies may include service layer QoS policies routing policies, service layer store-and-forward policies, service layer access control policies, etc. Policies may also be used to define how a session manager processes the data associated with a message (e.g., if the data is read-only or if the data can be aggregated with other data, etc.). Policies may also be used to define service layer routing rules for a session manager (e.g., some session must be routed through a specified session manager so that session manager can perform such functions as charging, security, tracking/inspection, etc.).

One or more of the following can maintain the disclosed session state: a session manager, a session endpoint, or a session credential function. The session state may be used for the setup, management, and tear down of service layer sessions. Session state may be dynamically created. For example, session identifiers may be included in each message to correlate the message with a particular service layer session. Session endpoints or session managers may create and store session state based on message they send or receive and index this state based on the session identifier. A service layer session manager, for example, may store this state and factor it into future proactive or autonomous service layer decisions that it makes such as session routing decisions, session store-and-forward decisions, or autonomous service layer actions such as pre-fetching of data based on prior history, patterns, or trends.

A session endpoint may store session state in order to maintain a service layer session with a session manager. Session state may also be shared between session managers and/or endpoints. This session state may be maintained by the session endpoint itself or maintained by the session manager in a manner similar to Web Cookies. For example, session state may be updated/maintained on a session endpoint by a session manager while the endpoint is using the service layer session. In doing so, the session manager may store session state onto the session endpoint as an M2M session cookie. When the session endpoint uses the session in the future, this stored M2M session cookie can be sent to the session manager or retrieved by it and used by the session manager for awareness of the endpoint's prior activity. An M2M session cookie can include session state such as which specific resources an endpoint targeted in the past, the rate at which the resources were targeted, etc. Using this M2M session cookie, the session manager can more efficiently and proactively manage the current session transactions based on prior session activity of the endpoint. For example, the session manager can proactively trigger devices in advance to ensure they are awake, proactively reserve access network resources in advance, perform prefetching of targeted resources in advance such that they are cached/buffered in the service layer in advance, etc. Note the disclosed M2M session cookie concept may also be applicable to single-hop M2M service layer sessions, as well as E2E M2M service layer sessions.

Figure 8:
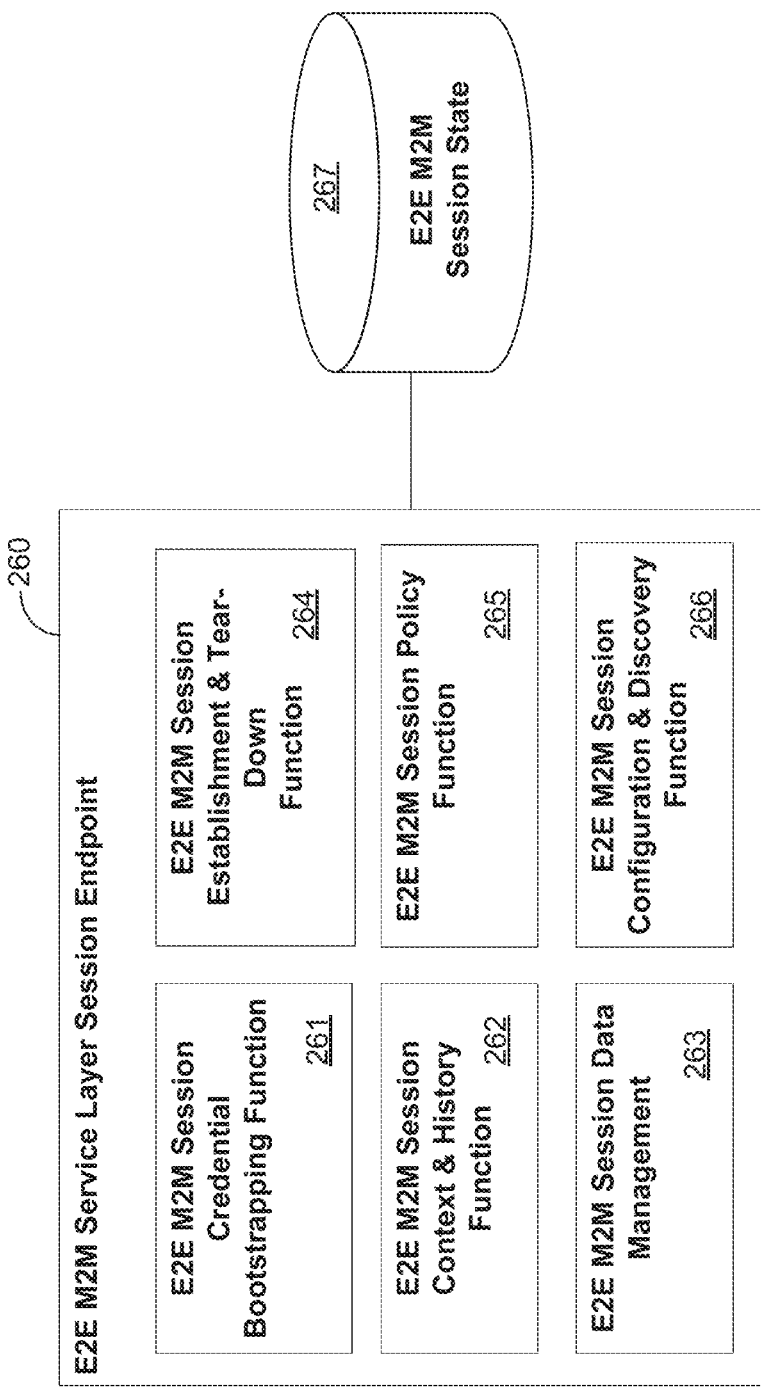
FIG. 8 illustrates a functional architecture for a session endpoint.

FIG. 8 illustrates a functional architecture for a session endpoint 260. As shown in FIG. 8, session endpoint 260 may include one or more of the following: an E2E M2M session credential bootstrapping function 261, an E2E M2M session context and history function 262, an E2E M2M session establishment and teardown function 264, an E2E M2M session policy function 265, an E2E M2M session configuration and discovery function 266, an E2E M2M session data management function 263, and an E2E M2M session state 267. Session endpoint 260 may be considered a logical entity that can be the source or sink of E2E M2M service layer session communication (service layer session communication). In general, session endpoint 260 has many of the same functions of the service layer session manager shown in FIG. 5. However in the case of the session endpoint 260 of FIG. 8, these functions may be streamlined and support a more limited set of functionality, particularly for session endpoints that reside on a resource constrained device, such as a thermostat.

With continued reference to FIG. 8, E2E M2M service layer session endpoint credential bootstrapping function 261 (session endpoint credential bootstrapping function) supports initiating E2E M2M service layer session bootstrap requests to a session manager and receiving corresponding responses containing session credentials. This functionality is used by service layer session endpoints that are looking to establish a service layer session with one or more target session endpoints. This disclosed function also supports receiving a bootstrap configuration request containing session credentials from a session manager when session endpoint 260 is a target of a session being initiated by another endpoint.

E2E M2M service layer session endpoint establishment and tear-down function 264 (session endpoint establishment function) supports initiating session endpoint establishment requests to a session manager. This function also supports receiving session establishment requests from a session manager when session endpoint 260 is a target of the session establishment or tear-down.

E2E M2M service layer session endpoint context and history function 262 (session endpoint context function) supports collecting, interpreting, and processing of E2E M2M service layer session context and history information in a similar manner as the corresponding function supported by a session manager as described above. Here, session endpoint 260 may not support context pertaining to routing and access network connectivity. These types of context may be better suited for session managers.

E2E M2M service layer session endpoint policy function 265 (session endpoint policy function) of FIG. 8, supports collecting, interpreting, and processing of E2E M2M service layer session policies in a similar manner as the corresponding function supported by a session manager as described with regard to the session managers herein. Here, session endpoint 260 may not support policies pertaining to routing, store-and-forwarding, pre-fetching, and access network connectivity. These types of context may be better suited for session managers. E2E M2M service layer session endpoint configuration and discovery function 266 (session endpoint configuration) supports configuration and discovery capabilities for service layer session attributes and parameters in a similar manner as the corresponding function supported by a session manager as described herein. E2E M2M session endpoint data management function 263 (session endpoint data management function) supports management of data that is contained within E2E M2M service layer session messages that are processed by session endpoint 260. In particular, this function may support the encryption or decryption of service layer session data using the session credentials.

The E2E M2M service layer session interface messages defined herein may be bound or layered on top of (i.e., encapsulated within) several underlying existing protocols such as transmission control protocol (TCP) and/or transport layer security (TLS) session, user datagram protocol (UDP)/datagram TLS (DTLS), hypertext transfer protocol (HTTP), constrained application protocol (CoAP). In doing so, session state can be shared and leveraged between the different sessions (e.g. security credentials, congestion information, etc.). In addition, a service layer session can support persistency with regards to lower layer sessions such that the service layer session can persist and be maintained independent of lower layer sessions being setup and torn-down. As one exemplary embodiment, E2E M2M service layer session control messages can be encoded as JSON or XML representations and carried within the payload of HTTP or CoAP messages. These HTTP and CoAP messages can in turn be encapsulated and carried by underlying TCP/TLS and UDP/DTLS messages, respectively.

FIG. 9-FIG. 24 below, provide more details with regards to E2E M2M service layer sessions that may apply to oneM2M and other architectures. For additional context, according to the oneM2M RESTful architecture, capability service functions (CSFs) are represented as a set of "resources." A resource is a uniquely addressable entity in the architecture. A resource has a representation that may be manipulated via RESTful methods such as Create, Retrieve, Update, and Delete and is addressed using a Universal Resource Identifier (URI). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

Figure 9:
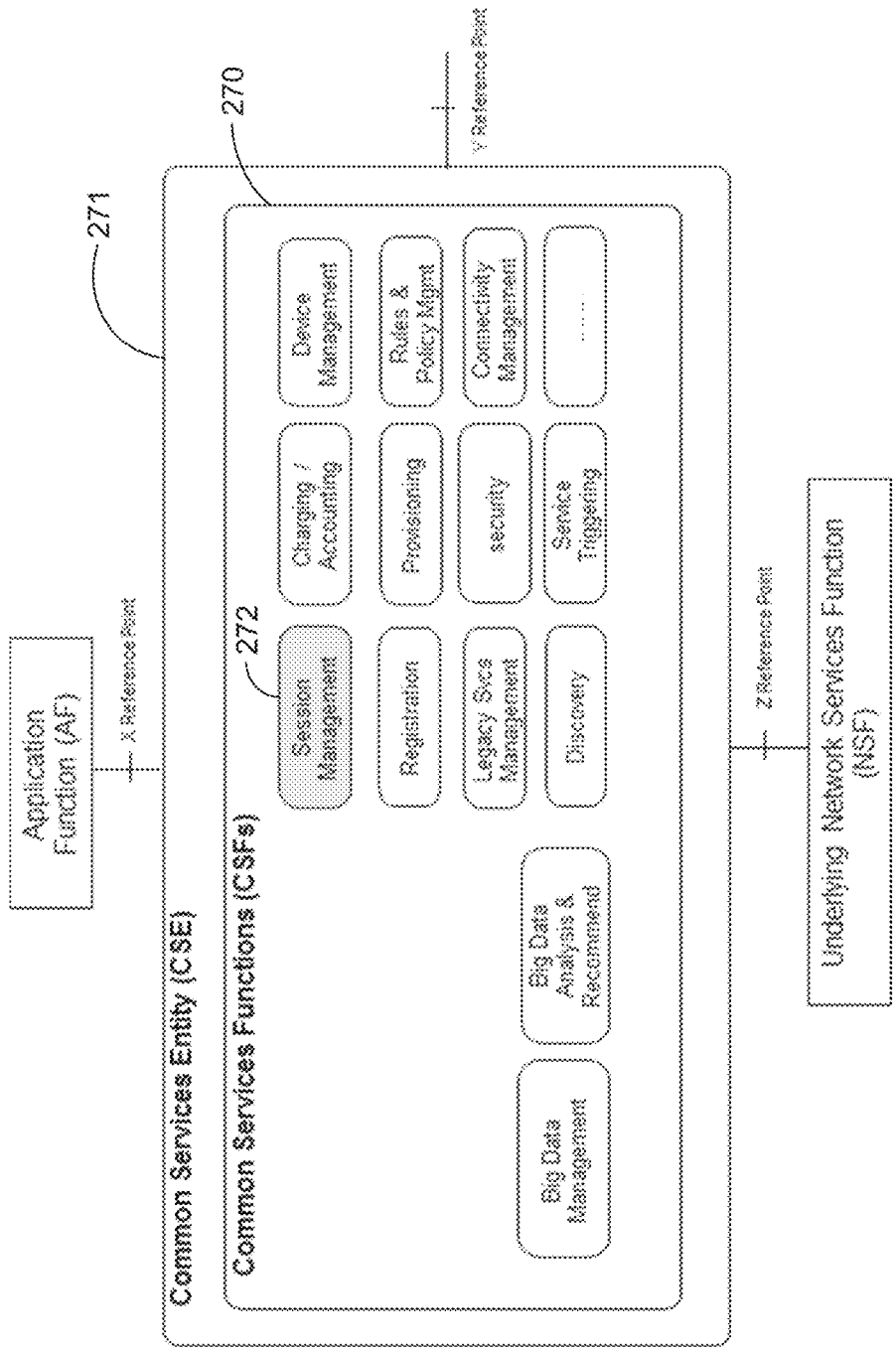
FIG. 9 illustrates a oneM2M embodiment of a session manager.

FIG. 9 illustrates a oneM2M embodiment of a session manager. oneM2M has definitions of capabilities supported by the oneM2M service layer. These capabilities may be referred to as capability service functions (CSFs), such as CSF 270. The oneM2M service layer is referred to as a capability services entity (CSE), such as CSE 271. The current version of the CSE has a placeholder for a Session Management (SMG) CSF; however, the details of this function have yet to be defined. In an embodiment, a session manager may serve as a oneM2M SMG CSF 272. SMG CSF 272 may manage service layer sessions between M2M Applications, between an M2M Application and a CSE, or between CSEs. AEs connect to CSEs via reference point X, while CSEs connect to other CSEs via reference point Y.

Figure 10A:
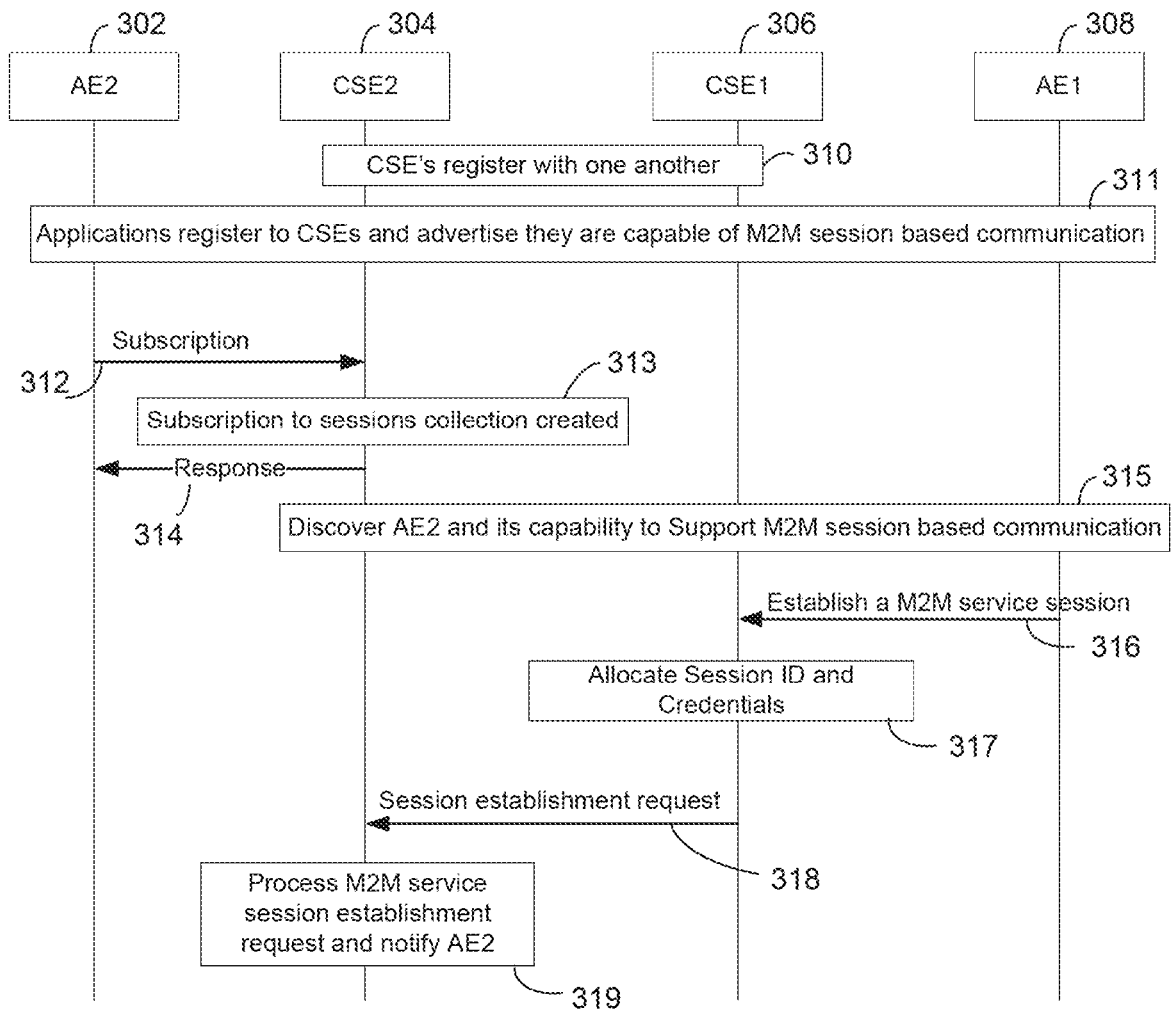
FIG. 10A illustrates an E2E M2M service layer session establishment procedure for a oneM2M session management (SMG) service.
Figure 10B:
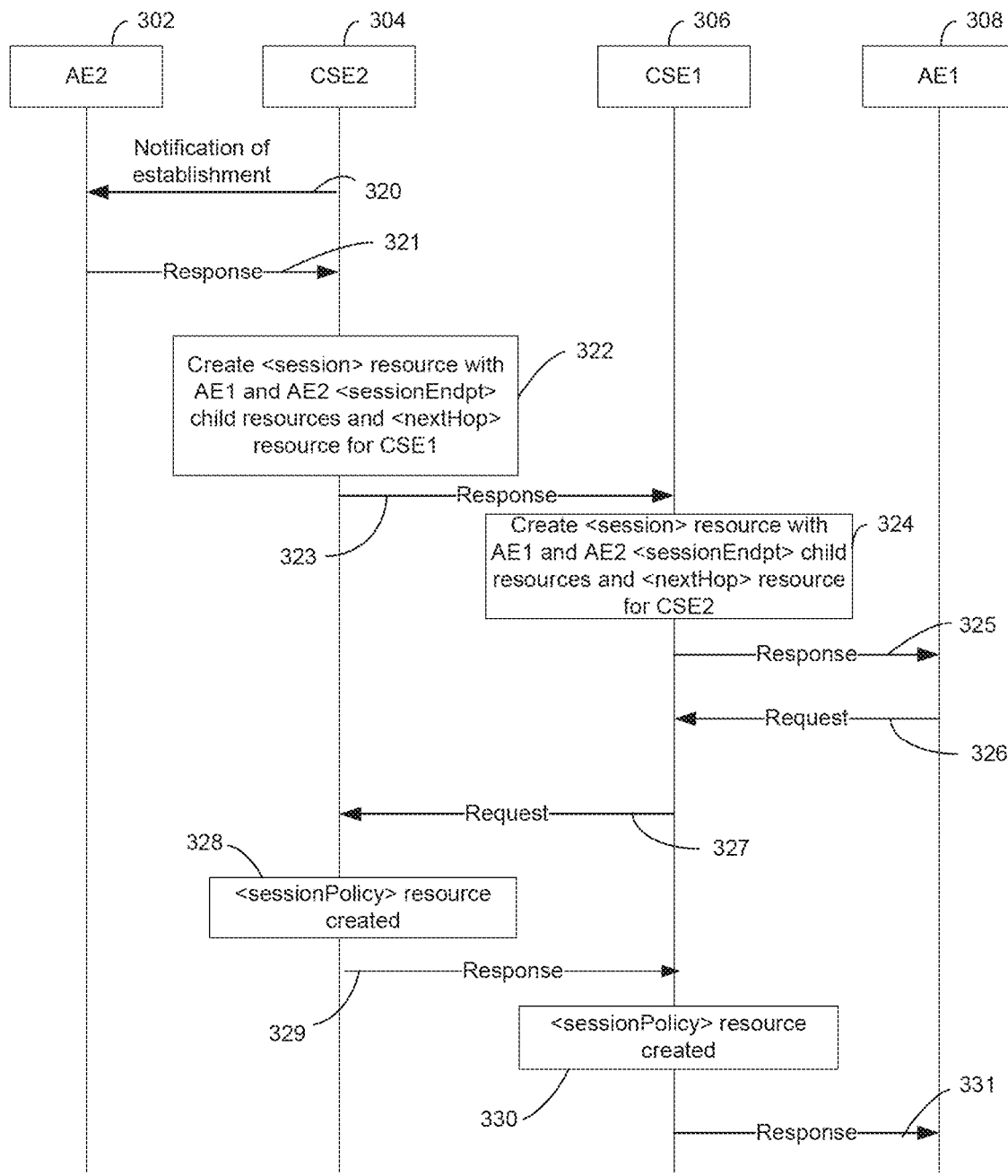
FIG. 10B illustrate an E2E M2M service layer session establishment procedure for a oneM2M session management (SMG) service continued from FIG. 10A.

FIG. 10A and FIG. 10B illustrate an E2E M2M service layer session establishment procedure for a oneM2M session management (SMG) service supporting the resources that are defined in more detail below. The procedure may be the following (not necessarily in the order shown). As shown in FIG. 10A, at step 310, CSE 306 and CSE 304 register with one another and exchange E2E M2M service session management (session management or SMG) capabilities with one another. At step 311, AE 308 and AE 302 register to CSE 306 and CSE 304, respectively, and advertise that they support E2E M2M session based communication (i.e., E2E M2M service layer session). oneM2M defines an application entity (AE) as a network node (e.g., M2M device) hosting an M2M application function. At step 312, AE 302 subscribes to the sessions collection resource hosted on CSE 304. Included in the subscription request may be a callback uniform resource identifier (URI) which notifications may be sent to. This may be done for the AE 302 to receive notifications when an M2M service session establishment request is received by CSE 304. This may be done via a CREATE request.

With continued reference to FIG. 10A, at step 313, CSE 304 creates a subscription to the sessions resource for AE 302. At step 314, CSE 304 return a positive response to the subscription CREATE request. At step 315, AE 308 discovers AE 302 and the capability of AE 302 to support E2E M2M session-based communication (i.e., E2E M2M service layer session). Step 315 may be based on a resource discovery request serviced by CSE 306 or CSE 304. Discovery results may include information such as the M2M identifiers (e.g., application ID, node ID, etc.) for AE 302, which AE 308 may use to establish an E2E M2M session with AE 302. At step 316, AE 308 requests to establish an E2E M2M session with AE 302 by sending a <session> resource CREATE request to CSE 306 that includes AE 302 identifier information as well as AE 308 information that is used by the SMG CSF to establish the session. At step 317, CSE 306 allocates a unique E2E session identifier and session credentials. Session identifiers identify the session while session credentials are used to authenticate and give authorization to participate in the identified session. At step 318, CSE 306 forwards the session establishment request of step 316 to the next hop (which is CSE 304 in this example). The session identifier and session credentials may be included in this forwarded request. At step 319, SMG CSF on CSE 304 receives and processes M2M service session establishment request targeting AE 302.

As continued in FIG. 10B, at step 320, SMG CSF on CSE 304 sends a notification of the M2M service session establishment request to AE 302. CSE 304 includes the session identifier and credentials as well as AE 308 session information in the notification such as AE 308's M2M identifier(s), among other things. This information may be used later by AE 302 to send or receive session-based messages to or from AE 308 via the SMG CSFs on CSE 304 and CSE 306. At step 321, AE 302 returns a positive response to the notification request indicating that it is interested and willing to enter into an M2M service session (i.e., E2E M2M service layer session described above) with AE 308. Included in the response may be session establishment information specified by AE 302 (e.g. AE 302's M2M identifier, resources that it wants to make accessible via the session, etc.). At step 322, the SMG CSF on CSE 304 creates an M2M service <session> resource and <sessionEndpoint> resources for both AE 308 and AE 302 in which it stores session information (e.g. sessionID, endpoint identifiers, etc.). In addition, a <nextHop> resource is also created for CSE 306.

With continued reference to FIG. 10B, at step 323, the SMG CSF on CSE 304 returns a positive response to the M2M service session establishment CREATE request to the SMG CSF on CSE 306. At step 324, the SMG CSF on CSE 306 creates M2M <session> resource and <sessionEndpoint> resources for both AE 308 and AE 302 in which it stores session information (e.g. sessionID, endpoint identifiers, etc.). In addition, a <nextHop> resource is also created for CSE 304. At step 325, SMG CSF on CSE 306 returns a positive response to M2M service session establishment CREATE request of step 316 to AE 308. The response may include session information such as session ID and credentials, among other things. At step 326, AE 308 sends a request to CSE 306 to create a session policy to support a desired level of QoS that it requires for the session (e.g., QoS may be that the message should not be store-and-forwarded). At step 327, SMG CSF on CSE 306 forwards request to next hop SMG CSF on CSE 304. At step 328, SMG CSF on CSE 304 creates <sessionPolicy> resource. At step 329, SMG CSF on CSE 304 returns a positive response to SMG CSF on CSE 306. At step 330, SMG CSF on CSE 306 creates <sessionPolicy> resource. At step 331, SMG CSF on CSE 304 returns a positive response to AE 308.

Figure 11A:
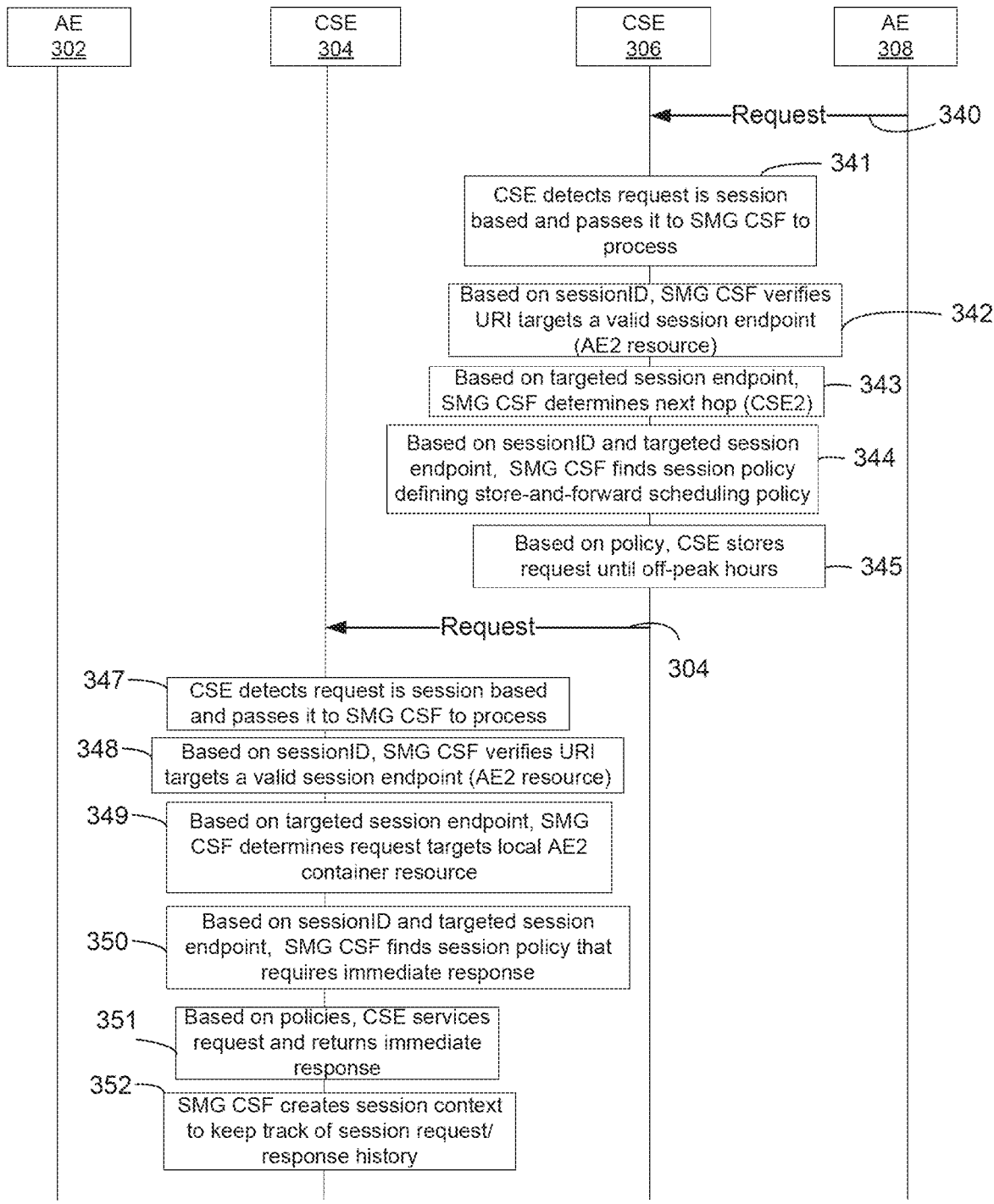
FIG. 11A illustrates a session usage procedure for a oneM2M SMG service.
Figure 11B:
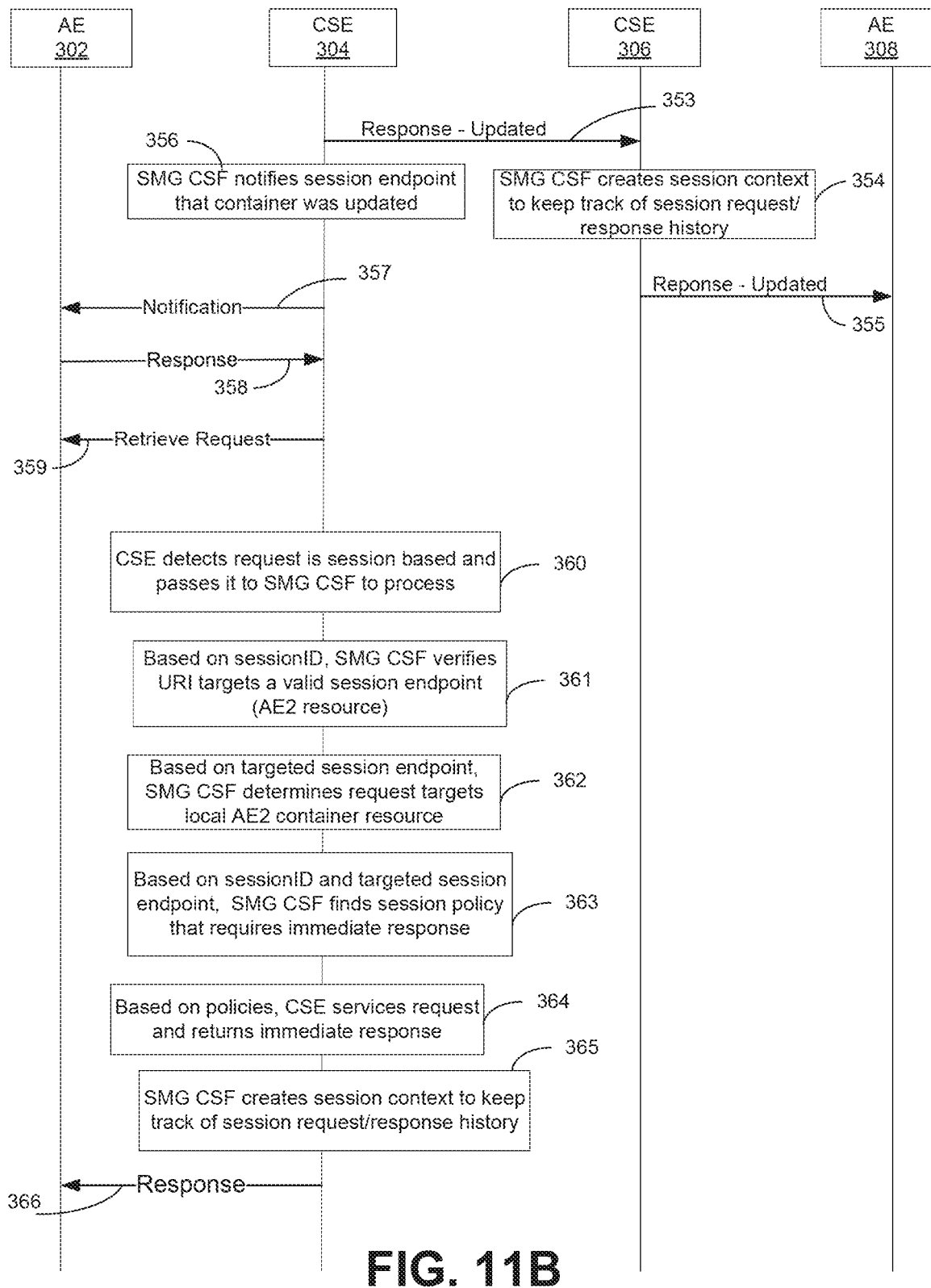
FIG. 11B illustrates a session usage procedure for a oneM2M SMG service continued from FIG. 11A.

FIG. 11A and FIG. 11B illustrate a session usage procedure for a oneM2M SMG service supporting the resources that are defined in more detail below. At step 340, AE 308 sends a service session-based request to CSE 306 to update an AE 302 container resource hosted on CSE 304. At step 341, CSE 306 detects that the request of step 340 is service session based and passes it to SMG CSF to process. At step 342, based on sessionID, SMG CSF on CSE 306 verifies that a received URI targets a valid session endpoint (AE 302's container1 resource). At step 343, based on a targeted session endpoint (i.e., AE 302), SMG CSF on CSE 306 determines next hop is CSE 304. At step 344, based on sessionID and targeted session endpoint (i.e., AE 302), SMG CSF on CSE 306 finds session policy defining store-and-forward scheduling policy. At step 345, based on policy, CSE 306 stores request until off-peak hours and then forwards it to CSE 304 during off-peak hours. At step 346, CSE 306 forwards request to CSE 304. At step 347, CSE 304 detects request is session based and passes it to SMG CSF to process. At step 348, based on sessionID, SMG CSF on CSE 304 verifies a received URI targets a valid session endpoint (AE 302's container1 resource). At step 349, based on targeted session endpoint, SMG CSF on CSE 304 determines request targets local AE 302 container resource. At step 350, based on sessionID and targeted session endpoint, SMG CSF on CSE 304 finds session policy that requires immediate response. At step 351, based on policies, CSE 304 services request and returns a response. At step 352, SMG CSF on CSE 304 creates session context to keep track of session request/response history.

As continued in FIG. 11B, at step 353, CSE 304 sends a response to CSE 306. At step 354, SMG CSF on CSE 306 creates session context to keep track of session request/response history. At step 355, SMG CSF on CSE 306 sends response to AE 308. At step 356, SMG CSF on CSE 304 prepares a notification to session endpoint (AE 302) that container was updated. At step 357, SMG CSF on CSE 304 sends notification to AE 302 that container1 resource was updated as part of the session. At step 358, AE 302 responds with a positive response that it received the notification. At step 359, AE 302 sends a session-based RETRIEVE request to CSE 304 to retrieve updated container resource. At step 360, CSE 304 detects that the request of step 359 is session based and passes it to SMG CSF to process. At step 361, Based on sessionID, SMG CSF on CSE 304 verifies URI targets a valid session endpoint (AE 302's container1 resource). At step 362, Based on targeted session endpoint, SMG CSF on CSE 304 determines that the request targets local AE 302 container1 resource. At step 363, based on sessionID and targeted session endpoint, SMG CSF on CSE 304 finds session policy that requires immediate response. At step 364, based on policies, CSE services request and returns immediate response. At step 365, SMG CSF on CSE 304 creates session context to keep track of session request or response history. At step 366, CSE 304 returns response to AE 302.

Figure 12:
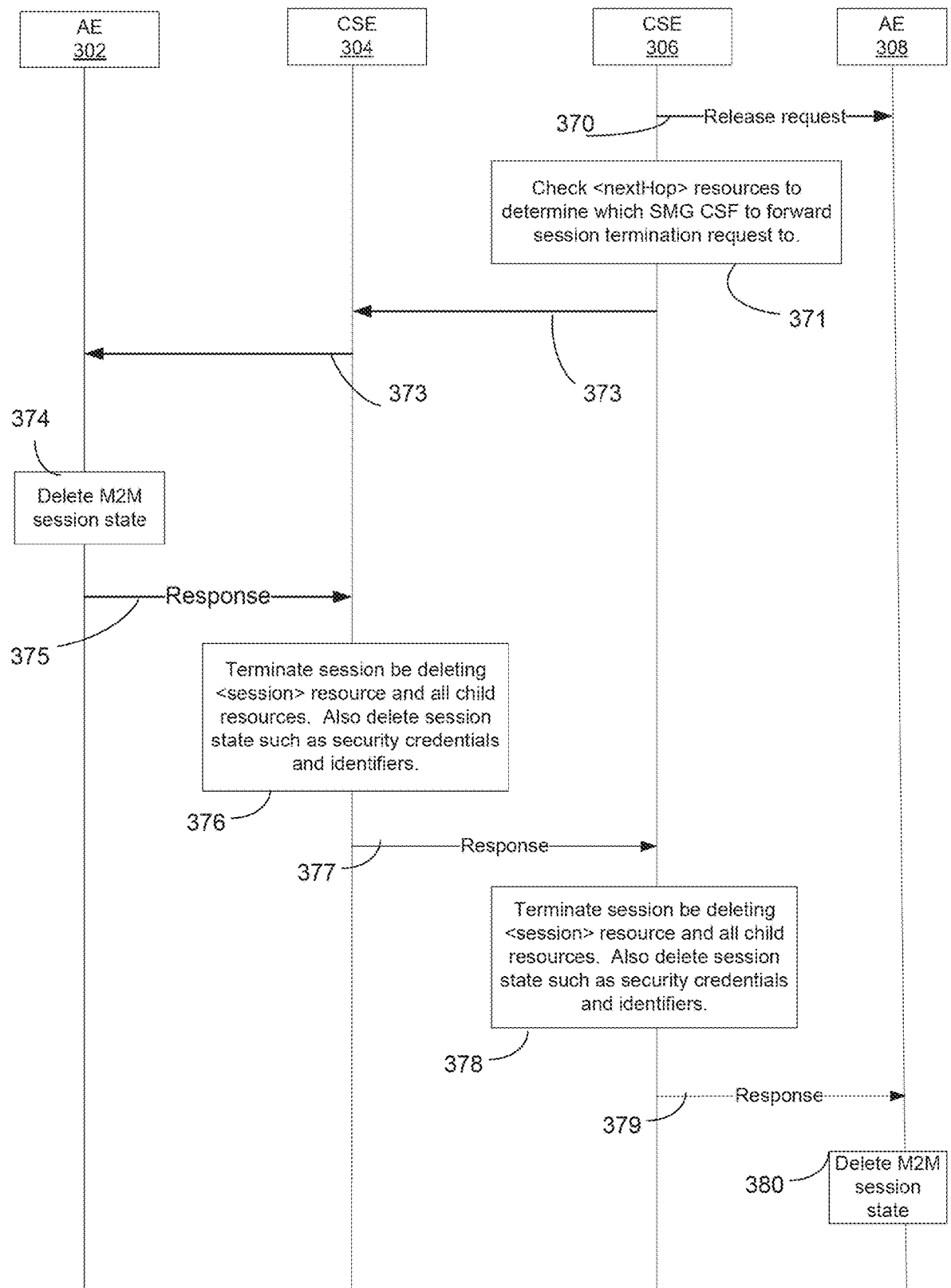
FIG. 12 illustrates an exemplary M2M session termination procedure for a oneM2M SMG service.

FIG. 12 illustrates an exemplary E2E M2M session termination procedure for a oneM2M SMG service supporting the resources defined below. In this example, the session termination is invoked by the session initiator (AE 308). Although not shown in FIG. 12, session termination may also be invoked by other session endpoints, the SMG CSF itself, and other CSFs having proper management rights to do so. At step 370, AE 308 sends an E2E M2M session termination request to CSE 306 using a DELETE.

At step 371 SMG CSF on CSE 306 processes request and determines which next hop SMG CSFs on other CSEs it needs to forward session termination request to such that session state on these CSEs can be torn-down. In this example, SMG CSF on CSE 304 is the next hop detected. At step 372, SMG CSF on CSE 306 forwards session termination request to SMG CSF on CSE 304. At step 373, a CSF on CSE 304 notifies session endpoint (i.e., AE 302) that session is being terminated. At step 374, AE 302 processes notification and deletes locally stored M2M session state. At step 375, AE 302 returns a positive response to the notification request indicating it has removed its local M2M session state. At step 376, SMG CSF on CSE 304 deletes its locally hosted <session> resource and all child resources. The SMG CSF also deletes any local session state such as security credentials and identifiers allocated to the session. At step 377, SMG CSF on CSE 304 returns a positive response to the session termination DELETE request to the SMG CSF on CSE 306. At step 378, SMG CSF on CSE 306 deletes its locally hosted <session> resource and all child resources. The SMG CSF also deletes any local session state such as security credentials and identifiers allocated to the session. At step 379, SMG CSF on CSE 306 returns a positive response to the M2M service session termination DELETE request to AE 308. At step 380, AE 308 deletes stored M2M session state.

It is understood that the entities performing the steps illustrated in FIG. 10A, FIG. 10B, FIG. 11A, FIG. 11B, and FIG. 12 are logical entities that may be implemented in the form of software (i.e., computer-executable instructions) stored in a memory of, and executing on a processor of, a network node or computer system such as those illustrated in FIG. 37C or FIG. 37D. That is, the method(s) illustrated in FIG. 10A, FIG. 10B, FIG. 11A, FIG. 11B, and FIG. 12 may be implemented in the form of software (i.e., computer-executable instructions) stored in a memory of a node or computer system illustrated in FIG. 37C or FIG. 37D, which computer executable instructions, when executed by a processor of the node, perform the steps illustrated in FIG. 10A, FIG. 10B, FIG. 11A, FIG. 11B, and FIG. 12.

Disclosed below are resource structures (e.g., FIG. 14) for the SMG CSF, which may be used in procedures discussed herein. To assist in the understanding of the resource figures, the oneM2M defined graphical representation for describing resource structures is the following: 1) square boxes may be used for resources and child resources; 2) square boxes with round corners may be used for attributes; 3) parallelograms with no right angles (e.g., rhomboids) may be used for collection of resources; 4) the multiplicity of each attribute and child resource is defined; and 5) resource names delimited with "<" and ">" indicate names assigned during the creation of the resource.

Figure 13:
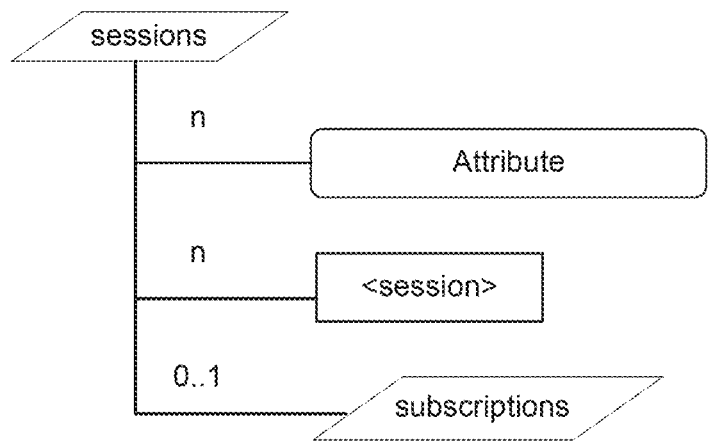
FIG. 13 illustrates a resource "sessions"
Figure 14:
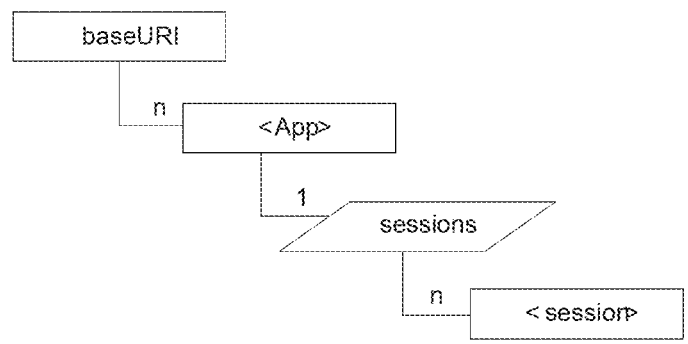
FIG. 14 illustrates sessions resource instantiation under a CSE Base URI.
Figure 15:
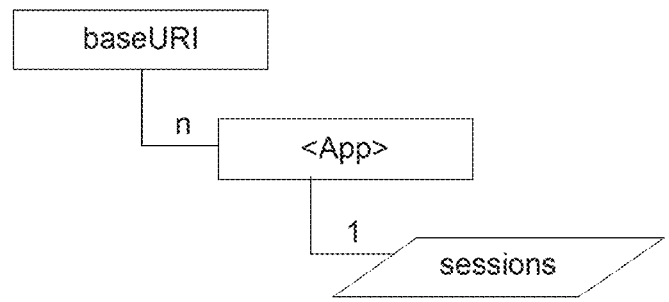
FIG. 15 illustrates sessions resource instantiation under an application resource.

A "sessions" resource can represent a collection of one or more <session> resources, as shown in FIG. 13. Alternatively, <session> resources can be instantiated independently (i.e., outside of a sessions collection resource). This sessions resource can be instantiated at various levels in the oneM2M CSE resource tree hierarchy. The level of instantiation can be indicative of the type of M2M session. Similarly, M2M sessions between M2M applications or between M2M applications and CSEs can be instantiated under an application resource as shown in FIG. 14. For example, M2M sessions between multiple CSEs may be instantiated under a CSE's base URI, as shown in FIG. 15. The sessions resource may contain child resources according to their multiplicity in Table 1. This resource can contain the attributes according to their multiplicity in Table 2.

TABLE 1

Child Resources of sessions Resource

| Child Resource Name | Child Resource Type | Multiplicity | Description |
|---|---|---|---|
| <session> | M2M service session resource | n | M2M service session resources support attributes and child resources used by the SMG CSF to manage M2M service sessions. |
| subscriptions | Collection of subscription resources | 0 . . . 1 | Used to create subscriptions to sessions collection. |

TABLE 2

Attributes of sessions Resource

| Attribute Name | Multiplicity | Description |
|---|---|---|
| creationTime | 1 | Time of creation of the resource |
| accessRightID | 0 . . . n | URI of an access rights resource |
| lastModifiedTime | 1 | Last modification time of a resource |

Figure 16:
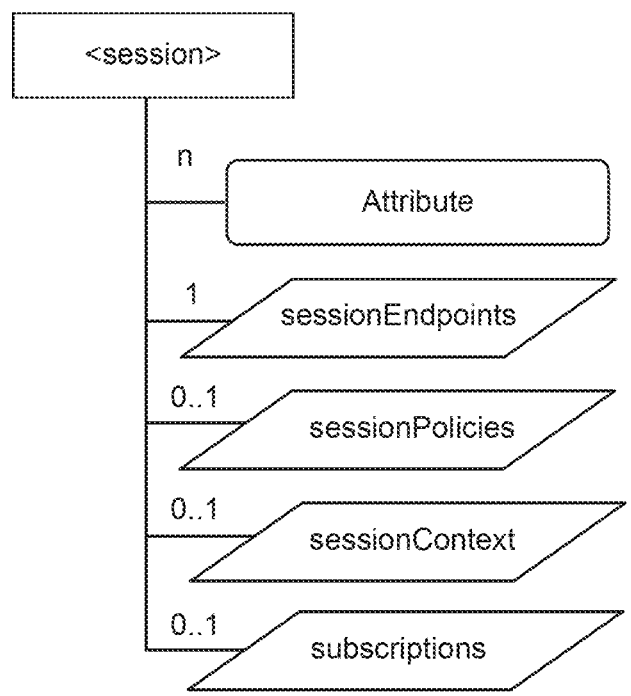
FIG. 16 illustrates a resource <session>.

A <session> resource can contain information used by the SMG CSF for managing a particular M2M service session, as shown in FIG. 16. This resource can contain the child resources according to their multiplicity in Table 3. This resource can contain the attributes according to their multiplicity in Table 4.

TABLE 3

Child Resources of <session> Resource

| Child Resource Name | Child Resource Type | Multiplicity | Description |
|---|---|---|---|
| sessionEndpoints | Collection of <sessionEndpoint> resources | 1 | Collection of M2M service session endpoint resources that support endpoint specific attributes |
| sessionPolicies | Collection of <sessionPolicy> resources | 0 . . . 1 | Collection of M2M service session policy resources that are used by the SMG to manage the M2M service session in a policy based manner |
| sessionContext | Collection of <sessionContextInstance> resources | 0 . . . 1 | Collection of M2M service session context instance resources which store context information related to M2M service session activity and events. |
| subscriptions | Collection of subscription resources | 0 . . . 1 | Used to create subscriptions to a <session> resource. Subscriptions can be used to subscribe to session related events such as additions or updates to session endpoint context. |

TABLE 4

*Attributes of <session> Resource*

| Attribute Name | Multiplicity | Description |
| --- | --- | --- |
| sessionID | 1 | A unique ID assigned by SMG CSF when <session> resource is created (i.e., M2M service session is established). |
| sessionMode | 1 | The mode that the M2M service session is in. Some examples of different modes include ONLINE and OFFLINE. When a session is in the ONLINE mode, session endpoints can communicate with one another in a session-based manner. When a session is in an OFFLINE mode, session endpoints will not be able to communicate with one another. The SMG CSF as well as the session endpoints can configure this attribute. |
| sessionDescription | 1 | Information (e.g. a string) describing the session. This description can be used to discover an existing session via the CSE resource discovery mechanisms (e.g. by perspective session endpoints). |
| allEndpoints | 1 | Requests targeted towards this attribute URI will be considered for forwarding to all the session endpoints by the SMG CSF. Whether or not the request is forwarded to a particular session endpoint is determined by the SMG CSF checking the trailing portion of the URI that follows "allEndpoints". This portion of the URI path will be compared against each session endpoint's endptPaths attribute. If a match is found, then the request is forwarded towards the session endpoint. Otherwise, the request is not forwarded towards a session endpoint. |
| creationTime | 1 | Time of creation of the resource |
| expirationTime | 1 | Absolute time after which the resource will be deleted by the CSE. This attribute can be provided by the issuer upon resource <session> creation, and in such a case it will be regarded as a hint to the hosting CSE on the lifetime of the resource. expirationTime can be extended by performing an update before expirationTime has elapsed. |
| accessRightID | 1 . . . n | URI of an access rights resource |
| lastModifiedTime | 1 | Last modification time of a resource |

Figure 17:
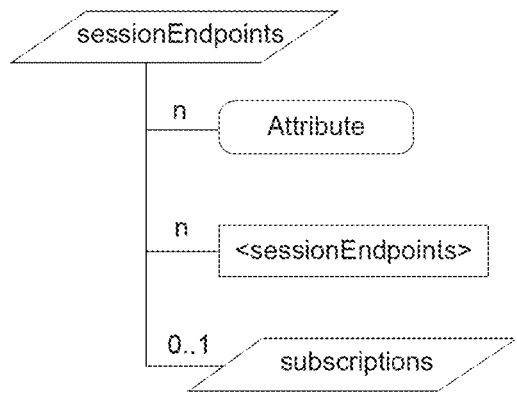
FIG. 17 illustrates a resource sessionEndpoints.

The sessionEndpoints resource can represent a collection of <sessionEndpoint> resources, as shown in FIG. 17. This resource can contain the child resources according to their multiplicity in Table 5. This resource can contain the attributes according to their multiplicity in Table 6.

TABLE 5

*Child Resources of sessionEndpoints Resource*

| Child Resource Name | Child Resource Type | Multiplicity | Description |
| --- | --- | --- | --- |
| <sessionEndpoint> | M2M service session endpoint resource | n | M2M service session endpoint resources that support attributes used by the SMG CSF to manage M2M service sessions. |
| subscriptions | Collection of subscription resources | 0 . . . 1 | Used to create subscriptions to sessionEndpoints collection |

TABLE 6

*Attributes of sessionEndpoints Resource*

| Attribute Name | Multiplicity | Description |
| --- | --- | --- |
| creationTime | 1 | Time of creation of the resource |
| accessRightID | 0 . . . n | URI of an access rights resource |
| lastModifiedTime | 1 | Last modification time of a resource |

Figure 18:
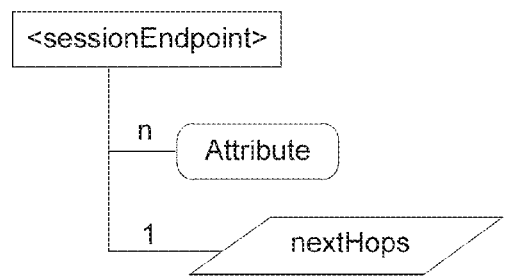
FIG. 18 illustrates a resource <sessionEndpoint>.

The <sessionEndpoint> resource can contain attributes and child resources applicable to a particular M2M service session endpoint, as shown in FIG. 18. This resource can contain the child resources according to their multiplicity in Table 7. This resource can contain the attributes according to their multiplicity in Table 8.

TABLE 7

Child Resources of <sessionEndpoint> Resource

| Child Resource Name | Child Resource Type | Multiplicity | Description |
| --- | --- | --- | --- |
| nextHops | Collection of M2M service session next hop resources | n | M2M service session next hop resources support attributes used by the SMG CSF to manage M2M service session hops. |

TABLE 8

Attributes of <sessionEndpoint> Resource

| Attribute Name | Multiplicity | Description |
| --- | --- | --- |
| endptNodeID | 1 | Identifier of M2M node (oneM2M defined M2M-Node-ID) hosting M2M service session endpoint |
| endptID | 1 | Identifier of M2M service session endpoint. Configured with an application identifier (oneM2M defined App-Inst-ID) if session endpoint is an M2M Application. Configured with a CSE identifier (oneM2M defined CSE-ID) if session endpoint is a CSE. |
| endptSubID | 1 | Identifier of M2M Service Provider's service subscription (oneM2M defined M2M-Sub-ID) associated with M2M service session endpoint |
| endptPaths | 0 . . . n | A session endpoint may publish a set of resource paths to restrict the scope of an M2M service session to a particular set of endpoint resources. For example, an M2M service session can be created to only allow session-based communication with a subset of resources hosted on an M2M device. When present, a SMG CSF can compare the URI specified in session-based requests against this URI paths specified in this attribute. If a match is found, then the SMG CSF forwards the request towards the session endpoint. Otherwise, the SMG CSF does not. In the absence of this attribute, the scope of M2M service session endpoint shall not be restricted. Note, accessRights take precedence over this attribute. |
| endptDescription | 1 | Information describing the session endpoint that can be used by perspective session participants to discover session endpoint via CSE resource discovery mechanisms |
| creationTime | 1 | Time of creation of the resource |
| accessRightID | 0 . . . n | URI of an access rights resource. |
| lastModifiedTime | 1 | Last modification time of a resource |

Figure 19:
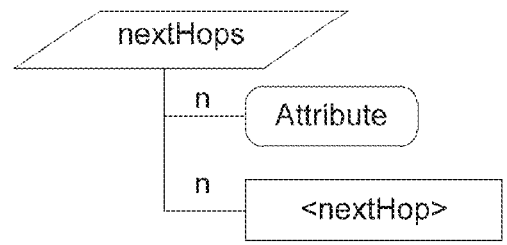
FIG. 19 illustrates a resource nextHops.

The nextHops resource can represent a collection of <nextHop> resources, as shown in FIG. 19. This resource can contain the child resources according to their multiplicity in Table 9. This resource can contain the attributes according to their multiplicity in Table 10.

TABLE 9

Child Resources of nextHops Resource

| Child Resource Name | Child Resource Type | Multiplicity | Description |
| --- | --- | --- | --- |
| <nextHop> | M2M service session next hop resource | n | M2M service session next hop resource that supports attributes used by the SMG CSF to keep track of the next hop used to forward session messages to for a particular session endpoint. |

TABLE 10

Attributes of nextHops Resource

| Attribute Name | Multiplicity | Description |
| --- | --- | --- |
| creationTime | 1 | Time of creation of the resource |
| accessRightID | 0 . . . n | URI of an access rights resource. |
| lastModifiedTime | 1 | Last modification time of a resource |

Figure 20:
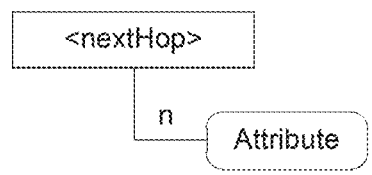
FIG. 20 illustrates a resource <nextHop>.

The <nextHop> resource, as shown in FIG. 20, can contain information regarding the next hop CSE that a SMG CSF forward messages for a specific session endpoint when the M2M session consists of multiple CSE hops in between session endpoints. This resource can be used by the SMG CSF to maintain state of the next hop CSE which session-based requests are forwarded for a given session and/or session endpoint. Maintaining this information can be useful for such operations as tearing down multi-hop M2M sessions spanning across multiple CSEs as well as collaboration between SMG CSFs hosted on different CSEs. This resource can contain the attributes according to their multiplicity in Table 11.

TABLE 11

Attributes of <nextHop> Resource

| Attribute Name | Multiplicity | Description |
| --- | --- | --- |
| nextHopNodeID | 1 | Identifier of a next hop M2M node (oneM2M defined M2M-Node-ID) for targeted M2M service session endpoint |
| nextHopID | 1 | Identifier of the next M2M service session hop. Configured with an application identifier (oneM2M defined App-Inst-ID) if next hop is an M2M Application. Configured with a CSE identifier (oneM2M defined CSE-ID) if next hop is a CSE. |
| nextHopSubID | 1 | Identifier of M2M Service Provider's service subscription (oneM2M defined M2M-Sub-ID) associated with M2M service session next hop. |
| nextHopDescription | 1 | Information describing the session endpoint that can be used by perspective session participants to discover session endpoint via CSE resource discovery mechanisms |
| nextHopState | 0 . . . 1 | Indicates if next hop is currently reachable or not. Next hop's SMG can set this attribute to OFFLINE or ONLINE. Additionally, a CSE can set this attribute to NOT_REACHABLE if it detects a next hop CSE cannot be reached and ONLINE if it detects next hop CSE can be reached. |
| creationTime | 1 | Time of creation of the M2M service session endpoint's next hop resource |
| lastModifiedTime | 1 | Last modification time of M2M service session endpoint's next hop resource |
| accessRightID | 0 . . . 1 | URI of an access rights resource associated with M2M service session endpoint's next hop resource |

Figure 21:
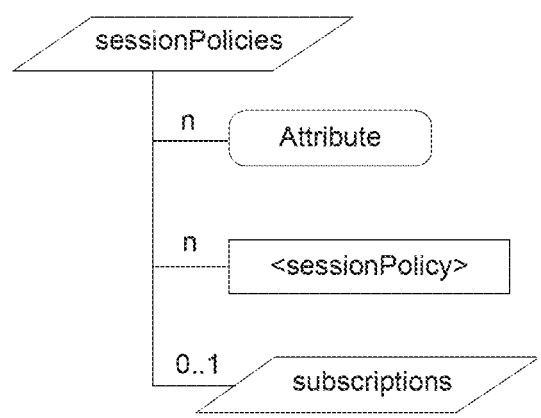
FIG. 21 illustrates a resource sessionPolicies.

The sessionPolicies resource can represent a collection of <sessionPolicy> resources, as shown in FIG. 21. This resource can contain the child resources according to their multiplicity in Table 12. This resource can contain the attributes according to their multiplicity in Table 13.

TABLE 12

Child Resources of sessionPolicies Resource

| Child Resource Name | Child Resource Type | Multiplicity | Description |
| --- | --- | --- | --- |
| <sessionPolicy> | M2M service session policy resource | n | M2M service session policy resource that supports policy related attributes |

TABLE 12-continued

Child Resources of sessionPolicies Resource

| Child Resource Name | Child Resource Type | Multiplicity | Description |
| --- | --- | --- | --- |
| subscriptions | Collection of subscription resources | 0 . . . 1 | Used to create subscriptions to sessionPolicies collection. |

TABLE 13

Attributes of sessionPolicies Resource

| Attribute Name | Multiplicity | Description |
| --- | --- | --- |
| creationTime | 1 | Time of creation of the resource |
| accessRightID | 0 . . . n | URI of an access rights resource. |
| lastModifiedTime | 1 | Last modification time of a resource |

Figure 22:
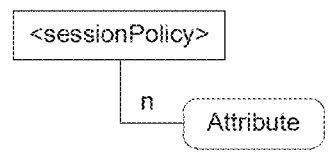
FIG. 22 illustrates a resource <sessionPolicy>.

The <sessionPolicy> resource can contain attributes applicable to a particular M2M service session policy, as shown in FIG. 22. This resource can contain the attributes according to their multiplicity in Table 14.

TABLE 14

Attributes of <sessionPolicy> Resource

| Attribute Name | Multiplicity | Description |
| --- | --- | --- |
| policyType | 1 | The type of policy syntax/language/semantics used to specify the session policy definition. |
| policy | 1 | Session policy definition |
| applicableEndpts | 0 . . . 1 | List of one or more session endpoints that this policy is applicable to. If not specified, than policy is applicable to all session endpoints |

TABLE 14-continued

Attributes of <sessionPolicy> Resource

| Attribute Name | Multiplicity | Description |
| --- | --- | --- |
| creationTime | 1 | Time of creation of the resource |
| accessRightID | 0 . . . n | URI of an access rights resource. |
| lastModifiedTime | 1 | Last modification time of a resource |

Figure 23:
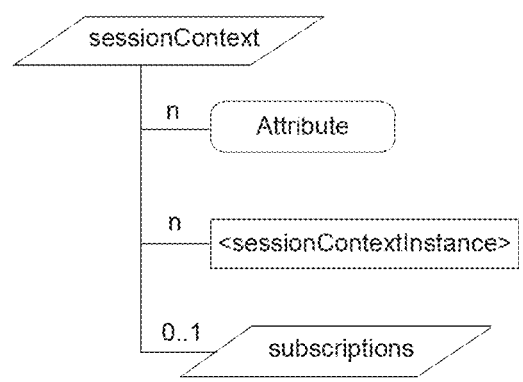
FIG. 23 illustrates a resource sessionContext.

The sessionContext resource can represent a collection of <sessionContextInstances> resources, as shown in FIG. 23. This resource can contain the child resources according to their multiplicity in Table 15. This resource can contain the attributes according to their multiplicity in Table 16.

TABLE 15

Child Resources of sessionContext Resource

| Child Resource Name | Child Resource Type | Multiplicity | Description |
| --- | --- | --- | --- |
| <sessionContextInstance> | M2M service session policy resource | n | M2M service session context instance resource that supports context related attributes |
| subscriptions | Collection of subscription resources | 0 . . . 1 | Used to create subscriptions to sessionContext collection. |

TABLE 16

Attributes of sessionContext Resource

| Attribute Name | Multiplicity | Description |
| --- | --- | --- |
| creationTime | 1 | Time of creation of the resource |
| accessRightID | 0 . . . n | URI of an access rights resource. |
| lastModifiedTime | 1 | Last modification time of a resource |

Figure 24:
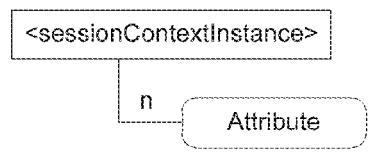
FIG. 24 illustrates a resource <sessionContextInstance>.

The <sessionContextInstance> resource can contain attributes applicable to a particular type of M2M service session context, as shown in FIG. 24. This resource can contain the attributes according to their multiplicity in Table 17.

TABLE 17

Attributes of <sessionContextInstance> Resource

| Attribute Name | Multiplicity | Description |
| --- | --- | --- |
| contextType | 1 | The type of session information to be collected by the SMG CSF and stored within this session context instance (e.g. total number of transactions since session was established, rate of transactions, etc.). |
| container | 1 | URI of container resource where information for this session context instance is stored by SMG CSF. Session context Information can be stored within container's content instance resources. |
| maxNrContentInstances | 1 | Maximum number of content instances of designated container resource used by SMG CSF to store session context information. |
| maxByteSize | 1 | Maximum number of bytes allocated for designated container resource (across all content instances) used by SMG CSF to store session context. |
| maxInstanceAge | 1 | Maximum age of content instances of designated container resource used by SMG CSF to store session context. |
| applicableEndpts | 0 . . . 1 | List of session endpoints that this context shall be collected for. If not specified, than context shall be collected for all session endpoints |
| creationTime | 1 | Time of creation of the resource |
| accessRightID | 0 . . . n | URI of an access rights resource. Must refer to the access right resource. |
| lastModifiedTime | 1 | Last modification time of a resource |

Service Layer Session Migration and Sharing

To illustrate the need and advantages of service layer session migration and sharing, two use cases are described herein. The first is illustrated in FIG. 25, and the second is illustrated in FIG. 26.

Figure 25:
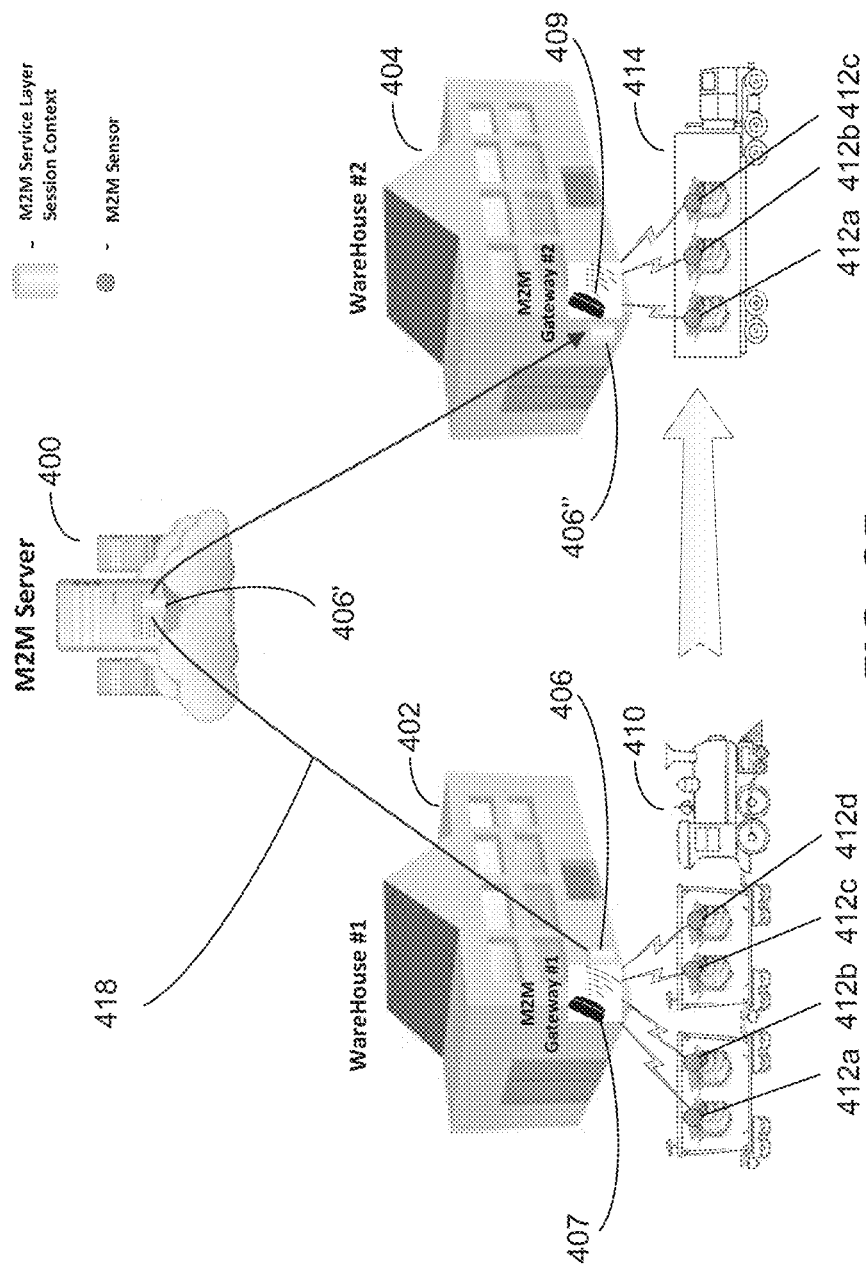
FIG. 25 illustrates an example use case for M2M session migration or sharing.
Figure 26:
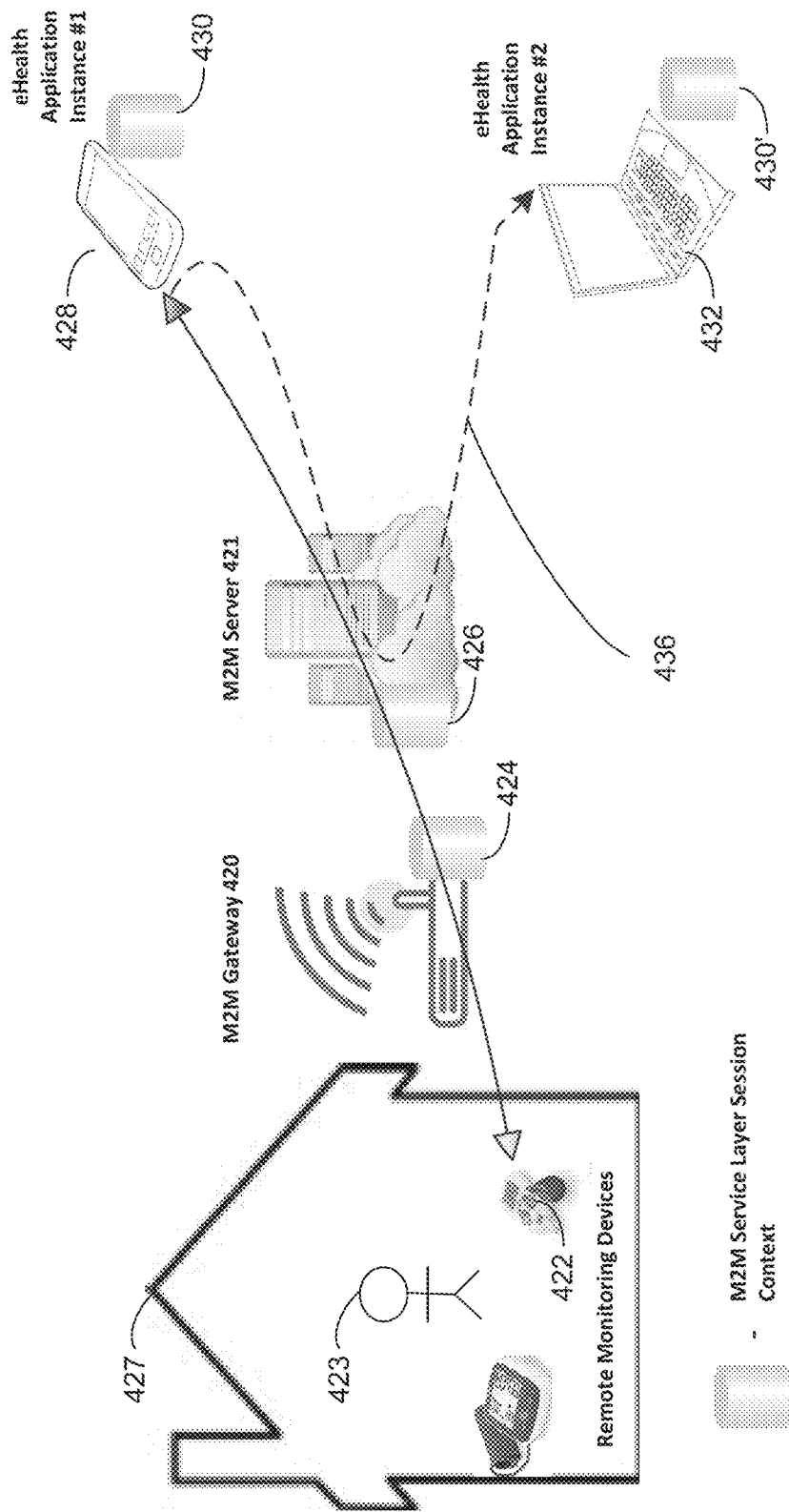
FIG. 26 illustrates another example use case for M2M session migration or sharing.

Referring to FIG. 25, in the first use case, consider a company ships fresh produce (e.g., bananas) around the world. Depending on their destination, a typical journey for the company's produce can vary drastically in distance and can consist of several legs aboard different forms of transportation including planes, trains (e.g., train 410), trucks (e.g., truck 414), and ships which it contracts. Each of these legs can have drastically different shipping times. In addition, depending on their destination, the produce can make several stops at distribution centers, warehouses (e.g., warehouses 402 and 404), loading docks, etc. For these reasons, ensuring that properly ripe produces reaches its final destination can be quite challenging for the company.

To ensure the quality and freshness of the produce from a field where it is grown and harvested to a supermarket where it can be purchased, the company may use M2M sensor technology to monitor the ripeness of the produce as well as environmental conditions during transport. For example, an M2M sensor, such as sensors 412a, 412b, 412c, and 412d, may be provided within each box of produce that the company ships. Hosted on each M2M sensor may be an application that takes periodic measurements of the produce contained within the box. For example, in the case of bananas, by measuring an amount of ethylene gas that the bananas in the box emit over time, the M2M sensor may be used to help predict where in the ripening process the bananas are. This is because bananas increase their levels of ethylene gas emission as they ripen. In addition, the temperature within the box may also be closely monitored since the ripening of bananas can be slowed down by lowering their temperature and, vice versa, sped up by increasing their temperature.

As a box of produce makes its way to its destination, for example from a first warehouse 402 to a second warehouse 404, the company may use a M2M service layer platform consisting of an M2M server 400 that communicates with a network of M2M gateways (e.g., M2M gateways 407 and 409) installed along distribution routes (e.g. warehouses, distribution centers, loading docks, etc.) to collect measurements from each box of produce as it travels from stop to stop along its route. As a box of produce reaches a new location along its route, the M2M sensor within the box (e.g., sensors 412a-d) may establish a service layer session with the M2M gateway (e.g., M2M gateway 407 or 409) at its new location.

The M2M gateway service layer instance in an M2M gateway may automatically identify a given box of produce, where it originated from, its travel history, as well as measurements collected by M2M gateway service layer instances at the prior stops along its route. This may all be facilitated by a session migration feature (described further hereinafter) supported by the M2M service layer platform that allows service layer session context and configuration information to be migrated and shared amongst M2M gateway service layer instances (with assistance from the M2M Server) along an M2M sensor's route. For example, service layer session context 406 for the service layer sessions established between the M2M applications on the sensors 412a-d and the M2M service layer instance on M2M gateway 407 at a first warehouse 402 may be migrated to the M2M service layer instance on M2M gateway 409 at a second warehouse 404 (with assistance from the M2M server 400), as represented by line 418 in FIG. 25. The migrated service layer session context is shown at 406, 406', and 406" as it is transmitted from the M2M gateway 407, to the M2M server 400, and on to the M2M gateway 409. In doing so, this session migration feature saves the M2M application running on each M2M sensor in each box of produce from having to establish a new M2M service layer session with each M2M gateway service layer instance along its route. Instead, the migrated session context may be used to re-establish an existing session which saves the M2M sensor from having to configure the session from scratch. In addition, service layer session context collected by each M2M gateway service layer instance along the route may be more securely and efficiently shared with other M2M gateway service layer instances along the route. This may be done by the service platform automatically migrating the context between the M2M gateway service layer instances when detecting the M2M sensor has moved to a new location and registered to a new M2M gateway service layer instance. This may allow local applications connected to the new M2M gateway service layer instance (e.g. an instance of the company's management application—not shown) to more efficiently and easily discover and access this information. As an example, leveraging this session migration functionality, the rate at which each box of produce has been ripening may be more efficiently and accurately tracked and, in turn, the company may make more informed shipping decisions.

FIG. 26 illustrates another example use case. In this use case, consider a person 423 who may be suffering from a mild form of dementia and may be a type B diabetic. The person may live at home 427 alone, and may require some remote assistance from family and care providers. To provide the person with proper care, the home 427 has been equipped with various sensors (e.g. sensors for bed mattress, floor, bathroom, kitchen, etc.) to track the person's location in the home as well as the person's activity level. In addition, the person may be equipped with a smart glucometer device 422 that is worn to monitor the person's glucose levels. In this example, the sensors (e.g., sensor 422) may be configured to report readings on a regular basis to an M2M enabled Web service platform managed by the person's health care provider. This M2M service layer platform may provide services which allow the person's family and care providers to remotely monitor the person using the information provided by the sensors in the home.

The M2M service layer platform may allow each of the person's family members and care providers to establish a secure communication session via the M2M service layer platform to the sensors in the person's home and monitor the person's activity using a remote app hosted on one of their Web enabled devices (e.g. smart phone, tablet, laptop, etc.). The platform may coordinate secure communication between the person's sensors and each of the apps hosted on the person's family members and care providers devices. Via the service layer platform, each family member and care provider may be able to access real-time information about the person, such as location in the home. In addition, they can also access information collected by the sensors and stored within the M2M service layer platform, such as tracked movement throughout the house that day, whether the person visited the bathroom, whether the person opened the refrigerator or turned on the stove, or a collection of glucometer readings over the past 12 hours, for example. The M2M service layer platform may be capable of also allowing the person's family members to subscribe and receive alerts based on the occurrence of specific events such as when a stove has been left on for over an hour or the glucometer readings have exceeded a certain threshold.

To allow the person's family members and care providers to better coordinate with one another and ensure the person is being adequately monitored at all times while still allowing family members to enjoy some of their own free time, the service platform may support certain additional features. One such feature is the ability of the service layer platform to allow the family members and care providers to split the person's care up into scheduled shifts. At the start/end of each shift, the service layer may support seamlessly switching the person's monitoring over from one family member or care provider to another. This may be achieved by the service layer platform dynamically migrating the service layer session connecting the sensors in the home from one designated family member or care provider to another.

For example, with reference to FIG. 26, the M2M application running on a remote monitoring device 422, such as a glucometer, may establish a service layer session with an eHealth application running on a smart phone 428 of one of the person's family members, which session may be facilitated by the service layer instances on M2M gateway 420 and M2M server 421, as shown. The M2M gateway 420 may store service layer session context 424 relating to the session, and the service layer instances running on the M2M server 426 and smart phone 428 may also store context relating to the session at 426 and 430, respectively. At predetermined or scheduled time, the service layer platform may facilitate the migration of the service layer session connecting the monitoring device 422 with the smart phone 428 from that smart phone 428 to a laptop 430 of another family member or care provider running its own instance of the eHealth application. This migration is illustrated by the dashed line 436. As shown, the migrated service layer session context 430' may be used to re-establish the existing session at the laptop 432, allowing the other family member or care taker to take over monitoring of the person. When performing this migration, the service layer may automatically update the contact information where the person's alerts are sent to, such that at the start/stop of each shift a designated family member or care provider is configured to receive these alerts via the secure service layer session that connects their devices to the person's sensors.

Another feature which the service platform may support is the ability to allow the person's family members and care providers to seamlessly migrate their service layer session connecting their device to the person's sensors to another designated device(s)—owned by the same family member or care provider. For example, if during that family member's or caretaker's shift they would like to transition from using their phone to using their tablet or PC to receive alerts, they can switch over on the fly and the service layer will ensure the service layer session is migrated such that none of the alerts are lost and also that any past context collected by the sensors is securely and fully accessible from the new device as well.

To support use cases such as the example ones illustrated in FIGS. 25 and 26, disclosed hereinafter are methods for migration or sharing of an existing M2M service layer session with one or more prospective session participants. As used herein, the term "service layer session" and variations thereof means a stateful and semi-permanent exchange of information between M2M service layer session participants. The term "M2M service layer session participant" and variations thereof refers to an M2M service layer instance or a M2M application instance taking part in a particular M2M service layer session. As further used herein, the term "M2M service layer session context" and variations thereof means information related to a M2M service layer session which is maintained by one or more M2M service layer session participants. As also used herein, the terms "M2M service layer session migration," "service layer session migration," "session migration," "migration," and the like mean the act of transferring M2M service layer session context between M2M service layer session participants. As used herein, the term "M2M service layer session sharing," "service layer session sharing," "session sharing," "sharing," and the like mean the act of replicating M2M service layer session context between M2M service layer session participants and keeping these replicated versions of session context synchronized with one another such that participants can share the same single session. An "M2M application" refers to an application targeting a particular M2M use case (e.g. eHealth, smart energy, home automation, and the like).

The disclosed methods include determining whether a service layer session is established and if it has session migration or sharing functionality enabled or not; allowing session participants (existing or prospective) to configure a session migration and sharing service and to explicitly trigger this service to start service layer session migration or sharing; allowing a session migration and sharing service to autonomously trigger the start of service layer session migration or sharing based on a session migration/sharing schedule and/or policies; collecting and maintaining service layer session context which can be used to migrate or share a service layer session; determining prospective session participants that will be targeted when performing session migration or sharing; determining whether a prospective session participant is capable of supporting service layer sessions or not; determining whether an existing session participant is interested/willing to migrate or share its service layer session; migrating a service layer session by transferring service layer session context from an existing session participant to a prospective session participant; sharing a service layer session by making service layer session context from an existing session participant(s) available to a prospective session participant(s); and coordinating migration and sharing of service layer sessions with underlying access network connections by sharing service layer session migration and sharing information with the underlying access network.

The methods may be performed by and/or implemented in the form of a Session Migration and Sharing Function (SMSF) that may be used to perform the migration or sharing of a M2M service layer session. Various forms of service layer session context are also described, which may be used to enable the migration and sharing of M2M service layer sessions. Additionally, a oneM2M embodiment of the SMSF is disclosed.

Figure 27:
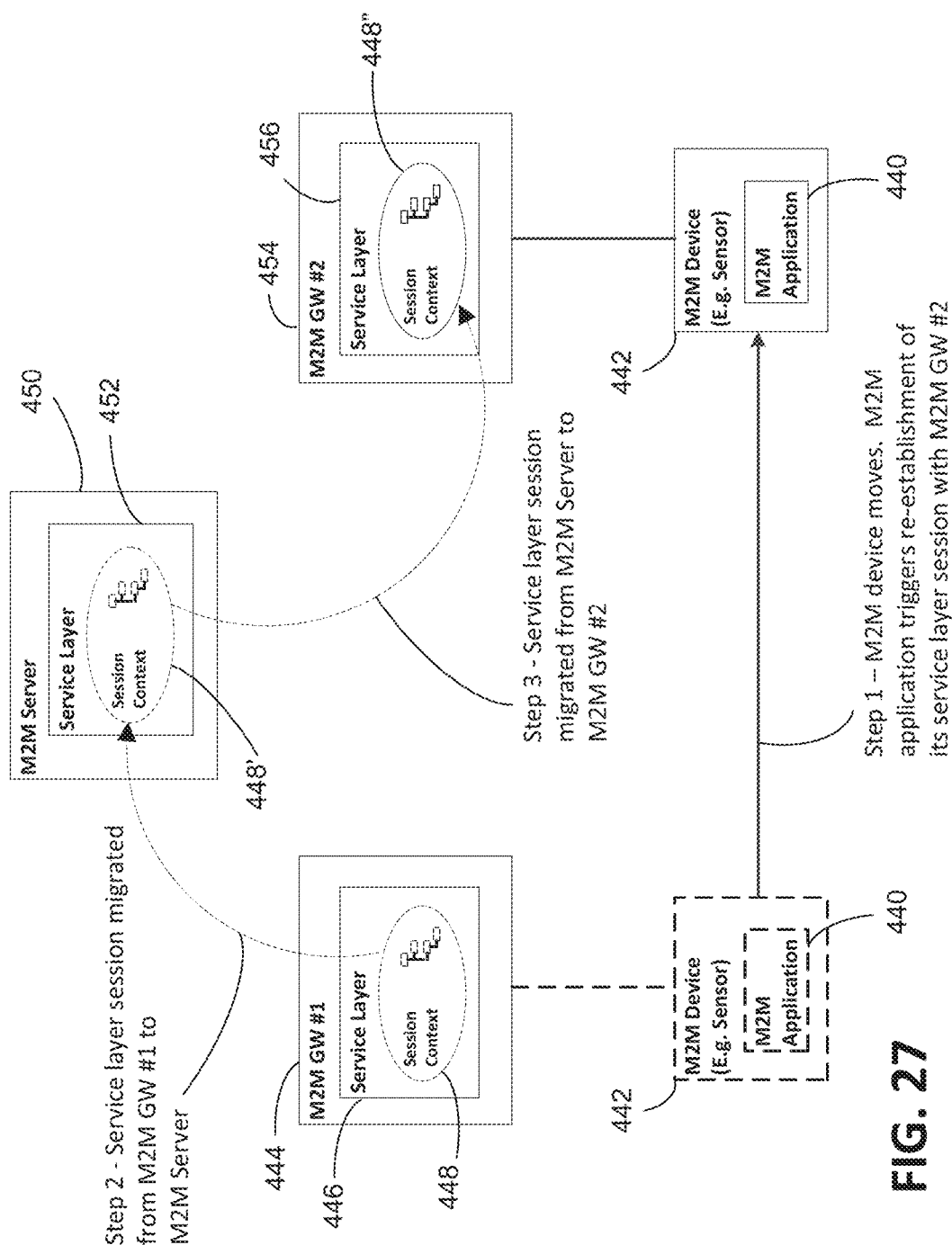
FIG. 27 shows one example of M2M service layer session migration.

FIG. 27 shows one example of M2M service layer session migration. In this example, a M2M service layer session has been established between an M2M application 440 of an M2M device 442 (e.g., a sensor) and the service layer instance 446 of a first M2M gateway 444 (M2M GW #1). As shown, the service layer instance 448 of the M2M gateway 444 will maintain service layer session context information 448 relating to the session. Assume, however, that at Step 1, the M2M device 442 moves and registers with a second M2M gateway 454 (M2M GW #2). The M2M application 440 may trigger re-establishment of the service layer session with the new M2M gateway 454. As a result, the session may be migrated from the service layer instance 446 hosted on the first M2M gateway 444 to the service layer instance 452 hosted on the M2M server 450, and then to the service layer instance 456 hosted on the second M2M gateway 454. When the migration is complete, the service layer session context 448 resides on the second M2M gateway 454, but not the first M2M gateway 444 nor the M2M server 450. Alternatively, session context could be kept on the M2M server 450 to help with future migration requests from other potential session participants. Some examples of other potential M2M service layer session migration embodiments (not shown in FIG. 27) include migrating service layer sessions directly between service layer instances hosted on M2M gateways as well as between service layer instances hosted on M2M servers and between service layer instances hosted on M2M devices. In addition, service layer session migration can also involve migration of session context between M2M application instances as well.

Figure 28:
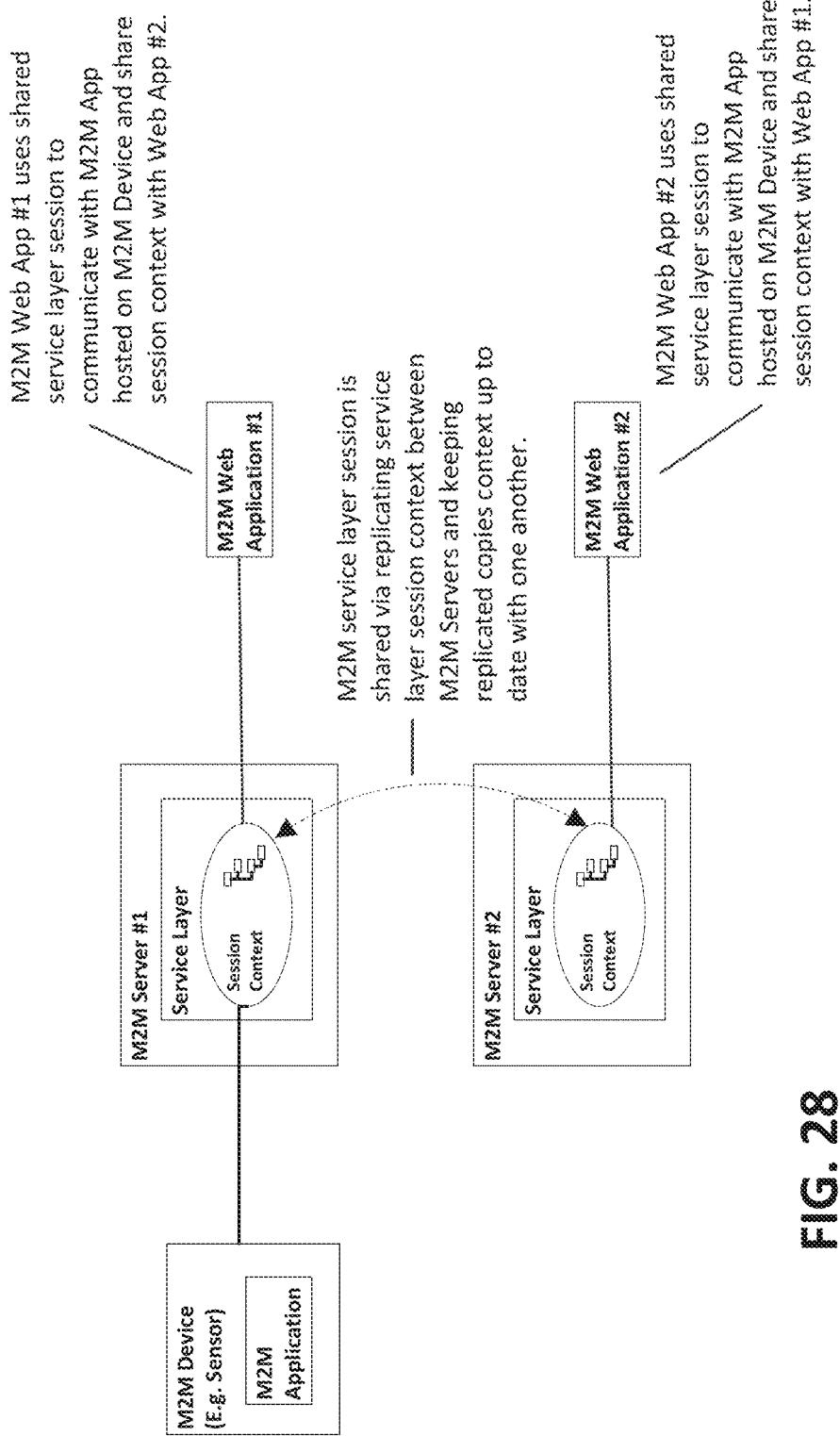
FIG. 28 shows one example of M2M service layer session sharing.

FIG. 28 shows one example of M2M service layer session sharing. In this example, the service layer instances hosted on M2M server #1 and M2M Server #2 replicate service layer session context between themselves to allow both M2M Web Application #1 and #2 to share a single service layer session with the M2M Application hosted on the M2M Device. In doing so, both can securely communicate with the device's application (e.g. access its sensor readings and/or control the device) in a coordinated and synchronized fashion. Such sharing may be well-suited for scenarios involving service layer sessions in which M2M applications have a large degree of separation between each other (e.g. geographically and/or with respect to number of network hops). In these cases, having service layer instances located close to each application can be beneficial versus having the applications communicate with a service layer instance located far distances away. This type of sharing may also well suited for scenarios where M2M applications are distributed across multiple service layer instances for purposes such as load balancing. In these scenarios, sharing service layer sessions across service layer instances can allow applications to more efficiently participate in the same session with one another since the service layers can manage and synchronize service layer session context for the applications and allow them to communicate with their local service layer instances rather than having to communicate with remote service layer instances. Some examples of other potential M2M service layer session sharing embodiments (not shown in FIG. 28) include sharing service layer sessions between service layer instances hosted on M2M gateways and/or M2M devices. In addition service layer session sharing can also involve sharing of session context between M2M application instances as well.

Figure 29:
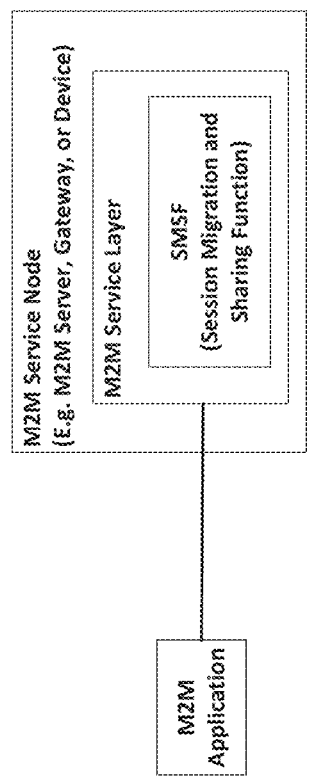
FIG. 29 illustrated one embodiment of a Session Migration and Sharing Function (SMSF) implemented as part of a service layer instance of a node of network.

To enable service layer session migration and sharing, a Session Migration and Sharing Function (SMSF) may be provided that supports, but is not limited to, the following types of functionality: (i) generating triggers or accepting triggers for when M2M service layer session migration or sharing is to be performed; (ii) evaluating triggers to determine if/when to initiate M2M service layer session migration or sharing and the applicable session participants to perform the migration or sharing on; (iii) performing service layer session migration by transferring session context between session participants; and (iv) performing service layer session sharing by replicating session context between session participants and keeping the replicated copies of context up to date with one another. In one embodiment, this SMSF function may be hosted within a M2M service layer instance hosted by an M2M node, such as an M2M server, M2M gateway, or M2M device, as shown in FIG. 29. For example, the SMSF may comprise an individual service capability within the M2M service layer instance or as a sub-function within an existing service capability.

To facilitate the migration and sharing of M2M service layer sessions, service layer session migration and sharing context may be employed, including, but not limited to, one or more of the following types of context (i.e., information) as defined in Table 18. This type of context can be used by an SMSF to make a determination (i.e. trigger decision) of whether to perform service layer session migration or sharing, when to perform it, which session to perform it on.

TABLE 18

M2M Service Layer Session Migration and Sharing Context

| M2M Service Layer Session Migration and Sharing Context | Description |
| --- | --- |
| M2M Service Layer Session Migration and Sharing Schedule | This schedule may specify information such as set times when an SMSF is to perform session migration or sharing. The schedule can also include a list of session participants for which an SMSF is to target when performing session migration or sharing at the specified scheduled times. |
| M2M Service Layer Session Migration and Sharing Policies | These may be policies that define rules for the migration or sharing of M2M service layer sessions between existing and prospective session participants. For example, these policies may specify rules such as what type of session context can be migrated or shared with certain session participants, which session participants are permitted to communicate with one another, and specific conditions which are to trigger an SMSF to perform session migration or sharing. |
| M2M Service Layer Session Migration or Sharing Events | These are events that may be used to trigger the migration or sharing of a M2M service layer session. An event may be autonomously generated and acted upon by an SMSF to initiate session migration or sharing. Alternatively, an event may be explicitly generated by a session participant and then detected by an SMSF to initiate session migration or sharing. |

In addition, a second type of service layer session context may also be employed. This type of context may be configured, collected, stored in memory, and/or maintained by session participants (e.g. service layer instances). In turn, this session context may be migrated or shared between session participants via SMSF(s). In this manner, the migration or sharing of a service layer session can be coordinated and achieved. Some examples of this second type of context include, but are not limited to, the context defined in Table 19 below. Note that the service layer session context listed in Table 19 may be specific to an individual session participant or it can be applicable to all participants of a given service layer session.

TABLE 19

M2M Service Layer Session Context

| M2M Service Layer Session Context | Description |
|---|---|
| M2M Service Layer Session participant Subscription Information | Subscription information such as notification criteria and contact addresses where notifications corresponding to service layer subscriptions from M2M service layer session participants are to be sent to. |
| M2M Service Layer Session Identifier | This identifier can be allocated and assigned during session establishment and then used by session participants and SMSF to uniquely identify a M2M service layer session during the service layer session migration and sharing methods proposed in this disclosure. The identifier can also be used to tag context stored within service layer instances or applications such that the context can be associated with a corresponding service layer session. Tagging service layer context in this manner can enable the context to be more easily identified if/when the context is to be migrated or shared. |
| M2M Service Layer Session participant Security Credentials | Security credentials used by session participants to securely establish and use a M2M service layer session, control access to session based context, and communicate with one another via the session. Some examples can include, security certificates, public keys, access control lists, etc. |
| M2M Service Layer Session Charging records | Charging records that have been generated on behalf of M2M service layer session participants and that contain a history of prior session activity such as number of requests serviced, amount of bandwidth consumed, notifications generated, etc. |
| M2M Service Layer Session participant Routing Information | Information describing the service layer routing information applicable to the routing of service layer session messages to the respective session participants. |
| M2M Service Layer Session participant Location | Location information such as the current/prior locations of session participants |
| M2M Service Layer Session participant Data | Data collected and stored by M2M service layer on behalf of session participants during the lifetime of the session. For example, application data stored within service layer container resources. |
| M2M Service Layer Session participant Discovery Information | Discovery information which a session participant publishes and makes available to help facilitate session migration and sharing. Information can include description of the service layer session that can be used by existing session participants or by prospective session participants to discover an existing session, its participants, the functionality supported by its participants, etc. For example, a description for each session participant (e.g. device identifiers, type of participant, services that participant supports, interface requirements of participant, etc.) |
| M2M Service Layer Session participant Transaction Context | Information related to and/or history of past service layer transactions performed using E2E M2M service layer session. For example, keeping track of the type, number, rate, size, etc. of resources targeted by the session participants. |
| M2M Service Layer Session participant Access Network/ Transport Layer Session Context | Information such as session identifiers, policies, context, and credentials regarding one or more underlying access network/transport layer sessions which service layer sessions can be layered over top of. An SMSF can use this information to coordinate service layer session sharing and migration. For example, when migrating or sharing a service layer session, an SMSF can also coordinate with underlying access network nodes to migrate or share these underlying sessions as well. In doing so, the SMSF can coordinate not only service layer session migration and sharing but also underlying access network session migration and sharing in concert with one another. |

Figure 30:
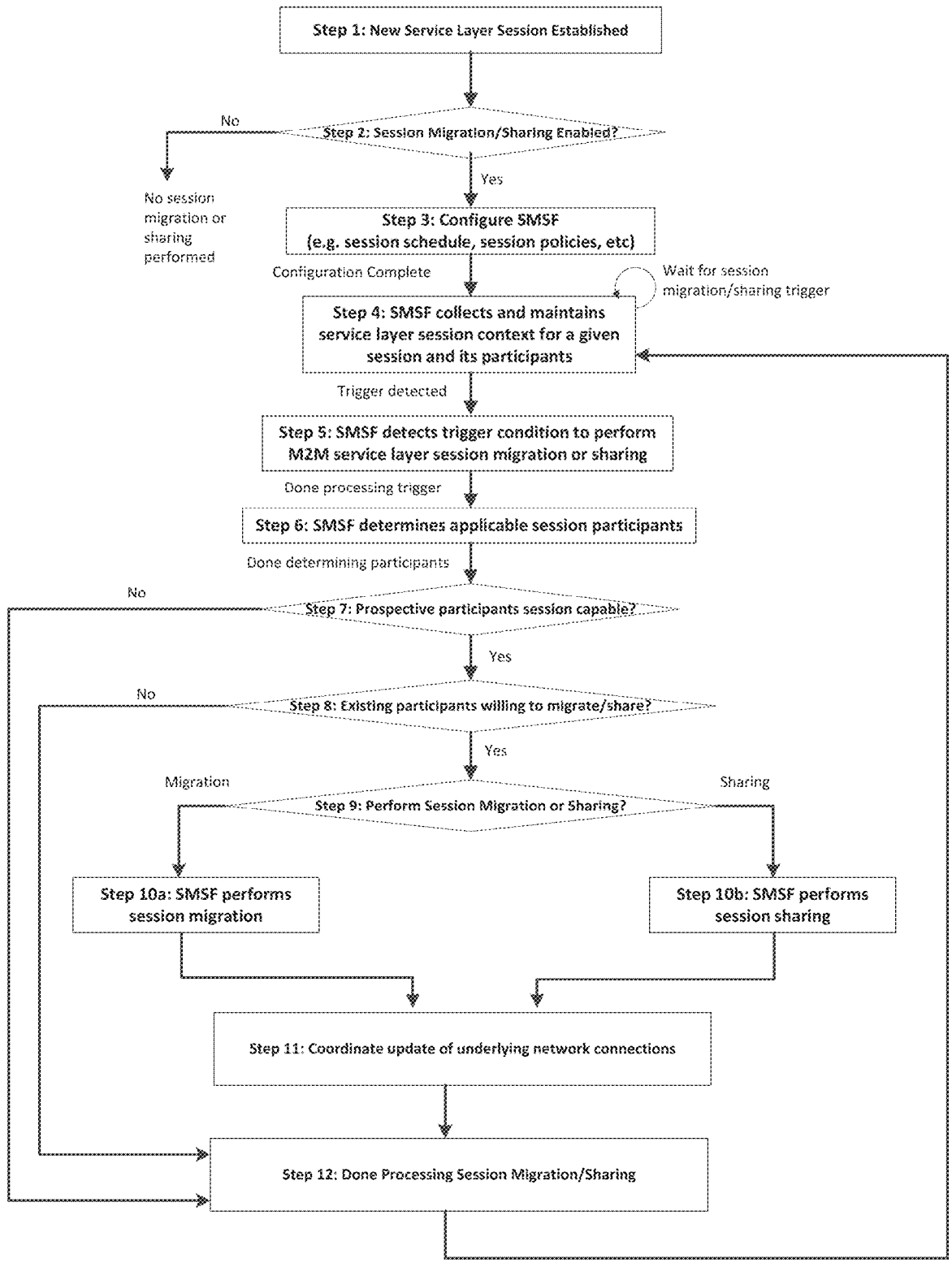
FIG. 30 illustrates one embodiment of a method for migration or sharing of an existing M2M service layer session with one or more prospective session participants.

FIG. 30 illustrates one embodiment of a method for migration or sharing of an existing M2M service layer session with one or more prospective session participants. In one embodiment, this method may be used by an M2M application instance to request that the service layer session existing between itself and a specified service layer instance be migrated by the SMSF to another service layer instance, for example as shown in FIG. 27. In a second embodiment, this method may be used by either an M2M application instance or a M2M service layer instance to request that an existing service layer session be shared by the SMSF with another service layer instance and one or more of the M2M applications registered to it, for example as shown in FIG. 28. In a third embodiment, this method may be used by an M2M application instance to request that the SMSF share an existing M2M service layer session associated with another M2M application instance with it. In a fourth embodiment, this method may be used by an M2M service layer instance to request that the SMSF migrate an existing M2M service layer session existing between an M2M application instance and another M2M service layer instance with it.

Referring to FIG. 30, in step 1, a M2M service layer session is established between two or more session participants. For example, an M2M service layer session may be established in accordance with the exemplary mechanisms illustrated in FIGS. 1-24 and described above.

In step 2, a check may be performed to determine whether the session being established has session migration or sharing functionality enabled or not. In one embodiment, this check may be performed by a function within an M2M service layer responsible for the establishment of M2M service layer sessions. If the results of this check determine that session migration or sharing is enabled, then a transition to step 3 may occur, otherwise no further processing for session migration or sharing is performed for this service layer session.

Step 3 is an enhancement to session establishment methods. In this step, during service layer session establishment, an SMSF-which as discussed above functions as a service within an M2M service layer and may reside within the service layer instance of an M2M server, gateway, device or other node—may be configured with information which can include, but is not limited to one or more of the following:

1. A session migration or sharing schedule—this schedule may specify information such as set times when an SMSF is to perform session migration or sharing. The schedule may also include a list of session participants for which an SMSF is to target when performing session migration or sharing at the specified scheduled times.
2. Session migration or sharing policies—these policies may specify rules used by the SMSF when performing session migration or sharing. Policies may specify rules such as what type of session context can be migrated or shared with certain session participants, which session participants are permitted to communicate with one another, and specific conditions which are to trigger SMSF to perform autonomous.
3. Underlying access network/transport layer session information—this may include information such as session identifiers, policies, context, and credentials regarding one or more underlying access network/transport layer sessions which service layer sessions can be layered over top of An SMSF may use this information to coordinate service layer session sharing and migration. For example, when migrating or sharing a service layer session, an SMSF may also coordinate with underlying access network nodes to migrate or share corresponding underlying sessions as well. In doing so, the SMSF may coordinate not only service layer session migration and sharing but also underlying access network session migration and sharing in concert with one another.

Note that this configuration can be done via static or out-of-band pre-provisioning of an SMSF (e.g. configured when SMSF is deployed) or via dynamic configuration of an SMSF (e.g. by a management entity in the network).

In step 4, an SMSF may collect and maintain service layer session context such as the context described in Table 18 or Table 19 above. An SMSF may collect and maintain service layer session context using methods that may include, but are not limited to, one or more of the following:

1. M2M service layer session participants may explicitly pass session context to an SMSF via an SMSF supported interface. For example in an RoA embodiment, an SMSF can support session context resources which session participants can perform CRUD operations to. In a SoA embodiment, an SMSF can support session context functions which can be called by session participants to pass in session context.
2. An SMSF may support a mechanism for pro-actively collecting service layer session context from M2M service layer session participants. For example, in one embodiment an SMSF may query service layer instances to collect session related context from the individual service capabilities supported by the service layer (e.g. collect session context such as that defined in Table 18 or 19).

In step 5, an SMSF may detect a trigger condition that it needs to perform M2M service layer session migration or sharing. This trigger condition may either be autonomously generated or may be the result of receiving an explicit request from an existing or prospective service layer session participant. An SMSF may detect service layer session migration or sharing triggers using methods that may include, but are not limited to, one or more of the following:

1. An SMSF may autonomously determine that it needs to trigger migration or sharing of a particular M2M service layer session from one or more existing session participants to one or more prospective session participants. This determination may be based on conditions which can include, but are not limited to, one or more of the following:
   a. An SMSF may use a schedule to coordinate session migration or sharing. This proposed schedule is described in step 1 above.
   b. An SMSF may use a combination of service layer session policies (see step 1) and context (see step 2) to determine if/when session migration or sharing is required.
2. Alternatively, an existing M2M service layer session participant may determine that it needs to migrate or share its M2M service layer session with one or more other prospective session participants and as a result, it may generate an explicit trigger to an SMSF. This determination can be based on conditions which can include, but are not limited to, one or more of the following:
   a. A session participant may detect that either itself or one of the other existing session participants has changed locations or is planning on changing locations. Where location can be in terms of, but is not limited to, absolute location (e.g. geo-location) or relative location (e.g. network domain).
   b. A session participant may detect the presence of new candidate session participants in its vicinity (i.e. other M2M service layer instances or application instances) that may be willing to participate in the service layer session.
   c. A session participant may detect the presence of a more suitable candidate session participant than the session participants it is currently communicating with. For example, a session participant can detect that either itself or one of the other existing session participants has registered to another service layer instance and this new service layer instance can serve as a superior session partner (e.g. the new service layer instance is closer, or supports more session-based features, or new service layer instance has applications registered to it which a session participant is interested in communicating with, etc.).
   d. A session participant may detect that either itself or one of the other existing session participants has become overloaded and is no longer able to effectively participate in the session.
   e. A session participant can detect that one of the other existing session participants is no longer available (e.g. has left the network, has lost connectivity, has gone to sleep, etc.).
   f. A session participant can detect that it is going to be unavailable in the near future (e.g. it is going offline or going to sleep, etc.).
3. Alternatively, a prospective M2M service layer session participant may determine that it would like to have a M2M service layer session migrated or shared with it and as a result it can trigger an SMSF to perform this migration/sharing. This determination may be made by the prospective session participant querying an SMSF and detecting the presence of service layer sessions in its vicinity that may be willing to migrate or share their service layer session with it. In addition, an SMSF may also provide a description of each session, such that the prospective participant can determine which sessions it is interested in or compatible with. Based off of this information a prospective session participant can request that an SMSF initiate migrating or sharing a specified service layer session with the prospective participant.

In step 6, an SMSF determines the session participant(s) that it will be targeting when it performs session migration or sharing. This may either be explicitly defined for the case where an SMSF is servicing an explicit request to initiate the migration/sharing, or it may be derived autonomously by an SMSF (e.g. based off of schedule, policy information, or information regarding session participants). For example, in one embodiment an existing session participant (e.g. an M2M application) may provide a new location that it is planning to move to and using this location information an SMSF may find an available and compatible service layer instance which it can migrate the application's service layer session to.

In a second embodiment, a prospective session participant looking to join and share an existing session may provide a description of the session it is looking to join and share. Using this session description, an SMSF may find an available session matching this description which it may then share with the prospective session participant.

In a third embodiment, a session participant (e.g. an M2M application) may provide a list of prior location(s) it has visited, and using this information, an SMSF may query service layer instances in these locations and find existing service layer session(s) applicable to the session participant which can be shared or migrated to service layer instance(s) in the new location which the session participant now resides.

In step 7, an SMSF may check whether any prospective session participant(s) are capable of supporting service layer sessions by querying each of them (i.e. whether they support M2M service layer session communication). For example, for RoA based implementations, an SMSF may query a corresponding resource which prospective session participants may use to advertise their session capabilities. For SoA based implementations, an SMSF may call one or more functions supported by a prospective session participant which may return their session capabilities to the SMSF.

In step 8, an SMSF may check whether any existing session participant(s) are interested in participating in the specific service layer session which the SMSF is attempting to migrate or share with them. For the case where an existing session participant has requested that a session be migrated or shared with a new prospective session participant, the session identifier and/or session descriptor (defined in Table 19) may be shared with the new participant to give it the opportunity to decide whether or not it is interested. Similarly, for the case where a new prospective participant has requested that an existing session be migrated or shared with it, an SMSF may share the information about the new prospective participant with existing session participants to give them the opportunity to decide whether or not they are interested in sharing/migrating their sessions with it.

In step 9, an SMSF may determine whether to perform session migration or session sharing with prospective session participants. This may either be explicitly defined for the case where a requesting session participant is initiating the migration/sharing, or it may be derived autonomously by an SMSF based off of policy information and/or preferences of prospective session participants that the SMSF discovers when querying them.

In step 10a, an SMSF may perform service layer session migration by transferring service layer session context from one session participant to another session participant. This transfer may be done by the SMSF first querying session participants to find all context applicable to a particular session. This querying may be enabled by session participants maintaining a session identifier (i.e. tag) with each instance of session context that they support. For example, in RoA based service layers, a session identifier may be included within each resource instance associated with a session. An SMSF may then query and find resources applicable to a particular session based on this session identifier.

After finding applicable session context, an SMSF may copy this context from the session participant which the session is being migrated away from to the session participant where the session is being migrated towards. During this copying process, an SMSF may also inspect and update certain pieces of session context such that it can be used once it is migrated. For example, a piece of session context that is dependent on session participant addresses or identifiers can be checked and potentially updated. If the address/identifier matches that of the session participant which the session is being migrated away from, this address can be updated with the address of the session participant which the session is being migrated towards. Once copied, the service layer session context from the session participant which the session is being migrated away from may be deleted (if no other session participants are using it). This migration of service layer session context can include, but is not limited to, one or more of the following: (i) migration of service layer subscription information; (ii) migration of group membership information; (iii) migration of service layer point of contact information; (iv) migration of service layer policies (e.g. message delivery and handling policies); (v) migration of service layer security credentials; (vi) migration of service layer device/application management context; (vii) migration of discovery metadata; (viii) migration of location metadata; (ix) migration of charging and accounting metadata; (x) migration of data (e.g. application specified content within service layer container resources); and/or (xi) migration of underlying access network connections and/or sessions which a service layer session is overlaid on top of.

When performing session migration/sharing, an SMSF may differentiate session participants and their corresponding context. For example, when one session participant migrates to another service layer instance, its session context can be migrated to this new service layer instance. In addition, other session participants can also be updated by the SMSF accordingly such that they are aware of this migration. The SMSF may do this by updating the session context of each session participant. Similarly for session sharing, when a session is shared with a new session participant, other session participants can be notified of this by the SMSF updating their session context as well.

Note that in some use case deployments (e.g. when an SMSF is an embedded capability within a M2M service layer) migration may involve transferring service layer session context across multiple service layer instances before it reaches its final destination. For example, FIG. 27 shows the case where service layer session context 448 is first migrated from the service layer instance 446 hosted on M2M gateway 444 to the service layer instance 452 hosted on the M2M server 450, followed by the service layer instance 452 on the M2M server 450 migrating it to the service layer instance 456 hosted on M2M gateway 454. Hence this use case involves two hops. In these sorts of use cases, collaboration between SMSF instances hosted within each service layer instance may be used to properly migrate the service layer session. This collaboration may involve SMSF instances initiating communication with each other and passing service layer session context between themselves.

For RoA based service layer architectures, the migration operations described above may be realized by the following SMSF operations:
1. An SMSF first doing RETRIEVE operations on resources containing service layer session context hosted by a session participant which the session is being migrated away from. These retrieve operations can include query parameters, such as a session identifier, to find context applicable to a particular session.
2. The SMSF inspecting the retrieved resource representation to detect cases where context must be updated (e.g. update addresses of session participants).
3. The SMSF doing POST operations to the session participant which the session is being migrated towards to create resources containing service layer session context.
4. The SMSF doing DELETE operations to remove resources containing service layer session context hosted by session participant which the session is being migrated away from (if not other session participants are using it).

For SoA based service layer architectures, the migration operations described above may be realized by the following SMSF operations:
1. An SMSF first calling function(s) hosted by the session participant which the session is being migrated away from. Via these function(s), the SMSF can obtain service layer session context. These functions can support query parameters, such as a session identifier, to find context applicable to a particular session.
2. The SMSF inspecting service layer session context returned by the service participant to detect cases where context must be updated (e.g. update addresses of session participants).
3. The SMSF calling function(s) hosted by the session participant which the session is being migrated towards. Via these function(s), the SMSF can create a copy of the service layer session.
4. The SMSF calling function(s) hosted by the session participant which the session is being migrated away from. Via these function(s), the SMSF can delete service layer session context.

In step 10b, an SMSF may perform service layer session sharing. A similar method as the one described in step 10a above for session migration may be used. However, after copying service layer session context to a new session participant, it is not needed to be deleted from the session participant where it was copied from. This results in session participants having shared session context. In addition, one or more SMSF(s) can be used to keep the session context updated and synchronized between session participants. For example, the SMSF(s) can perform inter-SMSF communication/collaboration to ensure that the copies of service layer session context hosted by session participants remains in sync with one another. In doing so, session participants can share a service layer session.

In step 11, an SMSF may coordinate with underlying access network nodes to manage underlying access network connections which service layer sessions are overlaid on top of This can include:
1. Coordinating the tear-down and/or retiring of underlying access network connections no longer required by a session participant (e.g. tear down of access network connections used by session participant which the session is being migrated away from).
2. Coordinating the update of an existing underlying access network connections with new information regarding a session participant for which a service layer session has been migrated to or shared with (e.g. new location of session participant such that the underlying access network can migrate an existing connection or establish a new connection based on the participants new location).
3. Coordinating the establishment of new underlying access network connections to support a new session participant for which a service layer session has been migrated to or shared with (e.g. provide service layer session information to the underlying access network such that it can configure and establish a new access network connection(s) more efficiently or effectively). For example, a service layer session migration or sharing schedule can be provided to the underlying access network and this schedule can be used by the access network to proactively establish and tear down the underlying access network connections around this sharing or migration schedule.

In step 12, an SMSF may complete processing of a service layer session migration or sharing trigger/request. Upon completion, the SMSF may transition back to step 4 where it continues to collect and maintain session context and wait for the next trigger to occur.

It is understood that the functionality of the SMSF, as illustrated in FIG. 30, may be implemented in the form of software (i.e., computer-executable instructions) stored in a memory of, and executing on a processor of, a node of an M2M network (e.g., a server, gateway, device, or other computer system), such as one of those illustrated in FIGS. 37C or 37D described below. That is, the method illustrated in FIG. 30 may be implemented in the form of software (i.e., computer-executable instructions) stored in a memory of a network node, such as for example the node or computer system illustrated in FIGS. 37C or 37D, which computer executable instructions, when executed by a processor of the node, perform the steps illustrated in FIG. 30. It is also understood that any transmitting and receiving steps illustrated in FIG. 30 may be performed by communication circuitry of the node under control of the processor of the node and the computer-executable instructions (e.g., software) that it executes.

Figure 31:
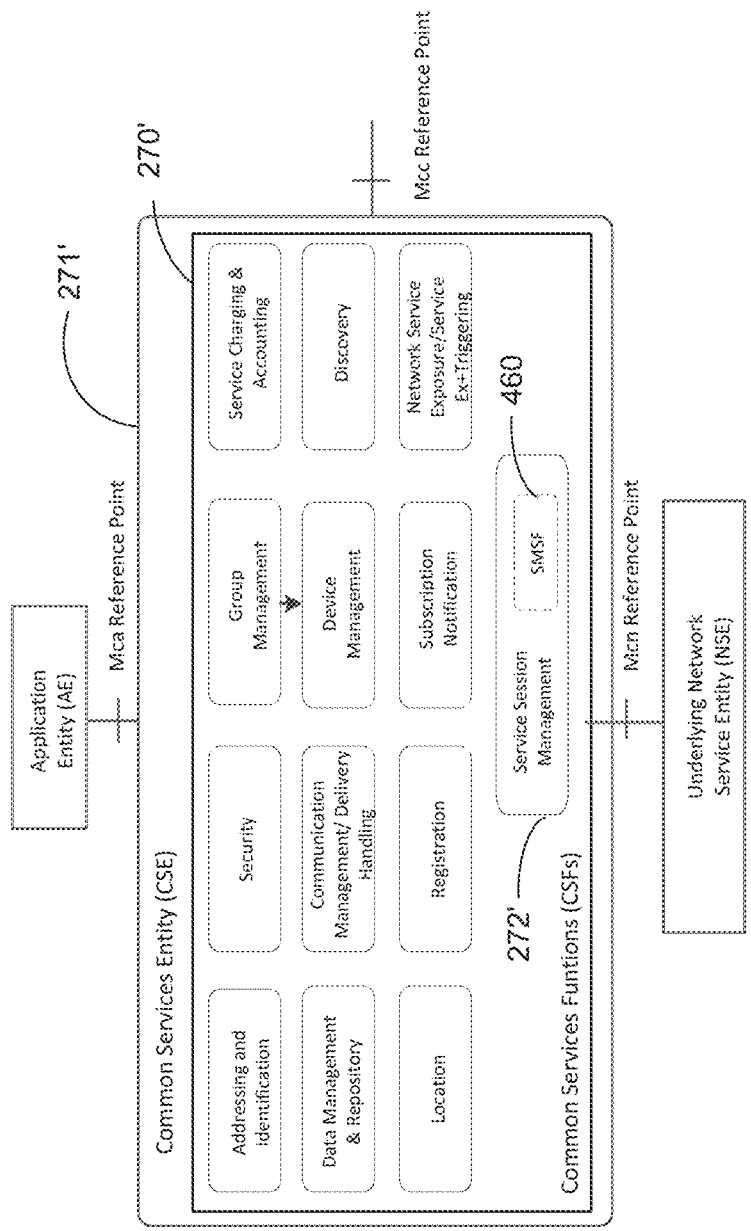
FIG. 31 illustrates one embodiment of a SMSF implemented as part of a Service Session Management (SSM) Capability Service Function (CSF) within a Capability Services Entity (CSE) in accordance with a oneM2M architecture.

Disclosed hereinafter are embodiments in which the SMSF and the methods described above for M2M service layer session migration and sharing are implemented in a network that operates in accordance with the oneM2M architecture. As mentioned above, oneM2M is defining capabilities supported by the oneM2M service layer. These capabilities are referred to as Capability Service Functions (CSFs). The oneM2M service layer is referred to as a Capability Services Entity (CSE). As shown in FIG. 31, a CSE 271' supports a set of CSFs 270'. In one embodiment, the CSE 271' may be a modified version of the CSE 272 illustrated in FIG. 9 and described above, and the set of CSFs 271' likewise may be a modified version of the CSFs 271 in FIG. 9 and also described above.

One version of the oneM2M specification for a CSE includes a preliminary definition of a Service Session Management (SSM) CSF. This initial definition supports service layer session establishment between session participants (e.g. M2M applications and M2M service layer instances), however it does not support service layer session migration nor sharing. To address this gap, the SMSF functionality described above and below may be incorporated within the current version of the oneM2M SSM CSF. This is illustrated in FIG. 31, where an SMSF (as described above and below) is incorporated as part of a Service Session Management (SSM) CSF 272'. In one embodiment, the SSM CSF 272' may be a modified version of the SSM CSF 272 illustrated in FIG. 9 and described above. By incorporating the SMSF (e.g., SMSF 460) into an SSM CSF (e.g., SSM CSF 272'), the service layer session migration and sharing functionality described herein can be supported by the SSM CSF.

According to the oneM2M Resource Oriented Architecture (RoA), as described for example in OneM2M Functional Architecture, oneM2M-TS-0001, version 0.4.3, individual CSFs support a set of "resources" that serve as their respective interface, where a resource is a uniquely addressable entity in the architecture. A resource has a representation that can be manipulated via RESTful methods such as Create, Retrieve, Update, and Delete and is addressed using a Universal Resource Identifier (URI). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

Described hereinafter are oneM2M resource structure enhancements for supporting session migration and sharing functionality for the currently defined oneM2M SSM CSF. Note that the oneM2M defined graphical representation for describing resource structures is the following: (i) square boxes are used for resources and child resources; (ii) square boxes with round corners are used for attribute; (iii) parallelograms are used for collection of resources; (iv) multiplicity of each attribute and child resource is defined; and (v) resource names delimited with "<" and ">" indicate names assigned during the creation of the resource.

Figure 32:
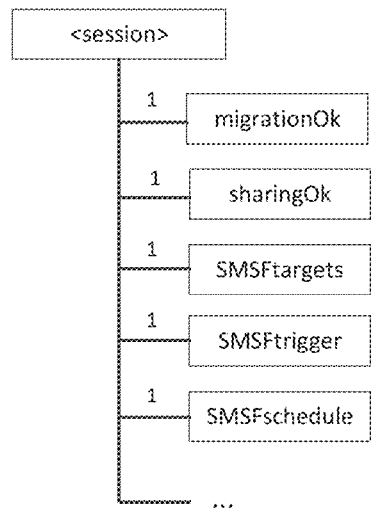
FIG. 32 shows a modification of a oneM2M <session> resource structure, in accordance with one embodiment.

FIG. 32 shows a modification of a oneM2M <session> resource structure, which consists of a set of <session> resource attributes. As shown, the resource structure may be modified by adding attributes to the <session> resource to support session migration and sharing functionality. These attributes are listed and described in Table 20 below.

TABLE 20

<session> Attributes for Session Migration and Sharing

| Attribute Name | Multiplicity | Description |
| --- | --- | --- |
| migrationEnabled | 1 | Indicates whether this session participant allows SMSF migration of a service layer session away or towards it. |
| sharingEnabled | 1 | Indicates whether this session participant allows SMSF sharing of its session with another session participant |
| SMSFschedule | 1 | This schedule can specify information such as set times when an SMSF is to perform session migration or sharing. The schedule can also include a list of session participants for which an SMSF is to target when performing session migration or sharing at the specified scheduled times. |
| SMSFtargets | 1 | Can be used to explicitly specify one or more prospective session participants to migrate or share the session with when the SMSF is explicitly triggered to do so. |
| SMSFtrigger | 1 | Can be used to explicitly trigger migration or sharing of the session (e.g. by an existing session participant to a prospective session participant). |

The migrationOk and sharingOK attributes may be used to enable or disable the SMSF from performing session migration or sharing for a given session. Note that these attributes do not necessarily need to be mutually exclusive of one another. The same session may be shared and/or migrated. The SMSFschedule attribute may be used to schedule when the SMSF performs session migration or sharing.

One example embodiment for encoding the SMSFschedule attribute is to provide a time window which the SMSF can use to schedule migration or sharing of a session. This time window may be expressed in several different formats. The following are a few examples.

In one embodiment, the time window may be expressed as a comma separated start and end time, for example, 2014-12-24T17:00:00+1:00, 2014-12-24T21:00:00+1:00

In another embodiment, the time window may be expressed as an XML encoded start and end time, for example,

```
<smsfSchedule>
  <start> 2014-12-24T17:00:00+1:00 </start>
  <end> 2014-12-24T21:00:00+1:00 </end>
</smsfSchedule>
```

As yet another example, the time window may be specified as a JSON encoded start and end time, for example,

```
"smsfSchedule": {
  "start": "2014-12-24T17:00:00+1:00",
```

-continued

```
    "end": "2014-12-24T21:00:00+1:00"
}
```

The SMSFtargets attribute may be used to specify the prospective session participants where a session is to be migrated or shared with. In one embodiment, the SMSFtargets attribute may be encoded as a list of URIs where each URI is referenced to an active or prospective session participant. This list may be expressed in several different formats.

As a first example, the list may be expressed as a comma separate list of URIs, such as,
    sessionParticipant1@example.com,
    sessionParticipant2@example.com,
    sessionParticipant3@example.com
As another example, the list may be encoded as an XML encoded list of URIs, such as,

```
<smsfTargets>
   <smsfTarget> participant1@example.com </smsfTarget>
   <smsfTarget> participant2@example.com </smsfTarget>
   <smsfTarget> participant3@example.com </smsfTarget>
</smsfTargets>
```

As still another example, the list may be encoded as a JSON encoded list of URIs, such as,

```
"smsfTargets": [
    {smsfTarget: "participant1@example.com"},
    {smsfTarget: " participant2@example.com"},
    {smsfTarget: " participant2@example.com"}
]
```

The SMSFtrigger attribute may be used to explicitly trigger the SMSF to perform session migration or sharing.

One example embodiment for encoding the SMSFtrigger attributed is to use a list of conditions where each condition is a criteria for the SMSF to initiate session migration or sharing. In one embodiment, the SMSF may support a criteria syntax. If one or more criteria in the list is evaluated to true by the SMSF, it may trigger session migration or sharing. Like the previous lists, this list may be expressed in several different formats. It may be encoded as a comma separate list of conditions, for example,
    location of participant1@example.com is 57.64911, 10.40744",
    status of participant2@example.com is unavailable
Alternatively, it may be encoded as an XML encoded list of conditions, for example,

```
<smsfTriggers>
  <smsfTrigger>
    <sessionParticipant>participant1@example.com"</sessionParticipant>
    <location>57.64911,10.40744</location>
  </smsfTrigger>
  <smsfTrigger>
    <sessionParticipant>participant2@example.com"</sessionParticipant>
    <status>unavailable</status>
  </smsfTrigger>
</smsfTriggers>
```

And it may be encoded as a JSON encoded list of conditions, for example,

```
"smsfTriggers": [
    {smsfTrigger:
       "sessionParticipant": participant1@example.com,
       "location": "57.64911,10.40744"
    }
    {smsfTrigger:
       "sessionParticipant": participant2@example.com,
       "status": "unavailable"
    }
]
```

Figure 33:
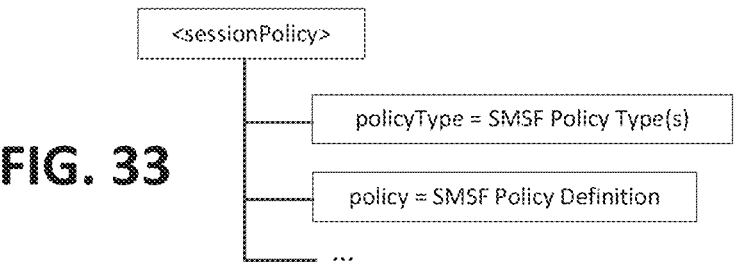
FIG. 33 shows a modification of a oneM2M <sessionPolicy> resource structure, in accordance with one embodiment.

FIG. 33 shows a modification of a oneM2M <sessionPolicy> resource structure. In particular, service layer session migration and sharing specific policy attributes may be added to the <sessionPolicy> resource. In one embodiment, these attributes include a policyType attribute and a policy attribute. Each is described in greater detail in Table 21.

TABLE 21

<sessionPolicy> Attributes for Session Migration and Sharing

| Attribute Name | Multiplicity | Description |
|---|---|---|
| policyType | 1 | The following new policy types specific to session migration and sharing may be provided: Session migration policy type-Used to indicate that policy pertains to session migration Session sharing policy type-Used to indicate that policy pertains to session sharing Alternatively, a single SMSF policy type may be defined. |
| policy | 1 | In one embodiment, this policy attribute may be used to define the policies specific to session migration and sharing such as the following: Policies to specify rules such as what type of session context can be migrated or shared by certain session participants, which session participants are permitted to communicate with one another, and specific conditions which are to trigger an SMSF to perform session migration or sharing. |

The policyType attribute may be used to specify whether a session policy is a session migration policy or a session sharing policy. The policy attribute may be used to specify session migration or sharing specific policies which are used by the SMSF.

In one embodiment, a session policy definition may be encoded by defining a data structure consisting of session migration and sharing rules that are made up of information such as trigger conditions, scheduling information, and session participants which the SMSF can use when performing session migration or sharing. This data structure may either contain this information embedded within it or it may include links to other resources containing this information (e.g. links to the <session> resource defined above which supports smsfSchedule, smsfTargets, and smsfTriggers attributes).

The following is an example of an XML encoded policy definition:

```
<smsfRule>
  <smsfSchedule>
    <start>2014-12-24T17:00:00+1:00 </start>
    <end> 2014-12-24T21:00:00+1:00 </end>
  </smsfSchedule>
  <smsfTriggers>
```

-continued

```
<smsfTrigger>
    <sessionParticipant>participant1@example.com"</sessionParticipant>
    <location>57.64911,10.40744</location>
</smsfTrigger>
<smsfTrigger>
    <sessionParticipant>participant2@example.com"</sessionParticipant>
    <status>unavailable</status>
```

Figure 34:
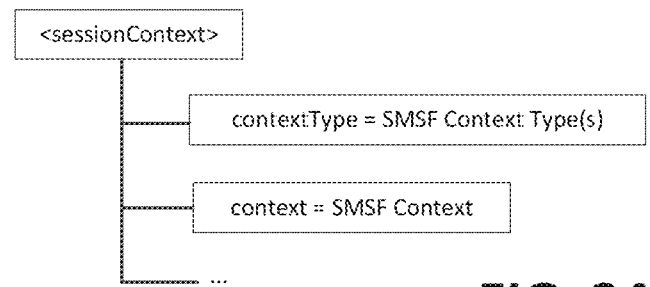
FIG. 34 shows a modification of a oneM2M <sessionContext> resource structure, in accordance with one embodiment.
Figure 35:
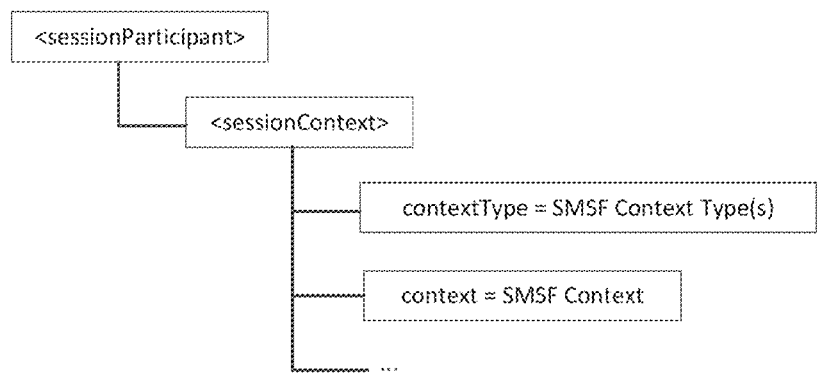
FIG. 35 illustrates a <sessionContext> resource structure linked to a <sessionParticipant> resource structure, in accordance with one embodiment.

FIG. 34 shows a modification of a oneM2M <sessionContext> resource structure. As shown, service layer session migration and sharing context types may be added to the <sessionContext> resource. In particular, the session context attributes defined in Table 22 may be added. Note that this context may be applicable to all the participants of a given session or may be specific to an individual session participant. For example, for context that is specific to an individual session participant, it may be instantiated under (or linked to) a <sessionParticipant> resource, as shown in FIG. 35.

TABLE 22

<sessionContext> Attributes for Session Migration and Sharing

| Attribute Name | Multiplicity | Description |
|---|---|---|
| contextType | 1 | In one embodiment, the following context types may be used by the proposed SMSF to migrate and share a service layer session with one or more prospective session participants as described herein. Each of these context types is defined in Tables 18 and 19:<br>Session migration or sharing trigger context type<br>Session participant subscription context type<br>Session participant security context type<br>Session participant charging/transaction context type<br>Session participant service layer routing context type<br>Session participant location context type<br>Session participant data context type<br>Session participant discovery context type<br>Underlying transport session context type |
| context | 1 | In one embodiment, the definition of this context attribute may be extended to support a context instance representation or a link to a context instance representation of type equal to one of the session migration and sharing context types defined above. |

-continued

```
    </smsfTrigger>
    </smsfTriggers>
    <smscrargets>
    <smsfTarget> participant1@example.com </smsfTarget>
    <smsfTarget> participant2@example.com </smsfTarget>
    <smsfTarget> participant3@example.com </smsfTarget>
    </smsfTargets>
</smsfRule>
```

An example JSON encoded policy definition may be:

```
"smsfRule": {
  "smsfSchedule": {
    "start": "2014-12-24T17:00:00+1:00",
    "end": "2014-12-24T21:00:00+1:00"
  }
  "smsfTargets":
    {smsfTarget: "participant1@example.com"},
    {smsfTarget: " participant2@example.com"},
    {smsfTarget: " participant2@example.com"}
  ]
  "smsfTriggers": [
    {smsfTrigger:
      "sessionParticipant": participant1@example.com,
      "location": "57.64911,10.40744"
    }
    {smsTrigger:
      "sessionParticipant": participant2@example.com,
      "status": "unavailable"
    }
  ]
}
```

In one embodiment, a session context definition may be encoded by defining a data structure consisting of session migration and sharing context which the SMSF can use when performing session migration or sharing. This data structure may either contain this information embedded within it or it may include links to other resources containing this information (e.g. links to the <session> resource defined above which supports attributes such as smsfTargets attributes).

The following is an example of an XML encoded context definition:

```
<smsfContext>
  <smsfParticipant>
    <id>participant2@example.com</id>
    <currentLocation> 57.64911,10.40744</location></currentLocation>
    <sessionId>session123</sessionId>
    <sessionCredential>XYZ367</sessionCredential>
    <chargingRecord>link to charging record resource</chargingRecord>
    <sessionData>link to container resource</sessionData>
    <routingInfo>IP address and port</routingInfo>
    <discoveryInfo>semantic tags or links to ontologies</discoveryInfor>
    <history>link to transaction history resource</history>
    <accessNWInfo>Access NW IDs and routing info</accessNWInfo>
  </smsfPariscipant>
</smsfContext>
```

Here is an example of a JSON encoded context definition:

```
"smsfContext": {
  "smsfParticipant": {
    "id": "participant2@example.com",
```

-continued

```
    "currentLocation": "57.64911,10.40744",
    "sessionId": "session123",
    "sessionCredential": "XYZ367",
    "chargingRecord": "link to charging record resource",
    "sessionData": "link to container resource",
    "routingInfo": "IP address and port",
    "discoveryInfo": "semantic tags or links to ontologies",
    "history": "link to transaction history resource",
    "<accessNWInfo": "Access NW IDs and routing info"
  }
}
```

Figure 36A:
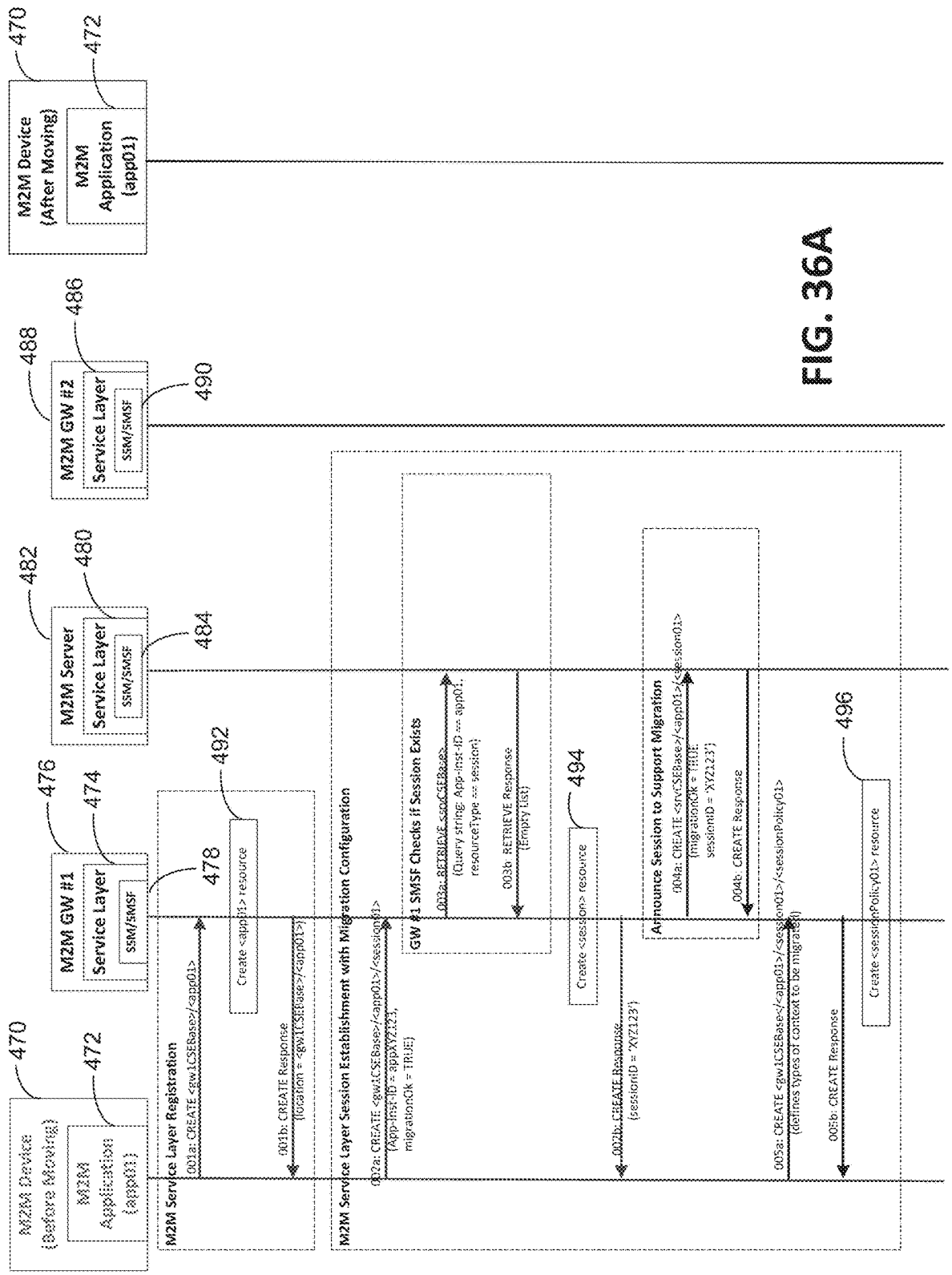
FIGS. 36A-C illustrate one example embodiment of a method for migrating a oneM2M service layer session.
Figure 36B:
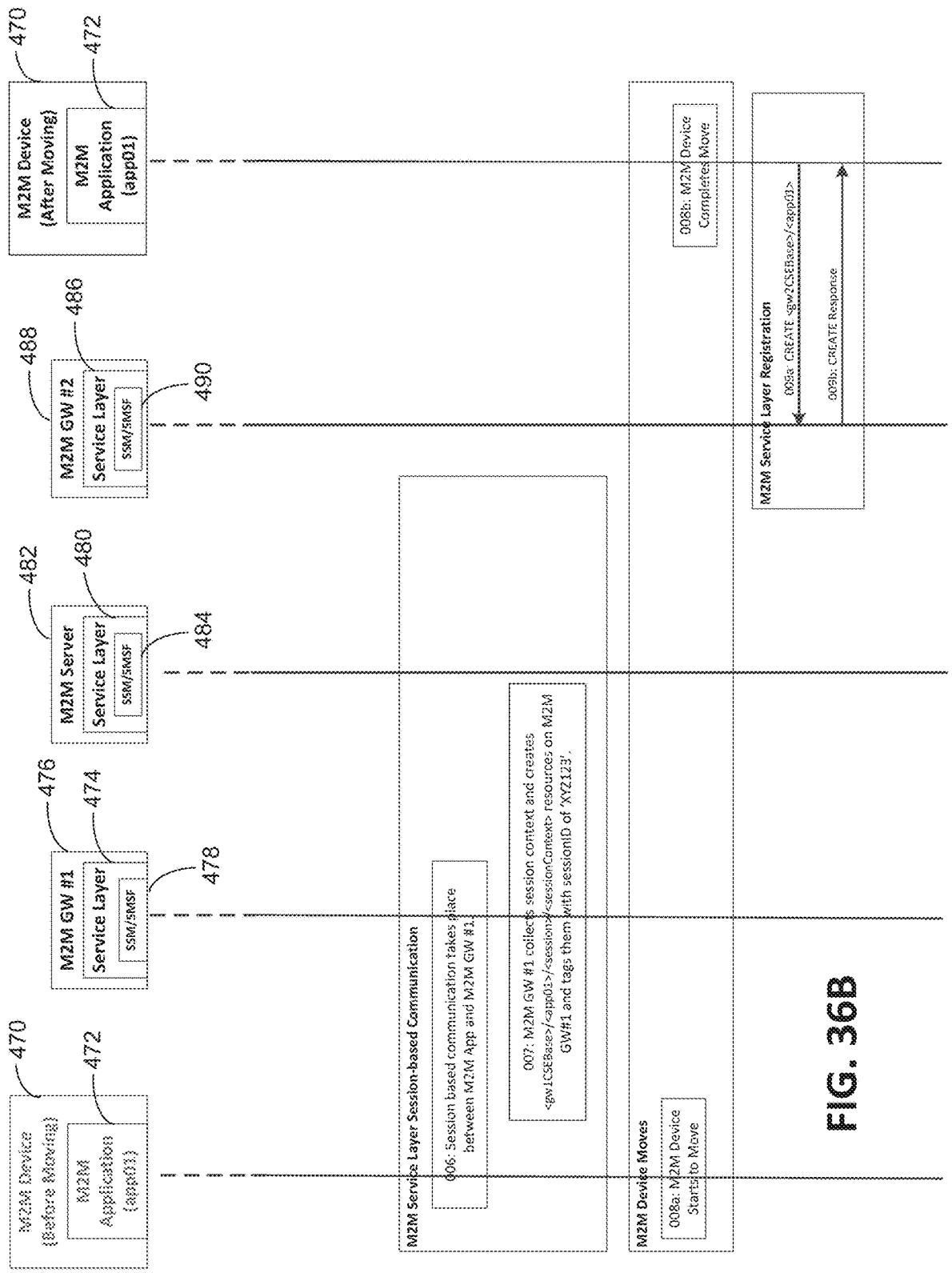
Figure 36C:
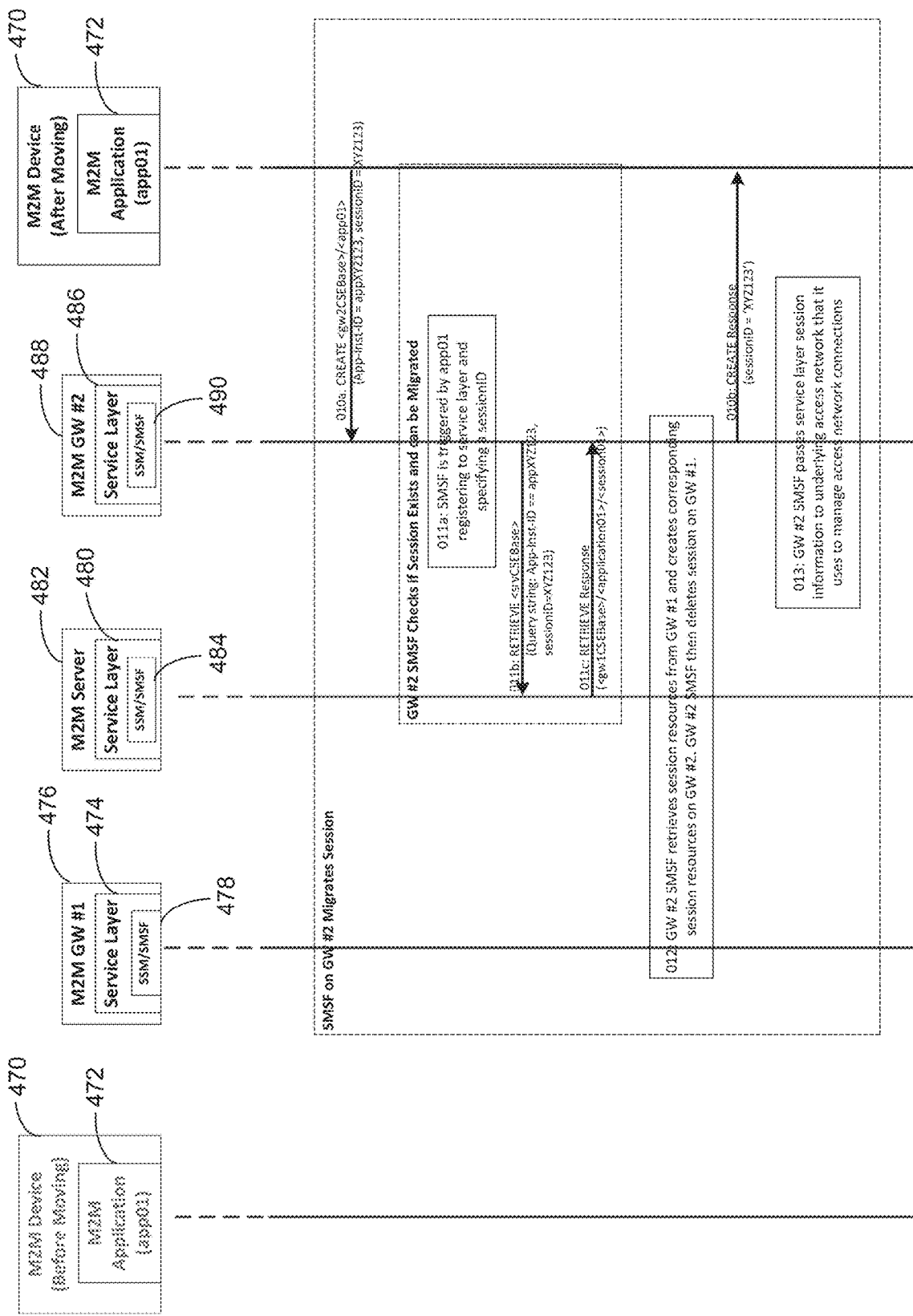

FIGS. 36A-36C illustrate one example embodiment of a method for migrating a oneM2M service layer session and demonstrate how the oneM2M SMSF resource extensions discussed above may be used in the migration process. In this example, a M2M service layer session between an M2M application 472 hosted on an M2M device 470 and a service layer instance 474 of a first M2M gateway 476 (M2M GW #1) is being migrated from the service layer instance hosted on that first M2M gateway 476 to the service layer instance 486 hosted on a second M2M gateway 488 (M2M GW #2), via the service layer instance 480 hosted on an M2M server 482. As shown, in this embodiment, each of the service layer instances 474, 480, and 486 includes a Service Session Management (SSM) CSF 478, 484, and 490, respectively, which includes the Session Migration and Sharing Function (SMSF) functionality illustrated, for example, in FIG. 30 and described above. In this example, migration is being performed to support a mobile M2M device (e.g., device 470) that has moved from a first location (shown on the left of FIG. 36A) to a new location (shown on the right of FIG. 36A).

In this embodiment, the migration is performed via collaboration between the SMSFs (478, 484, 490) instantiated on M2M GW #1 476, M2M server 482, and M2M GW #2 488. Hence, the migration path of service layer session context is from M2M GW #1 476 to M2M server 482 followed by M2M server 482 to M2M GW #2 488. Also note that in other embodiments (not shown), the migration path of service layer session context may be from M2M GW #1 476 to M2M GW #2 488 directly, in which case the M2M server 482 would not play a role. Also note that although service layer migration is specifically shown in this example, service layer session sharing may be performed instead using similar steps, but replacing the migration operations with corresponding sharing operations as described above.

Referring to FIG. 36A, in steps 001a and 001b, the M2M application 472 hosted on the M2M device 470 registers to the M2M service layer instance 474 hosted on M2M GW #1 476. This registration is performed by creating a oneM2M defined <application> resource on M2M GW #1 476, as illustrated at 492.

Next, the M2M application 472 hosted on the M2M device 470 establishes a M2M service layer session between itself and the service layer instance 474 hosted on M2M GW #1 476. This is initiated by the M2M application creating a oneM2M defined <session> resource, as shown in step 002a. When doing this, the application 472 indicates that it would like the session to be migratable by configuring the migrationOk attribute to 'TRUE'. The application also includes its unique application instance identifier (appXYZ123') in this request.

In steps 003a and 003b, the SSM/SMSF 478 hosted on M2M GW #1 476 checks if there is a migratable session already available for M2M application 'appXYZ123' or not. This may be done by querying the service layer instance 480 on the M2M server 482 to see whether any session resources associated with 'appXYZ123' have either been created or announced to the server. In this example, there are none. As a result, as shown at 494, the SSM/SMSF 478 hosted on M2M GW #1 476, creates a new <session> resource for the M2M application 472. When creating this <session> resource, a unique 'sessionID' (e.g., "XYZ123") is allocated and assigned to the session by the SSM/SMSF. This 'sessionID' is returned to the M2M application in step 002b.

In steps 004a and 004b, after creating the new <session> resource, the SSM/SMSF 478 on M2M GW #1 476 announces this resource to the service layer instance 480 hosted on the M2M server 480. This is done since the M2M application 472 has set the 'migrationOK' flag to 'TRUE' in the <session> create request (step 002a). By announcing the <session> resource, the SSM/SMSF 478 enables the session to be discoverable by SSM/SMSFs hosted on other service layer instances in the network (e.g. SSM/SMSF 490 hosted on M2M GW #2 488). When announcing to the M2M server 482, the announced resource includes the 'sessionID' and a link back to the <session> resource hosted within the service layer 474 on M2M GW #1 476.

Next, at steps 005a and 005b, the M2M application 472 creates a service layer session policy resource which defines which types of session context are to be collected and maintained by the SSM/SMSF while the session is active as well as which context is to be migrated if/when the session is migrated to another service layer. The creation of the session policy resource is depicted at 496.

Referring to FIG. 36B, which continues the present example, step 6 depicts normal session-based communication occurring between the M2M application 472 and the service layer instance 474 hosted on M2M GW #1 476.

As the session-based communications occur, the SSM/SMSF 478 hosted on M2M GW #1 476 may collect context (such as the context defined in Table 19) pertaining to the service layer session based on the <sessionPolicy> rules. This context may be stored by the SSM/SMSF 478 in <sessionContext> resources created on M2M GW #1 476. The SSM/SMSF 478 may tag these resources with the sessionID of the present session (e.g., "XYZ123").

In the present example, as depicted in steps 008a and 008b, the M2M device 470 moves from its first location to a second location. In this example, after moving, the device 470 is no longer in the proximity of M2M GW #1 476. Instead it is in the proximity of M2M GW #2 488.

In steps 009a and 009b, the M2M device registers to the service layer instance 486 hosted on M2M GW #2 488.

Referring to FIG. 36C, which again continues the present example, in step 010a, the M2M application 472 hosted on the M2M device 470 attempts to establish a M2M service layer session between itself and the service layer instance 486 hosted on M2M GW #2 488. This is initiated by the M2M application 472 registering to the service layer instance 486 hosted on M2M GW #2 488 and providing it with the sessionID (e.g., "XYZ123") of the session it established with the service layer hosted on M2M GW #1 476.

In step 011a, the SSM/SMSF 490 hosted on M2M GW #2 488 is triggered by the M2M application registration because it included a sessionID. The SSM/SMSF 490 checks if there is a migratable session already available for M2M application 'appXYZ123' or not. It does this in step 011b by querying the service layer 480 on its parent service layer (i.e. M2M server 482) to see whether any session resources associated with 'appXYZ123' have either been created or announced to it. In this particular case, there is one and a link to the corresponding <session> resource hosted on M2M GW #1 476 is returned to the SSM/SMSF 490 on M2M GW #2 488, as shown in step 011*c*.

In step 12, the SSM/SMSF 490 hosted on M2M GW #2 488 migrates the service layer session from the service layer 474 on M2M GW #1. To do this, the SSM/SMSF 490 first retrieves the <sessionPolicy> resource(s) to determine if there are any session migration policies it needs to abide by. Using these policies the SSM/SMSF 490 may determine whether it can migrate the session to M2M GW #2 488. If yes, then the SSM/SMSF 490 may selectively retrieve the <session>, <sessionPolicy>, and <sessionContext> resources and create corresponding versions within the resource tree of the service layer 486 hosted on M2M GW #2 488. When performing the retrieves, the SSM/SMSF 490 may include a query string parameter that includes the sessionID. This allows the SSM/SMSF 490 to find the session resources applicable to the session it is looking to migrate. Upon receiving responses to these retrieves, the SSM/SMSF 490 may inspect the retrieved resource representations to detect cases where context must be updated (e.g. to account for changes in session participants that may no longer be valid due to the migration). Once the SSM/SMSF 490 completes the retrieval and creation of process, it can then delete the session from the service layer hosted on M2M GW #1 476. A response to the session create request sent in step 010*a* may then be sent to the M2M application 472 in step 010*b*.

In step 013, the SSM/SMSF 490 hosted on M2M GW #2 488 may coordinate with the underlying access network to pass service layer session information to it. Using this information, the underlying access network may coordinate access network connections corresponding to the M2M device 470 with the service layer session. For example, it may coordinate the tear-down and/or retiring of underlying access network connections no longer required by the M2M device 470 to connect to M2M GW #1 476, or sharing service layer session schedule information (e.g. times when the service layer session is active/in-active, session migration schedule, etc.). This may be used by the access network to proactively establish and tear down the underlying access network connections leveraging this information.

It is understood that the entities performing the steps illustrated in FIGS. 36A-C may be logical entities that may be implemented in the form of software (i.e., computer-executable instructions) stored in a memory of, and executing on a processor of, a node of an M2M network (e.g., a server, gateway, device, or other computer system), such as one of those illustrated in FIG. 37C or 37D described below. That is, the method illustrated in FIGS. 36A-36C may be implemented in the form of software (i.e., computer-executable instructions) stored in a memory of a network node, such as for example the node or computer system illustrated in FIGS. 37C or 37D, which computer executable instructions, when executed by a processor of the node, perform the steps illustrated in FIGS. 36A-C. It is also understood that any transmitting and receiving steps illustrated in FIGS. 36A-C may be performed by communication circuitry of the node under control of the processor of the node and the computer-executable instructions (e.g., software) that it executes.

Embodiments set forth herein are described in terms of a representational state transfer (REST) architecture, with components and entities described conforming to the constraints of a REST architecture (RESTful architecture). A RESTful architecture is described in terms of the constraints applied to components, entities, connectors, and data elements used in the architecture rather than in terms of physical component implementation or communications protocols used. Thus, the roles and functions of the components, entities, connectors, and data elements will be described. In a RESTful architecture, representations of uniquely addressable resources are transferred between entities. When handling resources in a RESTful architecture, there are basic methods that may be applied to resources, such as Create (create child resources), Retrieve (read the content of the resource), Update (write the content of the resource) or Delete (delete the resource.) One skilled in the art will recognize that implementations of the instant embodiments may vary while remaining within the scope of the present disclosure. One skilled in the art will also recognize that the disclosed embodiments are not limited to implementations using the oneM2M architecture that is used herein to describe exemplary embodiments. The disclosed embodiments may be implemented in architectures and systems, such as ETSI M2M, 3GPP MTC, OMA LWM2M, and other like M2M systems and architectures.

Example M2M/IoT/WoT Communication System

FIG. 37A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT service layer, etc.

As shown in FIG. 37A, the M2M/ IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 37A, the M2M/ IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different network nodes (e.g., servers, gateways, device, and the like). For example, the Field Domain may include M2M gateways 14 and terminal devices 18. It will be appreciated that any number of M2M gateway devices 14 and M2M terminal devices 18 may be included in the M2M/ IoT/WoT communication system 10 as desired. Each of the M2M gateway devices 14 and M2M terminal devices 18 are configured to transmit and receive signals, using communications circuitry, via the communication network 12 or direct radio link. A M2M gateway 14 allows wireless M2M devices (e.g.

cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 37B, the illustrated M2M service layer 22 in the field domain provides services for the M2M application 20, M2M gateways 14, and M2M devices 18 and the communication network 12. It will be understood that the M2M service layer 22 may communicate with any number of M2M applications, M2M gateways 14, M2M devices 18, and communication networks 12 as desired. The M2M service layer 22 may be implemented by one or more nodes of the network, which may comprises servers, computers, devices, or the like. The M2M service layer 22 provides service capabilities that apply to M2M devices 18, M2M gateways 14, and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateways 14 and M2M devices 18 in the field domain. It will be understood that the M2M service layer 22' may communicate with any number of M2M applications, M2M gateways and M2M devices. The M2M service layer 22' may interact with a service layer by a different service provider. The M2M service layer 22' by one or more nodes of the network, which may comprises servers, computers, devices, virtual machines (e.g., cloud computing/storage farms, etc.) or the like.

Referring also to FIG. 37B, the M2M service layers 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layers 22 and 22' also enable M2M applications 20 and 20' to communicate through various networks 12 and 12' in connection with the services that the service layers 22 and 22' provide.

The M2M applications 20 and 20' may include applications in various industries such as, without limitation, transportation, health and wellness, connected home, energy management, asset tracking, and security and surveillance. As mentioned above, the M2M service layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

As mentioned above, the Session Migration and Sharing Function (SMSF) described herein may be implemented as part of the service layer of an M2M system. Generally, a service layer, such as the service layers 22 and 22' illustrated in FIGS. 37A and 37B, defines a software middleware layer that supports value-added service capabilities through a set of Application Programming Interfaces (APIs) and underlying networking interfaces. Both the ETSI M2M and oneM2M architectures define a service layer. ETSI M2M's service layer is referred to as the Service Capability Layer (SCL). The SCL may be implemented in a variety of different nodes of the ETSI M2M architecture. For example, an instance of the service layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e., service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the service layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a service layer or component thereof may be implemented in the form of software running on a network node (e.g., server, computer, gateway, device or the like) having the general architecture illustrated in FIG. 37C or FIG. 37D described below.

Further, the SMSF and other methods and functionalities described herein may be implemented as part of an M2M network that uses a Service Oriented Architecture (SOA) and/or a Resource-Oriented Architecture (ROA) to access services such as the SMSF of the present application.

FIG. 37C is a block diagram of an example hardware/software architecture of a M2M network node 30, such as an M2M device 18, an M2M gateway 14, an M2M server, or the like. As shown in FIG. 37C, the M2M node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the M2M node 30 may include any sub-combination of the foregoing elements while remaining consistent with an embodiment. This node may be a node that implements the SMSF functionality described herein.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the M2M node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 37C, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the transmitting and receiving steps described herein and in the claims. While FIG. 37C depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other M2M nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 37C as a single element, the M2M node 30 may include any number of transmit/receive elements 36. More specifically, the M2M node 30 may employ MIMO technology. Thus, in an embodiment, the M2M node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M node 30 may have multi-mode capabilities. Thus, the transceiver 34 may include multiple transceivers for enabling the M2M node 30 to communicate via multiple RATs, such as UTRA and IEEE 802.11, for example.

Figure 38:
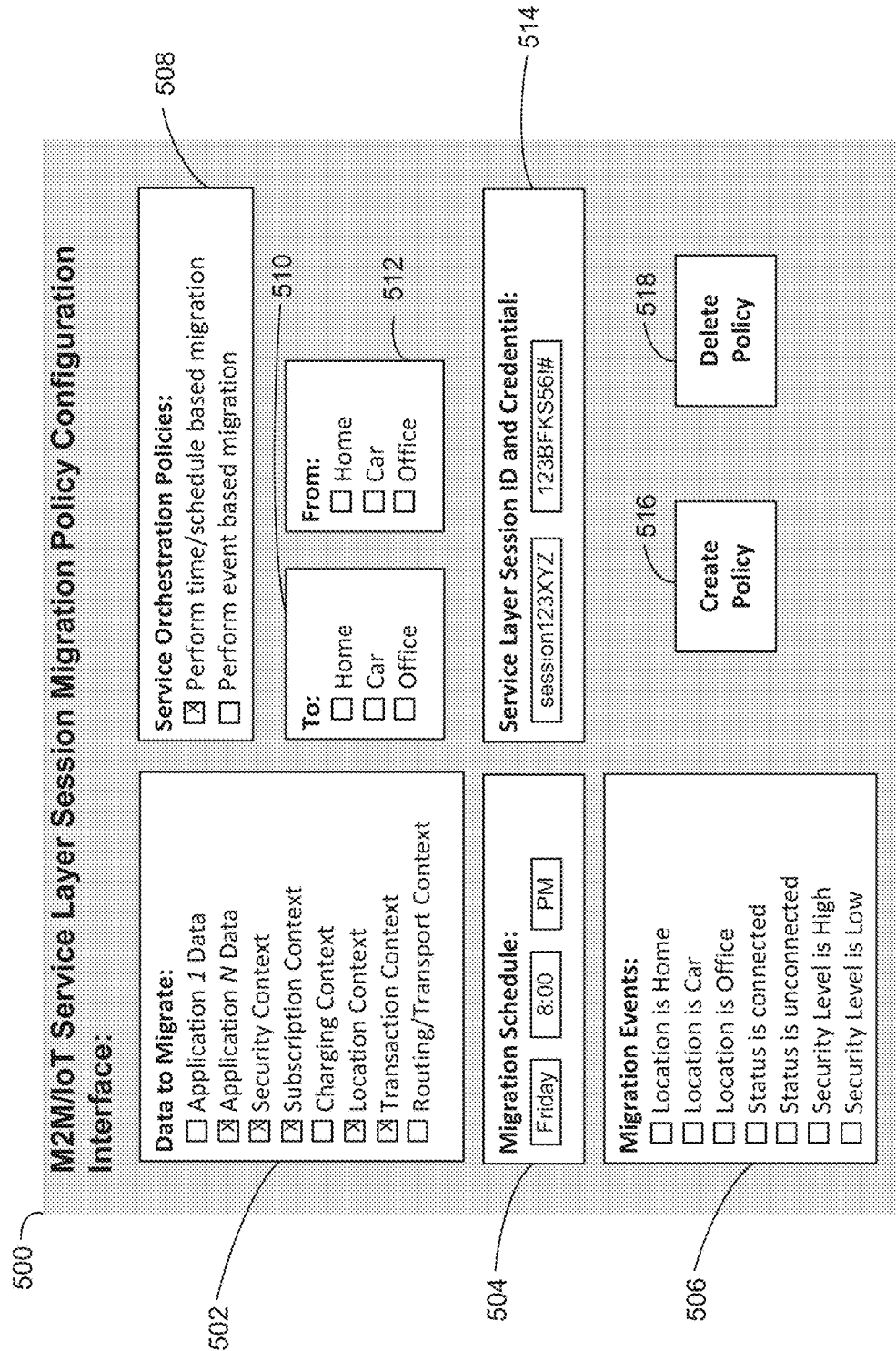
FIG. 38 illustrates one embodiment of a graphical user interface that may be implemented to allow a user to interactively configure and manage an end-to-end session migration policy.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M node 30, such as on a server or a home computer. The processor 32 may be configured to control lighting patterns, images, or colors on the display or indicators 42 to reflect the status of an M2M service layer session migration or sharing or to obtain input from a user or display information to a user about the node's session migration or sharing capabilities or settings. In another example, the display may show information with regard to a session state. Additionally, the display 42 may be used to present a graphical user interface to a user—which, for example, may be layered on top of the RESTful user/application API described above for a oneM2M embodiment—to allow a user to interactively establish and manage an E2E session, or the migration or sharing thereof, via the underlying service layer session functionality described herein. An example of such graphical user interface is illustrated in FIG. 38 and described below.

The processor 32 may receive power from the power source 48, and may be configured to distribute and/or control the power to the other components in the M2M node 30. The power source 48 may be any suitable device for powering the M2M node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M node 30. It will be appreciated that the M2M node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 37D is a block diagram of an exemplary computing system 90 which may also be used to implement one or more nodes of an M2M network, such as an M2M server, gateway, device, or other node. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M service layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86. The display 86 may be used, for example, to display the example graphical user interface illustrated in FIG. 38 and described below.

Further, computing system 90 may contain communication circuitry, such as for example a network adaptor 97, that may be used to connect computing system 90 to an external communications network, such as network 12 of FIG. 37A and FIG. 37B, to enable the computing system 90 to communicate with other nodes of the network.

Example Graphical User Interface

FIG. 38 illustrates one embodiment of a graphical user interface 500 that may be implemented to allow a user to interactively configure and manage an end-to-end session migration policy. In one embodiment, this graphical user interface may be layered on top of the methods described above for establishing, managing, migrating, and sharing an end-to-end session. In the illustrated embodiment, the graphical user interface may be used by a user to create (or delete) a policy to govern the migration of an E2E M2M service layer session. As shown, in window 502, a user may select which session context should be migrated. Window 504 may be used to establish a migration schedule. Window 506 may be used to display information about events associated with a current session. Window 508 may be used to set service orchestration policies, such as whether to perform time/schedule based migration or event based migration. Windows 510 and 512 may be used to identify from where and to where a migration should be performed. Window 514 may be used to enter and/or display an identifier of the E2E M2M service layer session for which the configuration policy is being established, as well as a credential associated with the session. Buttons 516 and 518 may be used to cause the policy to be created or deleted, respectively.

In various embodiments, the graphical user interface 500 may be implemented on any one or more nodes of an M2M, IoT, or WoT network, including end-user devices, terminals, gateways, or servers of such networks, such as, for example, the devices 18, gateways 14, and servers 22 of the example network of FIGS. 37A-37D, or any of the devices, gateways, or servers illustrated in other figures. For example, the graphical user interface 500 may be implemented and displayed on the display 42 of the example network node 30 illustrated in FIG. 37C or the display 86 of the example computer system 90 of FIG. 37D.

It is understood that any or all of the systems, methods and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any non-transitory (i.e., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computer.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

What is claimed:

1. A node comprising a processor and a memory, the node further including computer-executable instructions stored in the memory of the node which, when executed by the processor of the node, perform functions of an instance of a service in a network and cause the node to:

store, in the memory of the node, a context comprising information concerning a service session established between a service instance of the node and an application executing on a second node in the network, wherein the context comprises information defining policies by which migration of the service session is to be performed; and in response to a trigger condition indicating that the service session between the service instance of the node and the application of the second node is to be migrated to a third node, transmit the stored context for the service session from the node to a service instance executing on the third node, wherein the service supports service capabilities through a set of Application Programming Interfaces (APIs).

2. The node recited in claim 1, wherein the trigger condition indicates that the service session is to be migrated, and wherein after the stored context is transmitted to the service instance executing on the third node, the service instance of the node deletes the stored context from the memory of the node.

3. The node recited in claim 1, wherein the stored context comprises one or more of (i) information specifying a schedule by which migration of the service session is to be performed; (ii) information defining policies by which migration of the service session is to be performed; and (iii) information specifying events that may result in said trigger condition indicating that the service session is to be migrated.

4. The node recited in claim 3, wherein the stored context further comprises one or more of (i) information identifying other service session participants to which notifications concerning the service session are to be transmitted; (ii) an identifier of the service session; (iii) security credentials to be used by participants of the service session; (iv) information regarding session activity; (v) information regarding routing of messages to participants of the service session; (vi) information regarding locations of participants to the service session; (vii) data collected and stored on behalf of participants of the service session; (viii) information to facilitate discovery of the service session by other participants; (ix) information relating to transactions performed using the service session; and (x) information concerning access network sessions or transport sessions that underlie the service session.

5. The node recited in claim 1, wherein the stored context is stored in one or more resources created and maintained by the service instance of the node.

6. The node recited in claim 1, wherein transmitting the stored context from the node to a service instance executing on the third node comprises transmitting the stored context from the node to a service instance executing on an intermediate node, which intermediate node then forwards the stored context to the third node.

7. The node recited in claim 1, wherein the trigger condition is autonomously generated by the service instance of the node.

8. The node recited in claim 1, wherein the trigger condition is caused by a participant of the service session.

9. The node recited in claim 1, wherein the service is located in a service layer on top of network protocol stacks.

10. The node recited in claim 9, wherein the service layer is defined according to ETSI/oneM2M standards.

11. A method for use by a node in a network, the method comprising:

storing, in a memory of the node, a context comprising information concerning a service session established between a service instance of the node and an application executing on a second node in the network, wherein the context comprises information defining policies by which migration of the service session is to be performed; and in response to a trigger condition indicating that the service session between the service instance of the node and the application of the second node is to be migrated to a third node, transmitting the stored context for the service session from the node to a service instance executing on the third node.

12. The method recited in claim 11, wherein the trigger condition indicates that the service session is to be migrated, the method further comprising:

after transmitting the stored context to the service instance executing on the third node, deleting the stored context from the memory of the node.

13. The method recited in claim 11, wherein the stored context comprises one or more of (i) information specifying a schedule by which migration of the service session is to be performed; (ii) information defining policies by which migration of the service session is to be performed; and (iii) information specifying events that may result in said trigger condition indicating that the service session is to be migrated.

14. The method recited in claim 11, wherein the stored context further comprises one or more of (i) information identifying other service session participants to which notifications concerning the service session are to be transmitted; (ii) an identifier of the service session; (iii) security credentials to be used by participants of the service session; (iv) information regarding session activity; (v) information regarding routing of messages to participants of the service session; (vi) information regarding locations of participants to the service session; (vii) data collected and stored on behalf of participants of the service session;

(viii) information to facilitate discovery of the service session by other participants; (ix) information relating to transactions performed using the service session; and (x) information concerning access network sessions or transport sessions that underlie the service session.

15. The method recited in claim 11, wherein the stored context is stored in one or more resources created and maintained by the service instance of the node.

16. The method recited in claim 11, wherein transmitting the stored context from the node to a service instance executing on the third node comprises transmitting the stored context from the node to a service instance executing on an intermediate node, which intermediate node then forwards the stored context to the third node.

17. The method recited in claim 11, wherein the trigger condition is autonomously generated by the service instance of the node.

18. The method recited in claim 11, wherein the trigger condition is caused by a participant of the service session.

19. The method recited in claim 11, wherein a service associated with the service session is located in a service layer on top of network protocol stacks.

20. The method recited in claim 19, wherein the service layer is defined according to ETSI/oneM2M standards.

* * * * *